United States Patent
Cattone

(10) Patent No.: US 10,318,930 B2
(45) Date of Patent: Jun. 11, 2019

(54) SYSTEMS AND METHODS TO UTILIZE SMART COMPONENTS

(71) Applicant: eBay Inc., San Jose, CA (US)

(72) Inventor: Jeremy Leigh Cattone, Tigard, OR (US)

(73) Assignee: eBay Inc., San Jose, CA (US)

( * ) Notice: Subject to any disclaimer, the term of this patent is extended or adjusted under 35 U.S.C. 154(b) by 905 days.

(21) Appl. No.: 14/588,272

(22) Filed: Dec. 31, 2014

(65) Prior Publication Data
US 2016/0189115 A1    Jun. 30, 2016

(51) Int. Cl.
G06Q 10/00    (2012.01)
G06Q 30/06    (2012.01)
G06Q 10/08    (2012.01)

(52) U.S. Cl.
CPC .......... *G06Q 10/20* (2013.01); *G06Q 10/087* (2013.01); *G06Q 30/0633* (2013.01)

(58) Field of Classification Search
None
See application file for complete search history.

(56) References Cited

U.S. PATENT DOCUMENTS

| | | | |
|---|---|---|---|
| 6,526,335 B1 * | 2/2003 | Treyz | G01C 21/26 307/10.1 |
| 7,904,219 B1 * | 3/2011 | Lowrey | G01C 21/26 701/32.3 |
| 8,370,464 B1 | 2/2013 | Chitilian et al. | |
| 8,560,161 B1 | 10/2013 | Kator et al. | |
| 8,648,700 B2 | 2/2014 | Gilbert | |
| 8,798,852 B1 * | 8/2014 | Chen | G06F 21/44 701/29.6 |

(Continued)

OTHER PUBLICATIONS

Peng, Ying, Ming Dong, and Ming Jian Zuo. "Current status of machine prognostics in condition-based maintenance: a review." The International Journal of Advanced Manufacturing Technology 50. 1-4 (2010): 297-313 (Year: 2010).*

(Continued)

*Primary Examiner* — Marissa Thein
*Assistant Examiner* — Michelle T Kringen
(74) *Attorney, Agent, or Firm* — Schwegman Lundberg & Woessner, P.A.

(57) ABSTRACT

Systems and methods to utilize smart components are described. The system receives a maintenance message from a mobile device at a network-based marketplace. The maintenance message includes part log information including a timestamp and characterization information. The characterization information is received by the mobile device from a component in a vehicle that includes a sensor that senses a first part that is assembled into the vehicle and generates the characterization information based on the sense of the sensor. The component communicates the characterization information to the mobile device that, in turn, communicates the maintenance message to network-based marketplace. The system identifies user profile information based on the maintenance message and stores the part log information in the user profile information at the network-based marketplace. The system compares the part log information with part maintenance information and receives a triggering event to initiate an electronic commerce activity.

20 Claims, 61 Drawing Sheets

(56) References Cited

U.S. PATENT DOCUMENTS

| | | | |
|---|---|---|---|
| 9,183,280 B2 | 11/2015 | Achuthan et al. | |
| 9,563,986 B2 | 2/2017 | Cattone | |
| 2004/0102272 A1* | 5/2004 | Calfa | F16H 7/1281 474/102 |
| 2005/0125117 A1 | 6/2005 | Breed et al. | |
| 2006/0122748 A1 | 6/2006 | Nou et al. | |
| 2006/0293813 A1 | 12/2006 | Nou et al. | |
| 2007/0100520 A1 | 5/2007 | Shah | |
| 2007/0174710 A1 | 7/2007 | Duan et al. | |
| 2008/0183574 A1 | 7/2008 | Nash et al. | |
| 2008/0262948 A1 | 10/2008 | Grady et al. | |
| 2008/0316006 A1 | 12/2008 | Bauman et al. | |
| 2009/0112394 A1* | 4/2009 | Lepejian | G07C 5/0808 701/29.5 |
| 2009/0265055 A1 | 10/2009 | Gillies | |
| 2009/0276115 A1 | 11/2009 | Chen et al. | |
| 2010/0022239 A1 | 1/2010 | Anzai et al. | |
| 2010/0292827 A1 | 11/2010 | Sievenpiper et al. | |
| 2012/0078745 A1 | 3/2012 | Han et al. | |
| 2012/0089474 A1 | 4/2012 | Xiao et al. | |
| 2012/0116800 A1 | 5/2012 | Mccallie et al. | |
| 2012/0143710 A1 | 6/2012 | Altschuler | |
| 2013/0110639 A1 | 5/2013 | So et al. | |
| 2013/0138656 A1 | 5/2013 | Wheaton | |
| 2014/0087760 A1* | 3/2014 | Bennett | H04W 4/21 455/456.3 |
| 2014/0091001 A1 | 4/2014 | Chan et al. | |
| 2014/0164164 A1 | 6/2014 | Rabenold et al. | |
| 2014/0208220 A1 | 7/2014 | Watal | |
| 2015/0012169 A1 | 1/2015 | Coard | |
| 2015/0066674 A1 | 3/2015 | Liu et al. | |
| 2015/0154711 A1 | 6/2015 | Christopulos et al. | |
| 2015/0163121 A1* | 6/2015 | Mahaffey | G06F 11/0766 707/687 |
| 2015/0170514 A1 | 6/2015 | Stenneth | |
| 2015/0241310 A1* | 8/2015 | Brown | G06F 17/18 702/179 |
| 2016/0092970 A1 | 3/2016 | Argue et al. | |
| 2016/0189114 A1 | 6/2016 | Cattone | |
| 2016/0189116 A1 | 6/2016 | Cattone | |
| 2016/0189259 A1 | 6/2016 | Cattone | |
| 2016/0189440 A1 | 6/2016 | Cattone | |
| 2017/0148234 A1 | 5/2017 | Cattone | |

OTHER PUBLICATIONS

"Car Repair Estimate Calculator", Autobytel, [Online]. Retrieved from the Internet: <URL: http://www.autobytel.com/mygarage/car-repair-estimate-calculator>, (accessed Oct. 4, 2014), 2 pgs.

"Carfax (company)", Wikipedia, [Online]. Retrieved from the Internet: <URL: http://en.wikipedia.org/wiki/Carfax>, (accessed Oct. 4, 2014), 1-4.

"Find Projects, How-tos and Experts' Advice Search Bar", DIY Network, [Online]. Retrieved from the Internet: <URL: http://www.diynetwork.com/home-improvement/index.html>, (accessed Oct. 4, 2014), 1-3.

"Repair Estimator Guide", Napa Autocare, [Online]. Retrieved from the Internet: <URL: http://www.napaautocare.com/estimator.aspx>, (accessed Oct. 4, 2014), 1 pg.

"Sensing & Inspection Technologies: Inspection Technologies Productivity through inspection solutions", General Electric Brochure, [Online]. Retrieved from the Internet: <URL: http://www.ge-mcs.com/en/inspection-technologies.html>, (2009), 19 pgs.

"Shipping & Handling Indicators", DryPak Industries, [Online]. Retrieved from the Internet: <URL: http://www.drypak.com/shippingHandlingIndicators.html>, (accessed Oct. 4, 2014), 2 pgs.

"Shock Sensors Prevent Damage to Fragile Goods: Impact Indicators", Shock Watch, [Online]. Retrieved from the Internet: <URL: http://shockwatch.com.au/shipping_and_handling_monitors/impact_indicators/impact_indicators.htm>, (accessed Oct. 4, 2014), 1-6.

Borcea, Cristian, "Is Your Car Talking With My Smart Phone? or Distributed Sensing and Computing in Mobile Networks", presented at Create-Net International Research Center, Stevens Institute of Technology, and University of South Florida, Retrieved from the Internet: <URL: http://cs.njit.edu/~borcea/talks.html>, (2008), 1-42.

Chaudhri, Rohit, et al., "Open Data Kit Sensors: Mobile Data Collection with Wired and Wireless Sensors", ACM DEV '12 Proceedings of the 2nd ACM Symposium on Computing for Development, Retrieved from the Internet: <URL: http://homes.cs.washington.edu/~rohitc/Publications_files/ODKSensors%20DEV%202012.pdf> , (2012), 1-10.

Glennon, John C., "Automobile Crash Event Data Recorder Downloading", Crash Forensics, [Online]. Retrieved from the Internet: <URL: http://www.crashforensics.com/automobiledatarecorders.cfm>, (accessed Oct. 4, 2014), 4 pgs.

Lane, Nicholas, et al., "A Survey of Mobile Phone Sensing", Communications Magazine, IEEE vol. 48, No. 9, Retrieved from the Internet: <URL: http://ieeexplore.ieee.org/xpl/login.jsp?tp=&arnumber=5560598&url=http%3A%2F%2Fieeexplore.ieee.org%2Fiel5%2F35%2F5560574%2F05560598.pdf%3Farnumber%3D5560598>, (Sep. 2010), 140-150.

Ramsey, Phil, "Changing Oil Preference—Synthetic vs. Mineral Oils", [Online]. Retrieved from the Internet: <URL: http://www.machinerylubrication.com/Read/660/changing-oil-synthetic>, (accessed Oct. 4, 2014), 3 pgs.

Setyono, A, et al., "Development of Mobile Streaming Application using Multimedia Messaging Service Technology for Supporting Mobile Telemedicine System", International Journal of Information and Electronics Engineering, vol. 2, No. 1, (Jan. 2012), 21-28.

Tatbul, Nesime, et al., "Window-Aware Load Shedding for Aggregation Queries over Data Streams", VLDB, [Online]. Retrieved from the Internet: <URL: www.vldb.org/conf/2006/p799-tatbutpdf >, (2006), 799-810.

Turner, Hamilton, et al., "Building Mobile Sensor Networks Using Smartphones and Web Services: Ramifications and Development Challenges (Chap. 33)", Handbook of Research on Mobility and Computing: Evolving Technologies and Ubiquitous Impacts, IGI Global, (Apr. 30, 2011), 502-521.

"U.S. Appl. No. 14/588,038, First Action Interview—Pre-Interview Communication dated Apr. 20, 2017", 10 pgs.

"U.S. Appl. No. 14/588,246, Non Final Office Action dated May 17, 2017", 24 pgs.

"U.S. Appl. No. 14/588,277, Examiner Interview Summary dated May 13, 2016", 3 pgs.

"U.S. Appl. No. 14/588,277, Final Office Action dated Jun. 3, 2016", 5 pgs.

"U.S. Appl. No. 14/588,277, Non Final Office Action dated Feb. 11, 2016", 10 pgs.

"U.S. Appl. No. 14/588,277, Response filed May 10, 2016 to Non Final Office Action dated Feb. 11, 2016", 16 pgs.

"U.S. Appl. No. 14/588,277, Examiner Interview Summary dated Aug. 29, 2016", 3 pgs.

"U.S. Appl. No. 14/588,277, Notice of Allowance dated Sep. 19, 2016", 7 pgs.

"U.S. Appl. No. 14/588,277, Response filed Sep. 6, 2016 to Final Office Action dated Jun. 3, 2016", 9 pgs.

"U.S. Appl. No. 15/425,753, Preliminary Amendment filed Feb. 24, 2017", 8 pgs.

Final Office Action received for U.S. Appl. No. 14/588,038, dated Nov. 15, 2017, 15 pages.

U.S. Appl. No. 14/588,038, First Action Interview—Office Action Summary dated Aug. 25, 2017, 10 pages.

U.S. Appl. No. 14/588,285, Response filed Dec. 14, 2017 to Pre-Interview Communication dated Oct. 2, 2017, 3 pages.

Response to First Action Interview filed on Aug. 18, 2017, for U.S. Appl. No. 14/588,038, dated Jul. 5, 2017 and dated Apr. 20, 2017, 29 pages.

Advisory Action received for U.S. Appl. No. 14/588,246, dated Jan. 11, 2018, 3 pages.

Final Office Action received for U.S. Appl. No. 14/588,246, dated Sep. 13, 2017, 28 pages.

Response to Final Office Action filed on Dec. 11, 2017 for U.S. Appl. No. 14/588,246, dated Sep. 13, 2017, 17 pages.

(56) References Cited

OTHER PUBLICATIONS

Response to Non-Final Office Action filed on Aug. 17, 2017 for U.S. Appl. No. 14/588,246, dated May 17, 2017, 18 pages.
First Action Interview—Office Action Summary received for U.S. Appl. No. 14/588,285, dated Feb. 27, 2018, 11 pages.
First Action Interview—Pre-Interview Communication received for U.S. Appl. No. 14/588,285, dated Oct. 2, 2017, 10 pages.
"U.S. Appl. No. 14/588,285, Final Office Action dated Oct. 19, 2018", 74 pgs.
"U.S. Appl. No. 14/588,246, Response filed Oct. 23, 2018 to Non Final Office Action dated Jul. 24, 2018", 21 pgs.
"U.S. Appl. No. 14/588,246, Final Office Action dated Nov. 5, 2018", 21 pgs.
"U.S. Appl. No. 14/588,285, Response Filed Dec. 18, 2018 to Final Office Action dated Oct. 19, 2018", 32 pgs.
"U.S. Appl. No. 14/588,038, First Action Interview—Office Action Summary dated Jul. 5, 2017", 17 pgs.
"U.S. Appl. No. 14/588,285 Response filed Jun. 27, 2018 to First Action Interview Office Summary dated Feb. 27, 2018", 29 pgs.
"U.S. Appl. No. 14/588,246, Non Final Office Action dated Jul. 24, 2018", 21 pgs.
Response to First Action Interview Pre-Interview communication filed on Apr. 1, 2019 for U.S. Appl. No. 15/425,753, dated Jan. 30, 2019, 3 pages.
First Action Interview—Pre-Interview Communication received for U.S. Appl. No. 15/425,753, dated Jan. 30, 2019, 16 pages.

* cited by examiner

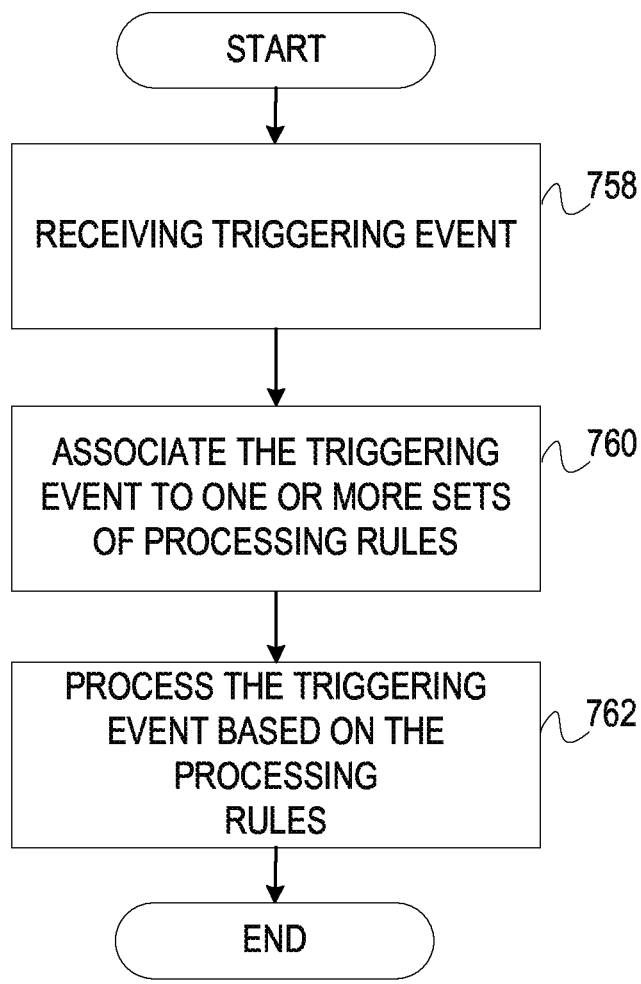

*FIG.8D* — 808

| Command | Input Parameters | Description |
|---|---|---|
| Add virtual part (VP) | Vehicle identifier<br>Part type identifier<br>Part identifier | Add VP |
| Delete VP | VP identifier | Delete VP |
| Configure VP | VP identifier<br>Preferred brand(s)<br>Alert (On/Off)<br>Timeout period | |
| Add token part (TP) | Vehicle identifier<br>Part type identifier<br>Part identifier | Add TP |
| Delete TP | TP identifier | Delete TP |
| Configure TP | TP identifier<br>Preferred brand(s)<br>Alert (On/Off)<br>Timeout period | |
| Change VP to TP | VP identifier | Change VP to TP |
| Search VP | Part type identifier or other criteria | Searches garage shelf information for virtual part |
| Search TP | Part type identifier or other criteria | Searches garage shelf information for token part |

ADD VIRTUAL PART

VEHILE IDENTIFIER: FORD, MUSTANG, 1967

PART TYPE: OIL FILTER

PART IDENTIFIER: 123456

PREFERED BRANDS: FRAM, NAPA

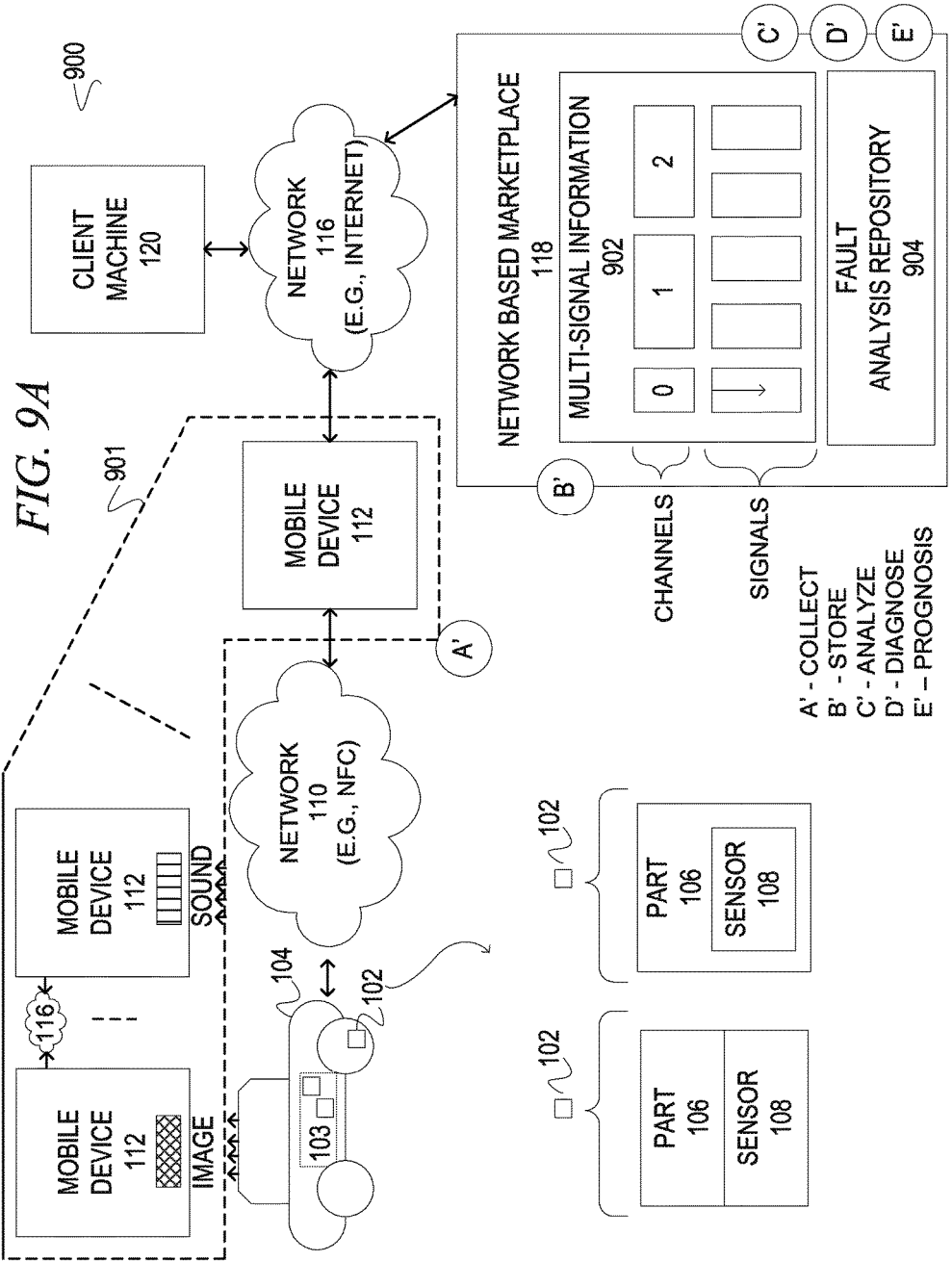

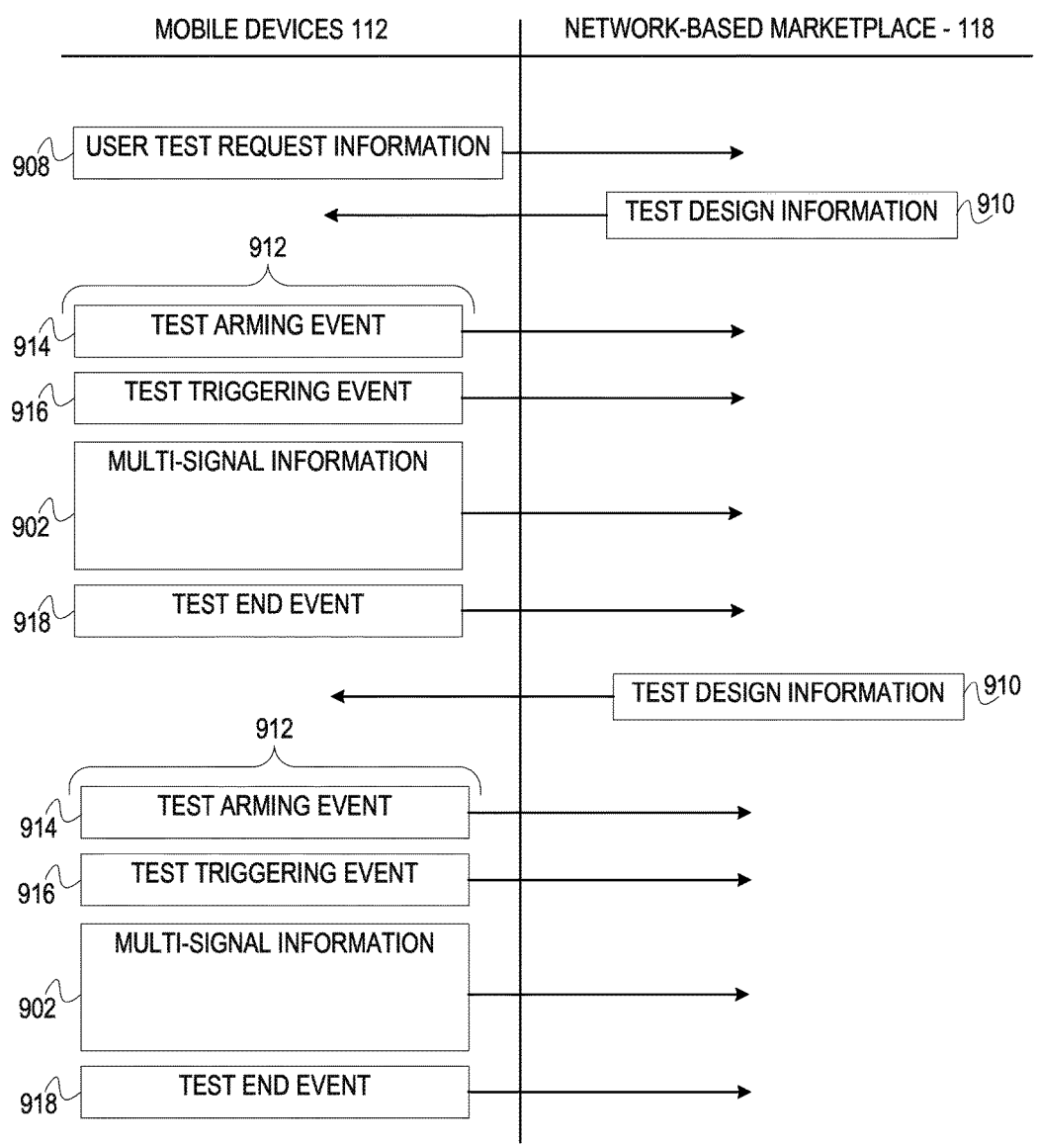

*FIG. 9J*    *FIG. 9K*    *FIG. 9L*
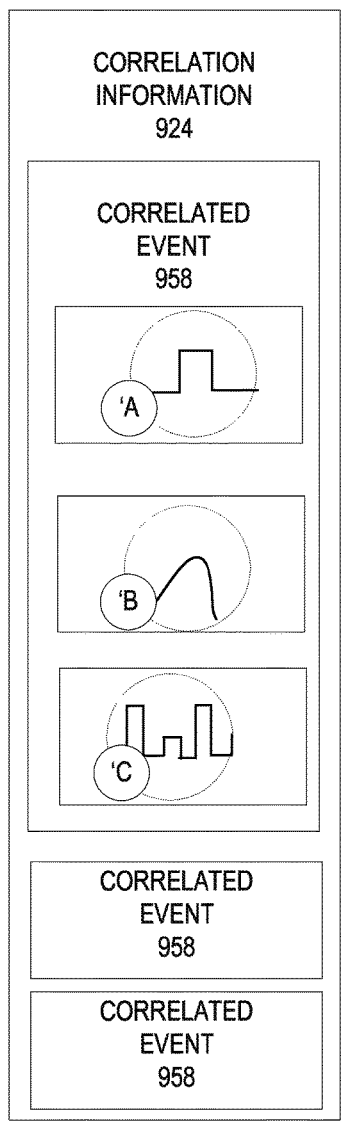
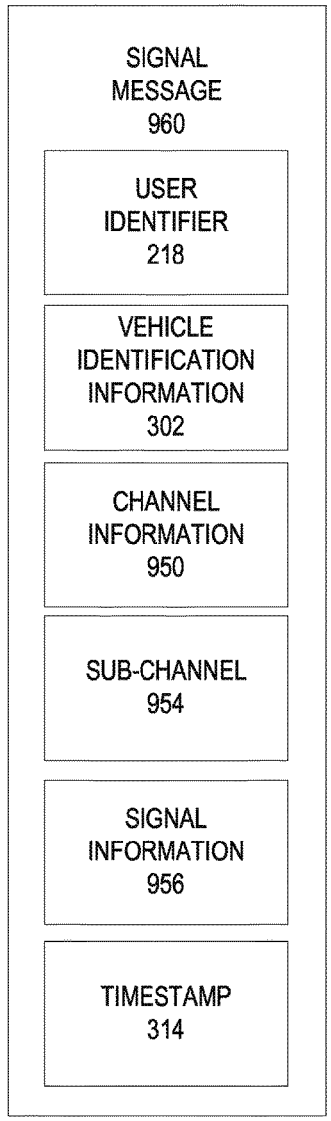
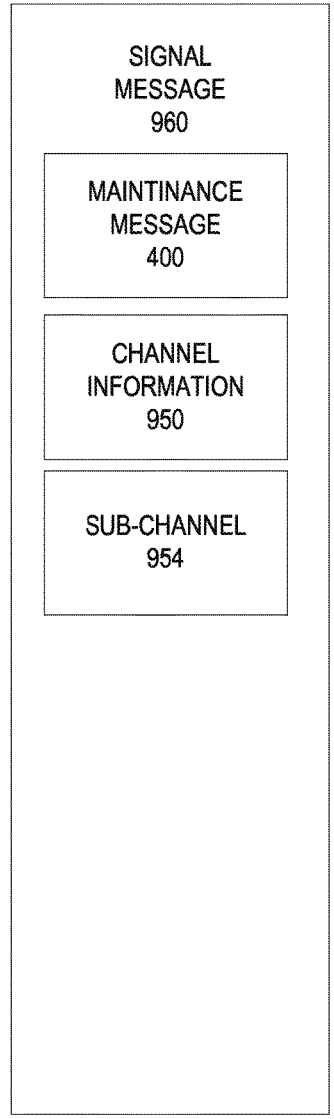

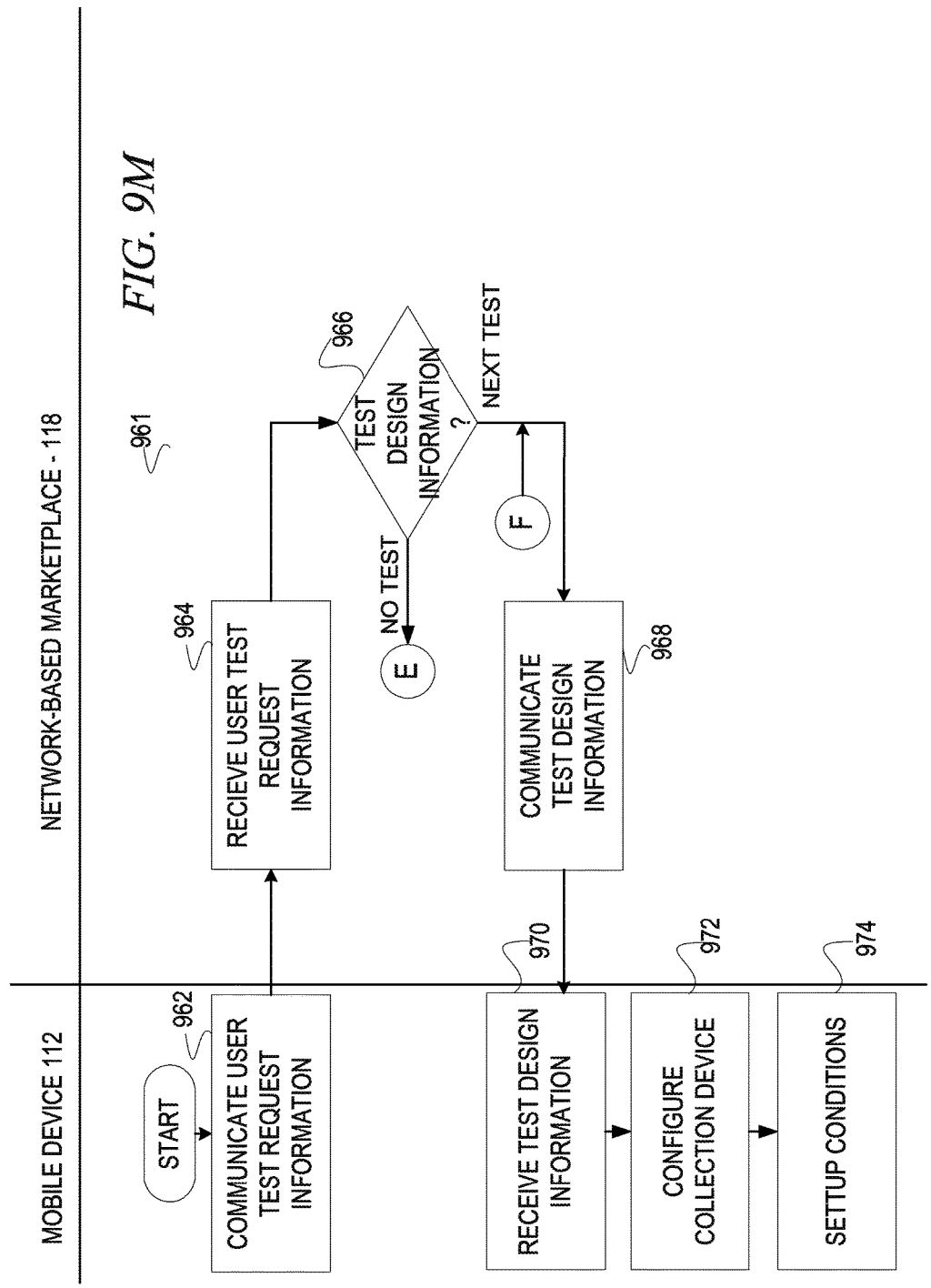

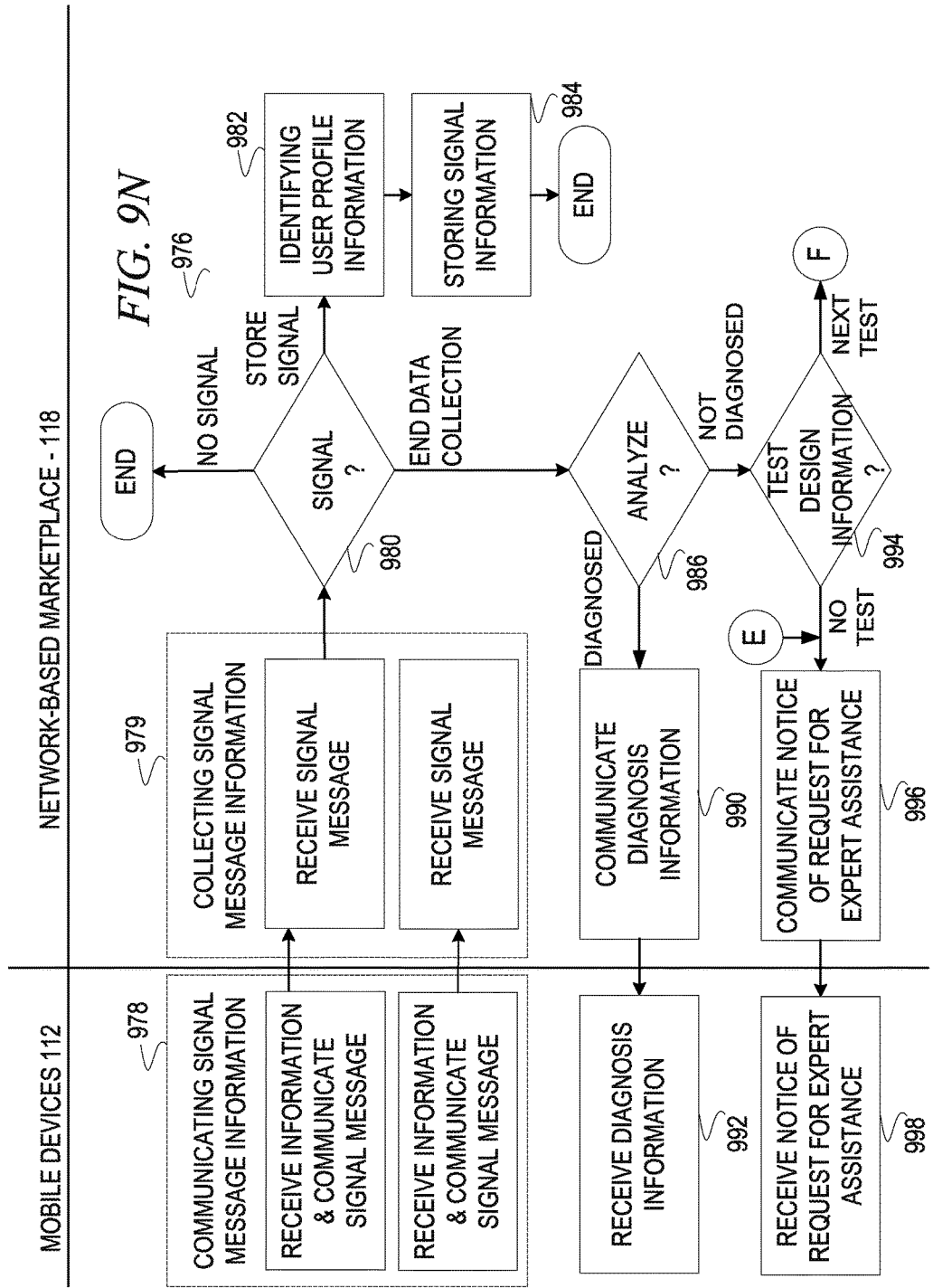

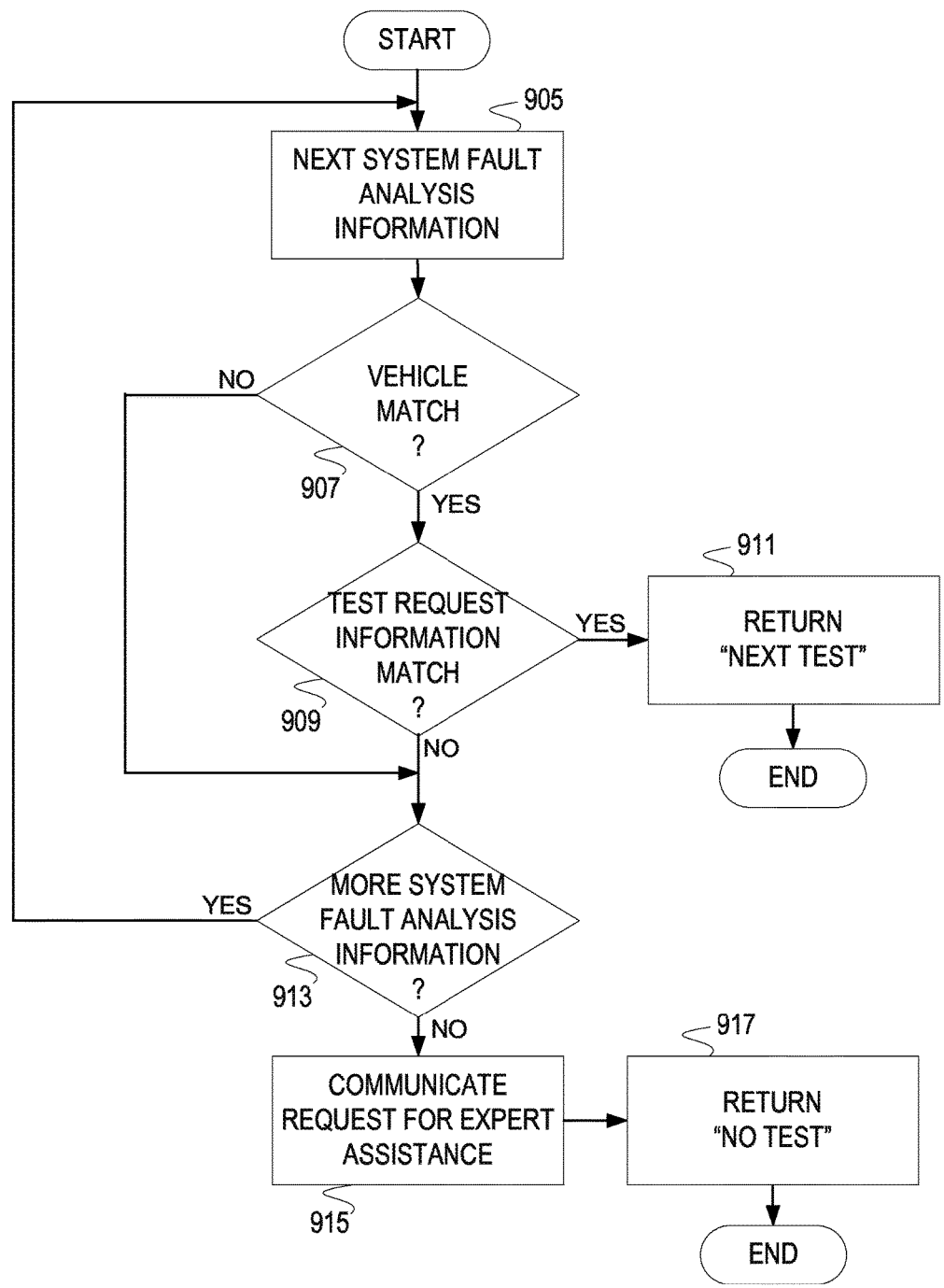

FIG. 10B
CONTEXT PANEL 1030

- MODEL: MUSTANG
- MAKE: FORD
- YEAR: 1967
- REPAIR: OIL FILTER CHANGE
- EXPERT INFORMATION: NOVICE
- PREFERNCE: FRAM

- SMART COMPONENT: YES
- SMART COMPONENT WEAR: 90%
- OEM AUTHENTIC: YES
- SERVICE LEVEL: REPLACE
- PART TYPE: OIL FILTER
- PART IDENTIFIER: 1234345

FIG. 10C
SHOPPING CART PANEL 1032

| ITEMS | | IN-STORE PICK-UP – 5MI. | |
|---|---|---|---|
| FRAM EXTRA GUARD OIL FILTER – PART NO. PH16 | $9.99 | NAPA AUTO PARTS | INFO |
| | | O'REILEYS | INFO |
| OTHER USER COMPARISION | | | |
| MOTORCRAFT OIL FILTER – PART NO. FL-820S | $8.78 | O'REILEYS | INFO |

FIG. 10Q

FEATURE ELEMENT INFORMATION 1070

FEATURE ELEMENT - 1072
(E.G., PARTICIPANT FEATURE)

FEATURE ELEMENT - 1072
(E.G., METADATA FEATURE)

FEATURE ELEMENT - 1072
(E.G., SEARCH FEATURE)

FEATURE ELEMENT - 1072
(E.G., ONLINE COLLABORATIVE WORKAREA FEATURE)

FEATURE ELEMENT - 1072
(E.G., TOOL FEATURE)

FEATURE ELEMENT - 1072
(E.G., DIALOGUE FEATURE)

FEATURE ELEMENT - 1072
(E.G., SHOPPING CART FEATURE)

FEATURE ELEMENT - 1072
(E.G., CONTEXT FEATURE)

FEATURE ELEMENT - 1072
(E.G., ADVERTISING FEATURE)

FEATURE ELEMENT - 1072
(E.G., PROMOTIONAL FEATURE)

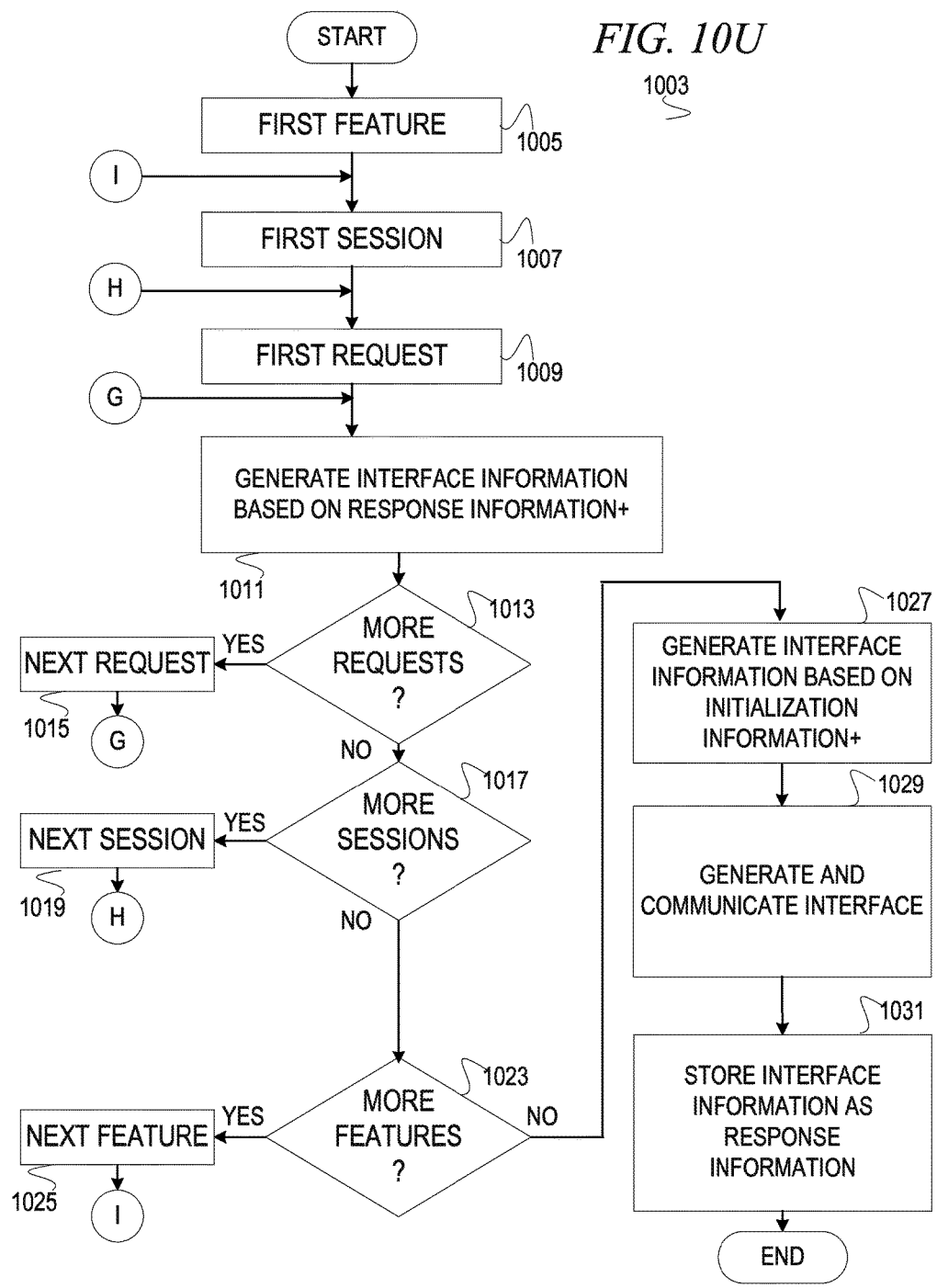

SYSTEMS AND METHODS TO UTILIZE SMART COMPONENTS

TECHNICAL FIELD

This disclosure relates to computing and data processing systems. More particularly, systems and methods to utilize smart components are described.

RELATED

Vehicle repair involves identifying parts that have failed, utilizing procedures or employing services to make a repair and economizing the costs that are often incurred to implement these activities. Today, most vehicle owners wait for a part to fail before considering the above described activities.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2014, All Rights Reserved.

BRIEF DESCRIPTION OF DRAWINGS

Various ones of the appended drawings merely illustrate example embodiments of the present invention and cannot be considered as limiting its scope.

FIG. 7H illustrates a method to utilize a smart component, according to an embodiment;

FIG. 8D illustrates garage shelf commands, according to an embodiment;

FIG. 9A illustrates a system for multi-signal fault analysis, according to an embodiment;

FIG. 9B illustrates a test protocol, according to an embodiment;

FIG. 9FF illustrates user test request information, according to an embodiment:

FIG. 9GG illustrates system test request information, according to an embodiment;

FIG. 9J illustrates correlation information, according to an embodiment;

FIG. 9K illustrates a signal message, according to an embodiment;

FIG. 9L illustrates a signal message, according to an embodiment;

FIG. 9M illustrates a method to process a test request, according to an embodiment;

FIG. 9N illustrates a method for multi-signal fault automated analysis, according to an embodiment;

FIG. 9O illustrates a method to identify test design information, according to an embodiment;

FIG. 10B illustrates a context panel, according to an embodiment;

FIG. 10C illustrates a shopping cart panel, according to an embodiment;

FIG. 10Q illustrates feature element information, according to an embodiment.

FIG. 10U illustrates a method, according to an embodiment, to process a request based on a context;

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of an embodiment of the inventive subject matter. It will be evident, however, to those skilled in the art that embodiments of the inventive subject matter may be practiced without these specific details. In general, well-known instruction instances, protocols, structures, and techniques have not been shown in detail.

Systems and Methods to Utilize Smart Components

Figure 1:
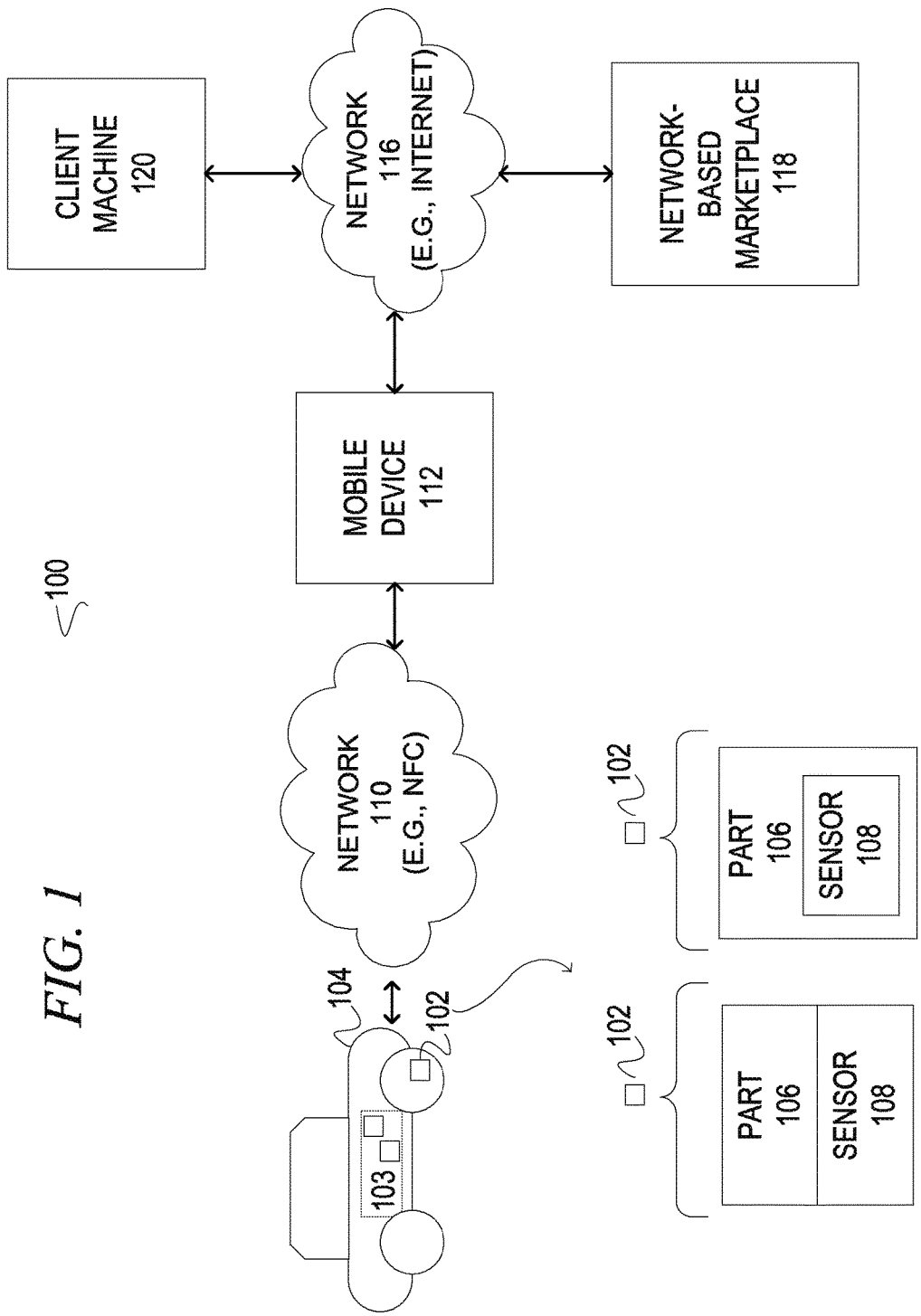
FIG. 1 illustrates a system to utilize smart components, according to an embodiment.

FIG. 1 illustrates a system 100, according to an embodiment, utilizing smart components 102. The system 100 may include a vehicle 104 that includes smart components 102 that are grouped into sub-systems 103 (e.g., chassis, engine, suspension, etc.). While the vehicle 104 is illustrated as an automobile, it will be appreciated that trucks, all-terrain vehicles, jeeps, aircraft, water-born vessels, space vessels, and the like may embody the illustrated vehicle 104. Each smart component 102 may include a part 106 and a sensor 108. Broadly, the smart component 102 may utilize the sensor 108 to sense the part 106 to receive information (e.g., a sense of the part) that is utilized by the smart component 102 to generate characterization information and communicate the characterization information (e.g., percentage wear) over a network 110 (e.g., nearfield communication (NFC)) to a mobile device 112 (e.g., smart phone. Apple iPhone, etc.) that, in turn, communicates a maintenance message that includes the characterization information over a network 116 (e.g., cellular, WiFi, Internet, telephone, etc., combinations thereof) to a network-based marketplace 118 that, in turn, stores the characterization information and other information and processes the characterization information to initiate electronic commerce activity. Merely for example, a smart component 102 in a Ford Mustang may include a sensor 108 for a brake pad that senses wear (e.g., ninety percent) for the brake-pad, the smart component 102 to generate the characterization information based on the sensing of the sensor and to communicate the characterization information over the network 110 (e.g., NFC) to an iPhone that, in turn, communicates the maintenance message over a network 116 (e.g., cellular and Internet) to a network-based marketplace 118 that, in turn, stores the characterization information in an electronic garage for the Ford Mustang in the user profile associated with the iPhone, identifies a service level for the brake-pad, and generates a triggering event that is processed to initiate electronic commerce activity. For example, the network-based marketplace 118 may identify one or more sets of processing rules based on the triggering event, and execute the one or more sets of processing rules to initiate electronic commerce and other related activities. In one embodiment, one set of processing rules may identify the location of the iPhone that originated the maintenance message to initiate electronic commerce activity. For example, if the location of the iPhone is identified to be in the vicinity of a brake shop, the network-based marketplace 118 may respond to the maintenance message by generating and sending a user interface to the iPhone that provides an estimated time for the brake shop to install the brake pad.

The smart components 102, network 110, mobile device 112, network 116, and network-based marketplace 118 are further described. Each smart component 102 may include a sensor 108 that senses an associated part 106. The smart component 102 may generate characterization information based on the sensing of the part 106 and communicate the characterization information that characterizes the current state of the part 106. For example, the characterization information may include performance information, percentage wear information, state information or the like. In accordance with one embodiment, the smart component 102 illustrated on the lower left of FIG. 1 is illustrated as including a part 106 that is adapted to receive a sensor 108 and the smart component 102 to its immediate right is manufactured to include the sensor 108. For example, the smart component 102 on the left includes a sensor 108 that is affixed to the part 106 as a subsequent assembly rather than being designed and manufactured as such (e.g., factory embedded). Smart components 102 may be manufactured and adapted for brake systems, filters, suspension systems, belts, bulbs sparks, batteries, tire walls, etc. Merely for example, smart components 102 for the brake system may sense and communicate characterization information for pads and rotors. Smart components 102 for filters may sense and communicate characterization information for oil filters, fuel filters and air filters. Smart components 102 for a suspension system may sense and communicate characterization information for springs, leafs and shocks. Sensors 108 may sense and report information that characterizes different aspects of the part 106. For example, a sensor 108 may characterize acceleration, separation, deformation, impact/shock, water/moisture, temperature, pressure, fluid flow, fluid levels or any other quantifiable natural phenomena. In the case of separation, a gap may be sensed between paired sensors 108 and characterized by one or both of the sensors 108. In the case of deformation, damage may be sensed on a part 106 in a package before the package is opened. Further in the case of deformation, one or more sensors 108 may sense and characterize vibration, bend, flex, strain, and weight.

The network 110 may be embodied as a wireless network, near frequency network (NFC), radio frequency network (e.g., RFID)) or some other type of network capable of supporting communication between a smart component 102 and the mobile device 112. The mobile device 112 may include a smart phone such as an iPhone, Nokia, or BlackBerry. Further, the mobile device 112 may utilize the Android mobile operating system to provide services described in this document. It will be appreciated by one having ordinary skill in the art that the Android mobile operating system is gaining public acceptance as an automotive operating system. The mobile device 112 may further include software in the form of an operating system (e.g., open or proprietary) and one or more applications (e.g., apps) that may be uploaded to the mobile device 112 to provide one or more functions that are described in this document. The network 116 may include a wireless network, near frequency network (NFC), radio frequency network (RFID), LAN, WAN, Internet, telephone, or any other type of network capable of supporting communication between the mobile device 112 and the network-based marketplace 118. In another embodiment, the mobile device 112 may include any paired device, such as Google Glass, a smartwatch, etc.

The network-based marketplace 118 may be an electronic marketplace for purchasing and selling items and services such as eBay of San Jose, Calif., "The Worlds Online Marketplace." The items sold or purchased on the network-based marketplace 118 may include the parts 106, the vehicle 104, and other items and services related to the parts 106 and vehicle 104. The network-based marketplace 118 supports electronic commerce services (e.g., search, browse, merchandise, expert services, etc.) to facilitate the replacement and repair of the parts 106 for the vehicle 104, as is described in this document. The client machine 120 may include a mobile device 112, desktop computer, laptop computer or any other device from which a user (e.g., buyer, seller, etc.) may access and utilize the services of the network-based marketplace 118.

Figure 2:
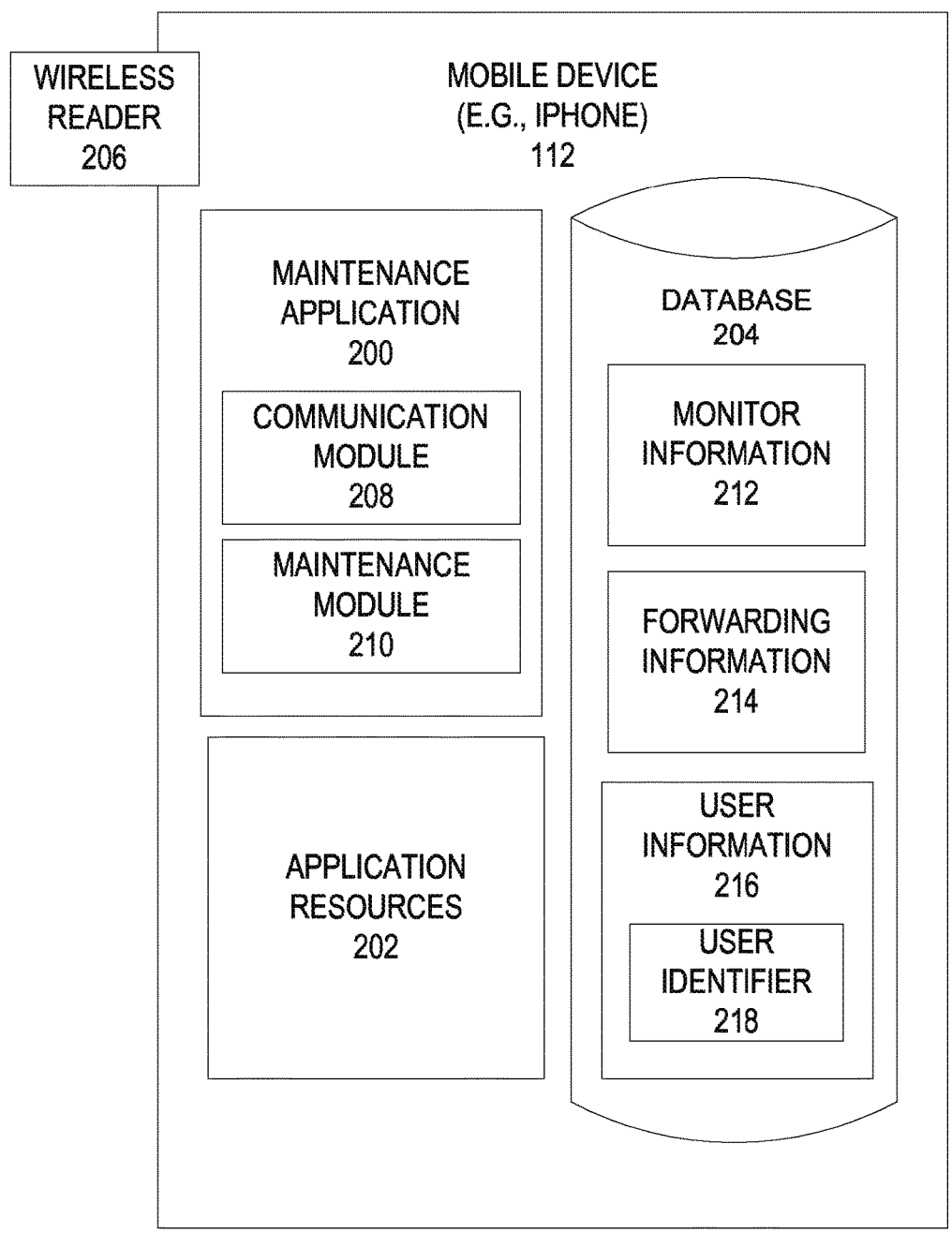
FIG. 2 illustrates a mobile device, according to an embodiment.

FIG. 2 illustrates a mobile device 112, according to an embodiment. The mobile device 112 may include a maintenance application 200, application resources 202, database 204 and a wireless reader 206. The maintenance application 200 may include a communication module 208, a maintenance module 210, and other apps (not shown) that may be loaded onto the mobile device 112. The communication module 208 may receive and communicate information. For example, the communication module 208 may receive commands from the operator of the mobile device 112 and information that originates from outside of the mobile device 112. The commands from the user may include a "system part scan" command to scan for smart components 102 in a vehicle 104 in the immediate vicinity of the mobile device 112, a "sub-system part scan" command to scan for smart components 102 in a sub-system (e.g., engine, chassis, brakes, etc.) of the vehicle 104, a "configure alerts" command to configure an alert that notifies the user of mobile device 112 (e.g., responsive to thresholds being exceeded), and other commands. For example, the user of the mobile device 112 may configure an audible, haptic or visual alert on the mobile device 112 responsive to an identification of a threshold being exceeded. In addition, mobile device 112 may be associated with a user profile on the network-based marketplace 118, and alerts may be configured to be communicated to any devices associated with the user profile such as the client machine 120, as described in this document. In addition, the communication module 208 may receive characterization information from smart components 102. For example, the characterization information may include performance information, a percentage wear, state information or the like, as previously described. The maintenance module 210 may process the commands and the characterization information received via the communication module 208. For example, the maintenance module 210 may update the database 204 with configuration information, cause the communication module 208 to send a command to the network-based marketplace 118 (as shown in FIG. 1), or timestamp characterization information that was reported by a smart component 102 with the current time before storing the characterization information in the database 204 and causing the communication module 208 to send a maintenance message to the network-based marketplace 118. The application resources 202 may include static bulk data definitions and other static content (e.g., bitmaps, layout definitions, user interface strings, animation instructions, etc.) that may be utilized by the maintenance application 200.

The database 204 may include monitor information 212, forwarding information 214, and user information 216. The monitor information 212 may store characterization information received from smart components 102 and metadata related to the characterization information. The forwarding information 214 may store information that describes other systems or network-entities that are utilized for processing related to smart components 102. For example, the forwarding information 214 may include one or more entries that correspond to one or more entries of user profile information on the network-based marketplace 118. For example, the forwarding information 214 may be utilized to identify other user profile information based on a vehicle 104 (e.g., via vehicle identification number (VIN), possibly in combination with a shared 'family' or 'sharing' code). The user information 216 may include information related to the user associated with the mobile device 112 including a user name, a user telephone number, and password for authentication by the network-based marketplace 118. Further, the user information 216 may include a user identifier 218 that uniquely identifies the user on the network-based marketplace 118. The wireless reader 206 may be attached to the mobile device 112 to receive the characterization information from the smart components 102.

Figure 3A:
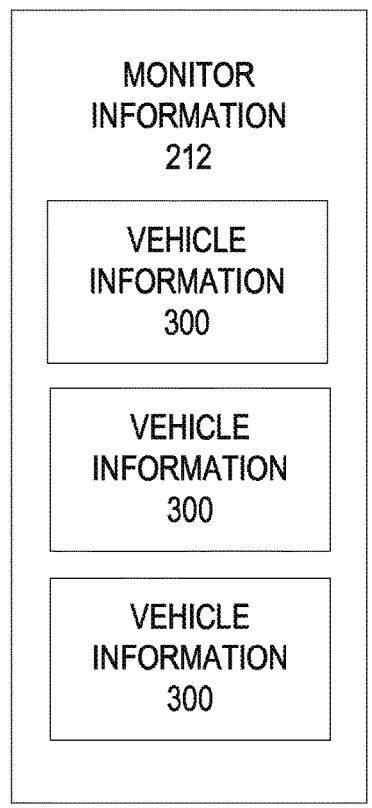
FIG. 3A illustrates monitor information, according to an embodiment.

FIG. 3A illustrates monitor information 212, according to an embodiment. The monitor information 212 may store information for vehicles 104. For example, a first entry of vehicle information 300 may store information for a Ford Mustang and a second entry of vehicle information 300 may store information for a Chevrolet Camaro. In one embodiment, an entry of vehicle information 300 may be automatically stored in the monitor information 212 responsive to receiving characterization information from a particular vehicle 104 for the first time. According to one embodiment, the vehicle information 300 may be stored in a provisional state until association with a particular vehicle 104 has been corroborated through repeated recognition over time and location, possibly in conjunction with other already-associated or reliably-coincidental signals.

Figure 3B:
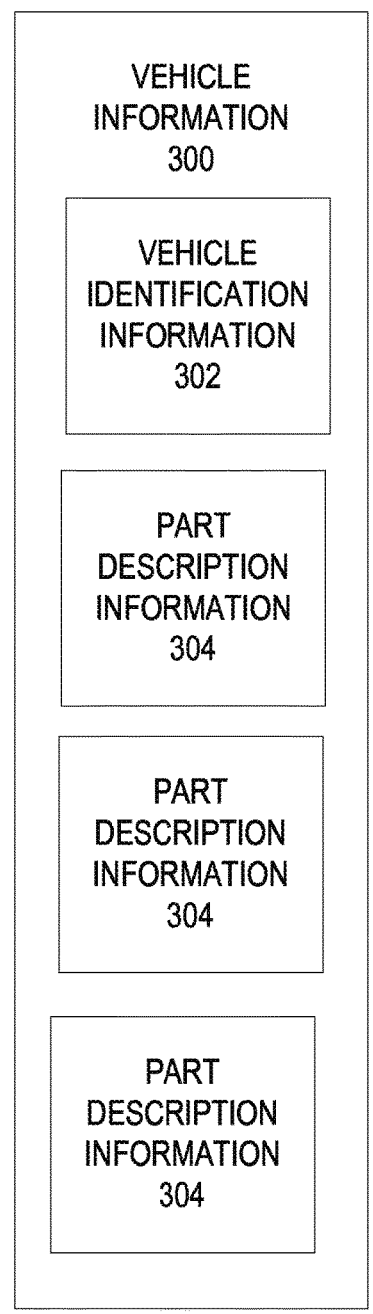
FIG. 3B illustrates vehicle information, according to an embodiment.

FIG. 3B illustrates vehicle information 300, according to an embodiment. The vehicle information 300 may store information for a vehicle 104. The vehicle information 300 may include vehicle identification information 302 that identifies a vehicle 104 and one or more entries of part description information 304 that describes part(s) 106 in the vehicle 104. The vehicle identification information 302 may include a vehicle identification number (VIN), make, model, and year for the vehicle 104. Each entry of part description information 304 corresponds to a part 106. In one embodiment, an entry of part description information 304 may be automatically stored in the vehicle information 300 responsive to receiving characterization information for a part 106 for the first time from the vehicle 104.

Figure 3C:
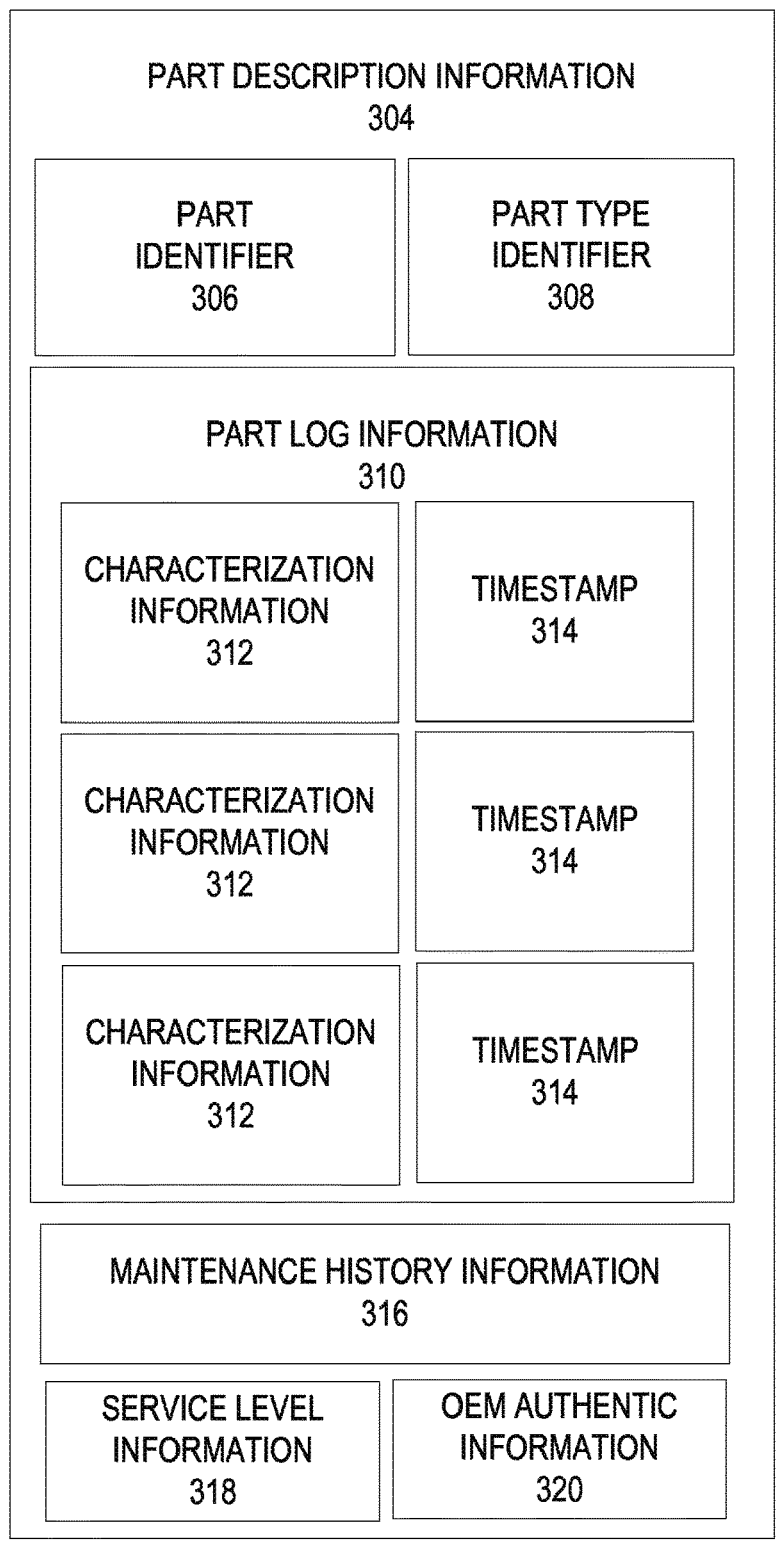
FIG. 3C illustrates part description information, according to an embodiment.

FIG. 3C illustrates part description information 304, according to an embodiment. The part description information 304 may include a part identifier 306, a part type identifier 308, part log information 310, maintenance history information 316, service level information 318, and original equipment manufacturer (OEM) authentic information 320. The part identifier 306 may include an alphanumeric identifier or some other identifier that uniquely identifies the part 106. In accordance with one embodiment, the part identifier 306 may include a range of part identifiers 306. The part identifier 306 may be assigned by a manufacturer or the network-based marketplace 118. The part identifier 306 may include a standard product identifier (e.g., Universal Product Code (UPC), Electronic Product Code (EPC), etc.). The part type identifier 308 may identify a part type (e.g., hose, filter, bulb, belt, etc.). A particular part type identifier 308 may be associated with one or more part identifiers 306. The part log information 310 may include one or more entries of characterization information 312 for the part 106. Each entry of characterization information 312 may be associated with a timestamp 314 that is generated by the mobile device 112 and stored with the corresponding characterization information 312 that is received from a smart component 102. In one embodiment, the part log information 310 may be embodied as a circular buffer with a size that is configurable. The characterization information 312 was previously described. The timestamp 314 may include the current time as identified by the mobile device 112 responsive to the mobile device 112 receiving the characterization information 312. In one embodiment, the mobile device 112 may receive characterization information 312 for a part 106 that signals a replacement of the part.

Responsive to receiving the characterization information 312, the mobile device 112 may purge an entry of part description information 304 for the part 106 that is being replaced from the vehicle information 300 and create an entry of part description information 304 in the vehicle information 300 for the part 106 that is new. The maintenance history information 316 may store a history for the part type identifier 308 and survive a replacement operation in conjunction with the part type identifier 308. The maintenance history information 316 may associate each replacement of the part 106 with a timestamp 314 that includes a date and time of replacement, an odometer reading sampled at the time of replacement, a percentage wear of the part 106 replaced (e.g., 80% wear), the manufacturer of the part 106, the part identifier 306 and other information.

The service level information 318 may store the current service level for the part 106. In one embodiment, four service levels may be defined including "OK," "SUGGEST," "WARN", and "REPLACE" in accordance with thresholds, as described later in this document. The first level, "OK," may be utilized to indicate no thresholds have been exceeded. The second level, "SUGGEST," may be utilized to indicate at least one threshold was exceeded causing the sending of an alert to the user that includes a suggestion. For example, the network-based marketplace 118 may send an alert to the user including a suggestion to repair or purchase a part 106. The third level, "WARN," may be utilized to indicate at least one threshold was exceeded causing the network-based marketplace 118 to send an alert to the user including a suggestion to repair or purchase a part 106 and a warning. For example, the alert may suggest to the user to repair or purchase a part 106 and warn the user that the current part 106 is in need of repair. The fourth level, "REPLACE," may be utilized to indicate at least one threshold was exceeded causing the sending of an alert to the user that includes a suggestion to repair or purchase a part 106 and an urgent warning. For example, the alert may suggest to the user to repair or purchase a part 106 urgently warn the user that the part 106 may fail because a likelihood of failure has exceeded a threshold (e.g., fifty-percent).

The OEM authentic information 320 may include a flag that is asserted to signify the part 106 is manufactured by an original equipment manufacturer (OEM) and not asserted to indicate otherwise (e.g., knockoff—authentication failed). For example, the OEM authentic information 320 may be updated based on characterization information 312 that is received from a smart component 102, the characterization information 312 including results from a test that is performed on the part 106 while it is in place in the vehicle 104. In one embodiment, the test may generate characterization information 312 that includes a part identifier 306 that, in turn, is compared with OEM tracking information stored at the network-based marketplace 118 to identify whether the part 106 in the smart component 102 was manufactured by any one of multiple manufacturers. According to one embodiment, the mobile device 112 may perform the comparison. According to one embodiment, the mobile device 112 or the network-based marketplace 118 may identify (indirectly or otherwise) a certifiable cryptographic public key that is used to decrypt parts of the characterization information 312 (e.g., dynamic) where identification of characterization information 312 that is not encrypted or cannot be decrypted based on the public key causes the mobile device 112 and/or network-based marketplace 118 to not assert the OEM authentic information 320 (e.g., the part 106 is fake because the fraudulent manufacturer does not possess the corresponding private key to encrypt the part type identifier 308 in the characterization information).

Figure 4A:
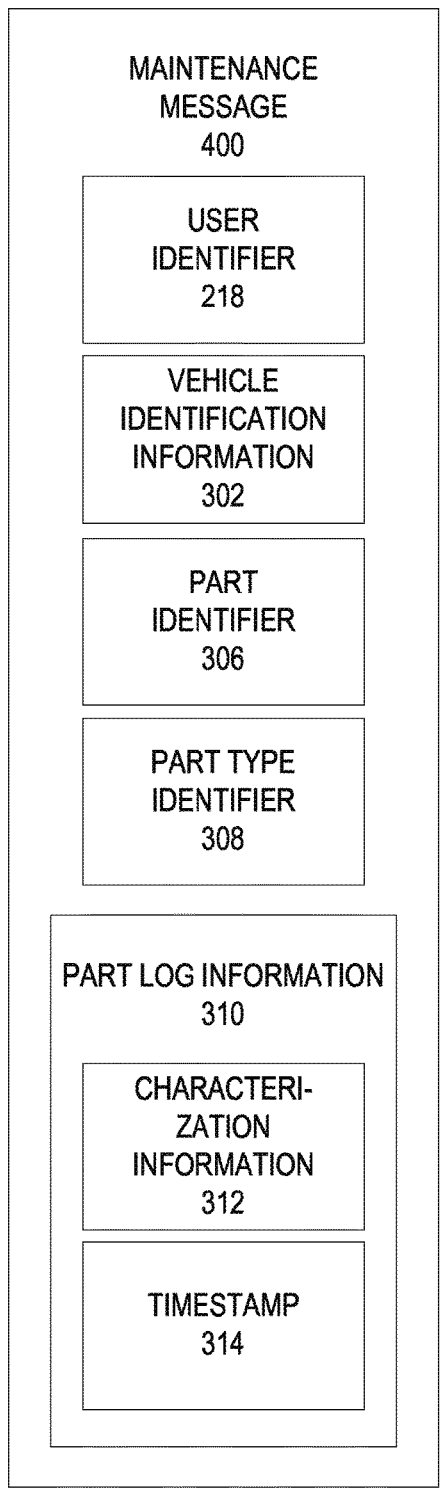
FIG. 4A illustrates a maintenance message, according to an embodiment.

FIG. 4A illustrates a maintenance message 400, according to an embodiment. The maintenance message 400 may be communicated by the mobile device 112 to the network-based marketplace 118. The maintenance message 400 may be sent by the mobile device 112 to the network-based marketplace 118 responsive to the mobile device 112 receiving characterization information 312 from a smart component 102. The maintenance message 400 may include the user identifier 218, vehicle identification information 302, part identifier 306, part type identifier 308, characterization information 312, and a timestamp 314, all as previously described. In other embodiments, the maintenance message 400 may include multiple entries of characterization information 312 respectively paired with timestamps 314.

Figure 4B:
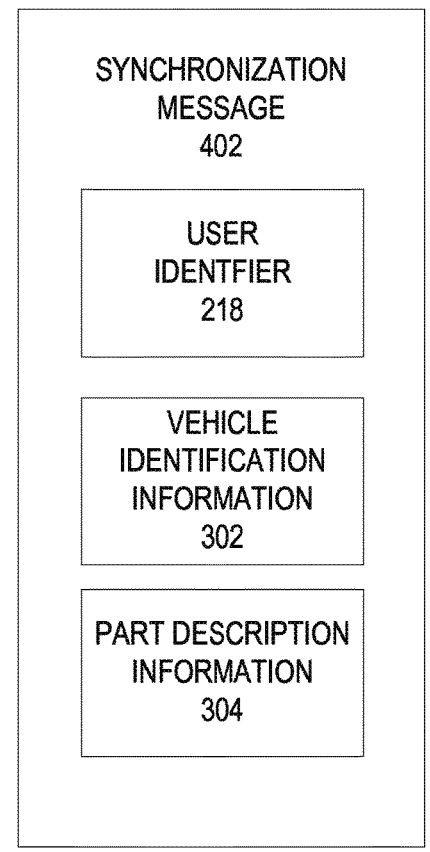
FIG. 4B illustrates a synchronization message, according to an embodiment.

FIG. 4B illustrates a synchronization message 402, according to an embodiment. The synchronization message 402 may be utilized by the mobile device 112 to synchronize the network-based marketplace 118 with the mobile device 112 in accordance with the information included in the synchronization message 402. The synchronization message 402 may include the user identifier 218, the vehicle identification information 302, and part description information 304, all as previously described. The synchronization message 402 may be utilized to synchronize the network-based marketplace 118 with the mobile device 112 with regard to a part 106. In other embodiments, the synchronization message 402 may include multiple entries of part description information 304 to synchronize the network-based marketplace 118 with the mobile device 112 with regard to a vehicle 104.

Figure 5:
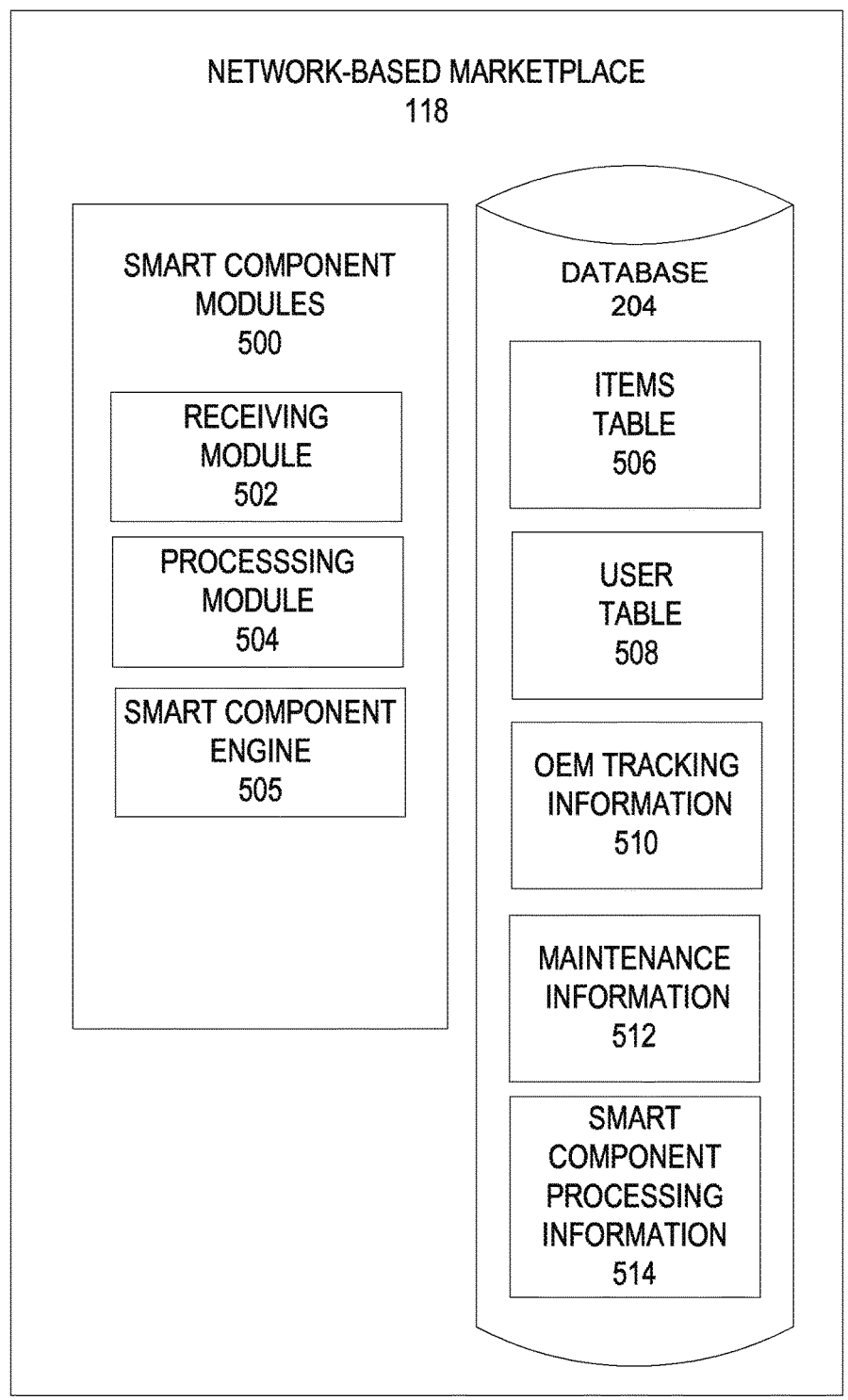
FIG. 5 illustrates a network-based marketplace, according to an embodiment.

FIG. 5 illustrates the network-based marketplace 118, according to an embodiment. The network-based marketplace 118 may include smart component modules 500 and a database 204. The smart component modules 500 may receive and process communications from the mobile device 112 and the network-based marketplace 118. The communications from the mobile device 112 may include the previously described maintenance message 400 and synchronization message 402. The communications from the network-based marketplace 118 may include triggering events that are generated by the network-based marketplace 118. The smart component modules 500 may include a receiving module 502, a processing module 504, and a smart component engine 505. The receiving module 502 may receive the communications and the processing module 504 may process the communications. In some instances, the processing module 504 may further generate a triggering event based on the communication and communicate the triggering event to the smart component engine 505 for further processing although other processes may generate and communicate a triggering event to the smart component engine 505. The database 204 may include an items table 506, a user table 508, original equipment manufacturing (OEM) tracking information 510, maintenance information 512, and smart component processing information 514. The items table 506 may include multiple entries of listings with each listing describing an item (e.g., part 106 or service) that is being offered for sale and/or for auction on the network-based marketplace 118. The user table 508 may include multiple entries of user profile information where each entry of user profile information may be utilized to describe a user (e.g., buyer, seller, both) on the network-based marketplace 118. The OEM tracking information 510 may be utilized by the network-based marketplace 118 to perform a validation on a part 106 to identify whether it is authentically supplied by a manufacturer. For example, the mobile device 112 may be used to scan a part identifier 306 and/or part type identifier 308 for a part 106 prior to installation in the vehicle 104 to authenticate whether the part 106 is supplied by a particular manufacturer. The maintenance information 512 may be utilized to identify and execute a maintenance policy responsive to identifying characterization information 312 or a time derivative of one or more entries of characterization information 312 as exceeding or dropping below a threshold. For example, traversing a threshold may cause an implementation of a maintenance policy by communicating one or more triggering events to the smart component engine 505. The smart component processing information 514 may be utilized to define triggering events that are received by the smart component engine 505, define processing rules that are executed by the smart component engine 505 responsive to receiving a triggering event, and define associations between the triggering events and the processing rules.

Figure 6A:
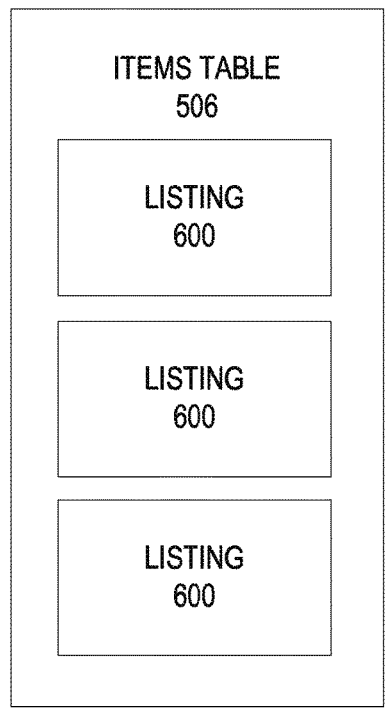
FIG. 6A illustrates an items table, according to an embodiment.

FIG. 6A illustrates the items table 506, according to an embodiment. The items table 506 may include entries of listings 600 that are published by sellers on the network-based marketplace 118.

Figure 6B:
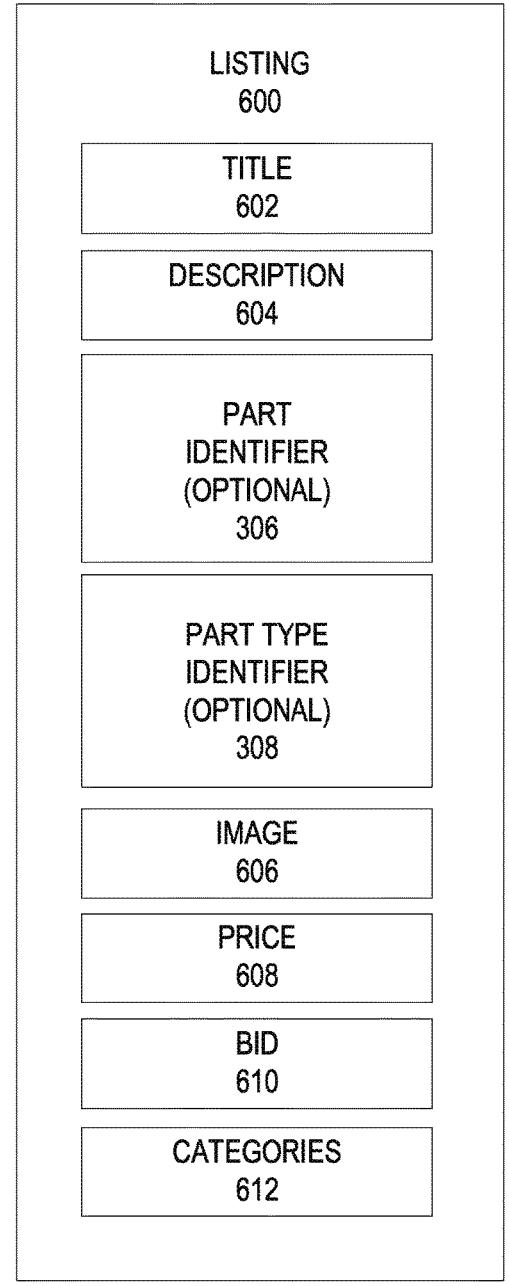
FIG. 6B illustrates a listing, according to an embodiment.

FIG. 6B illustrates the listing 600, according to an embodiment. The listing 600 may describe an item that is offered for sale on the network-based marketplace 118. The listing 600 may include a title 602, a part identifier 306 (optional), a part type identifier 308 (optional), a description 604, an image 606 of the item (e.g., part 106) that may be uploaded by the seller, a price 608 to purchase the item that may be configured by the seller, a bid 610 (e.g., the current highest bid for the item), one or more categories 612 which may be navigated to locate and view the listing 600. The title 602 may briefly describe the item and the description 604 may further describe the item. The title 602 and the description 604 may be received from the seller. The part identifier 306 may include a component/part identifier that identifies the part 106. The part identifier 306 may be assigned by a manufacturer. The part identifier 306 may include a global trade number (GTIN), a universal product code (UPC), a manufacture part number (MPN) or some other standard product identifier that identifies the item being described.

Figure 7A:
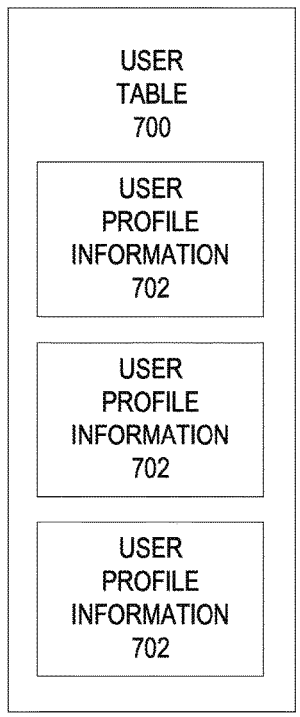
FIG. 7A illustrates a user table, according to an embodiment.

FIG. 7A illustrates a user table 700, according to an embodiment. The user table 700 may include multiple entries of user profile information 702 that respectively correspond to a user who utilizes the network-based marketplace 118 to buy and/or sell items (e.g., smart components 102, parts 106, sensors 108, etc.).

Figure 7B:
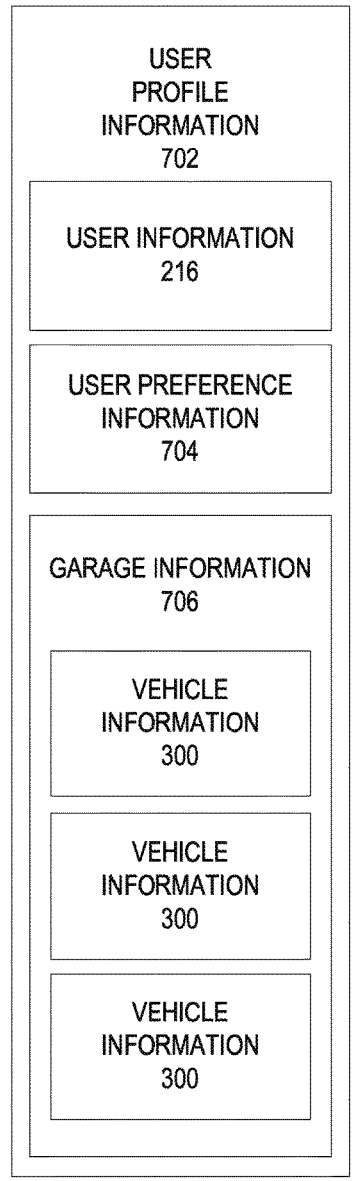
FIG. 7B illustrates user profile information, according to an embodiment.

FIG. 7B illustrates the user profile information 702, according to an embodiment. The user profile information 702 may include user information 216, user preference information 704, and garage information 706. The user information 216 may store the name, address, telephone number, and other information, as described in FIG. 7C. The user preference information 704 may store thresholds, values, and other preferences manually configured by the user or automatically configured based on behaviors or actions of the user. For example, the user preference information 704 may store preferences for a particular brand of parts 106 that were identified based on user behavior including purchases, search queries, browsing values and the like that implicated the brand of a part 106. The garage information 706 may store vehicle information 300 for vehicles 104 that are associated with the user. An entry of vehicle information 300 may be created or generated responsive to a manual configuration by the user. In addition, an entry of vehicle information 300 may be automatically created or generated responsive to receipt of a maintenance message 400 or synchronization message 402 based on the content of the respective message.

Figure 7C:
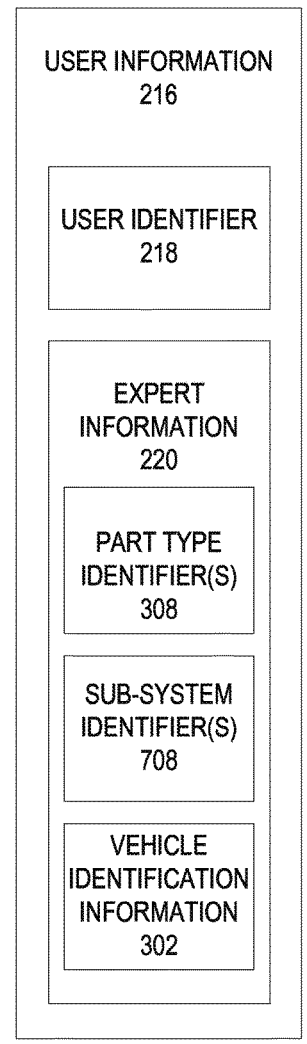
FIG. 7C illustrates user information, according to an embodiment.

FIG. 7C illustrates the user information 216, according to an embodiment. The user information 216 may include information that describes the user, as mentioned above, such as a user identifier 218 and expert information 220. The user identifier 218 may uniquely identify the user from other users on the network-based marketplace 118. The expert information 220 may include one or more part type identifiers 308, one or more sub-system identifiers 708, and vehicle identification information 302 that may identify one or more vehicles 104. For example, the expert information 220 may include an expertise level indicating the user has an ability to provide "expert" or "qualified" advice for a particular part 106, in a particular sub-system 103, in a particular vehicle 104, or some combination thereof. For example, the expertise level may indicate the user is a general expert who is qualified to provide advice for Fords by including vehicle identification information 302 that identifies Ford while specifying neither a part type identifier 308 nor a sub-system identifier 708. Further for example, the expertise level may indicate the user is an expert for a specific type of hoses, in an engine sub-system for Fords.

Figure 7D:
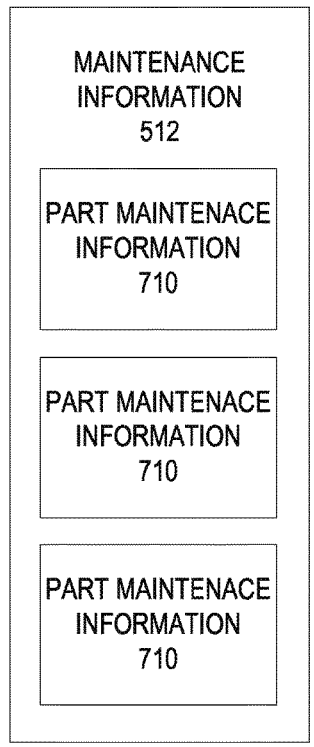
FIG. 7D illustrates maintenance information, according to an embodiment.

FIG. 7D illustrates maintenance information 512, according to an embodiment. The maintenance information 512 may be used to facilitate the maintenance of parts 106 on vehicles 104. The maintenance information 512 may include one or more entries of part maintenance information 710 that define thresholds and maintenance policies for a particular part(s) 106.

Figure 7E:
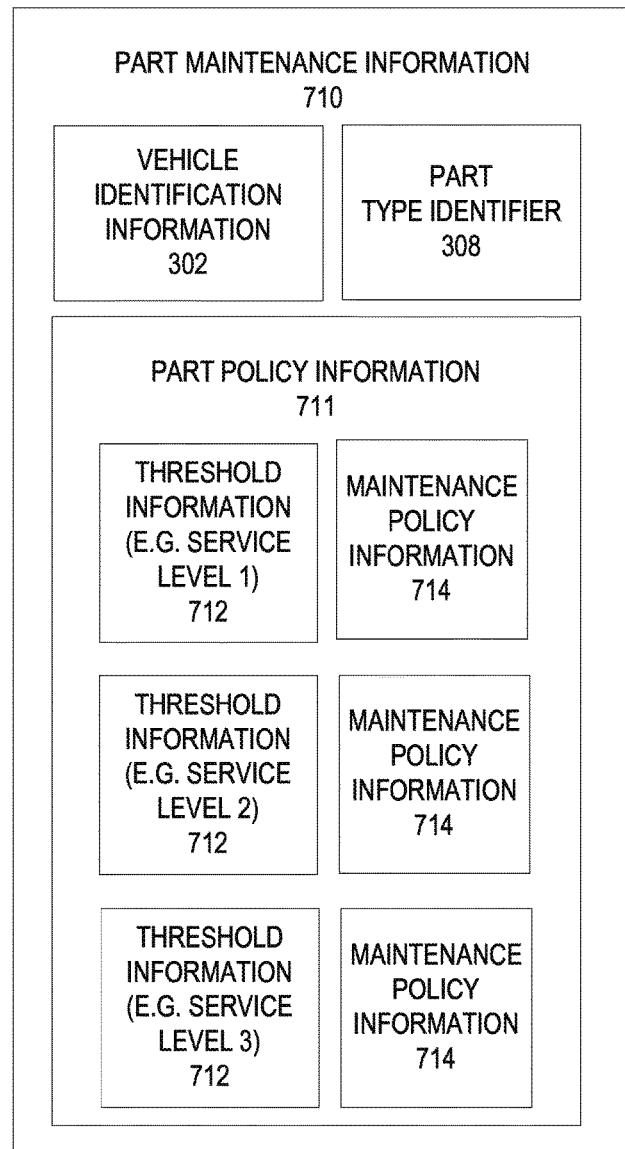
FIG. 7E illustrates part maintenance information, according to an embodiment.

FIG. 7E illustrates part maintenance information 710, according to an embodiment. The part maintenance information 710 may include vehicle identification information 302 that identifies a vehicle 104, the part type identifier 308 that identifies a type of a part 106 and part policy information 711. In some embodiments, the part maintenance information 710 may further include a part identifier 306. The part policy information 711 may include threshold information 712 that includes a threshold in association with maintenance policy information 714 that defines maintenance for the associated threshold. For example, the part log information 310 (FIG. 3C) for a smart component 102 may be processed to identify a computed value as exceeding threshold information 712 of 75% (e.g., Level 1) to cause the associated maintenance policy information 714 to be implemented. In one embodiment, the maintenance policy information 714 may include a triggering event that is communicated to the smart component engine 505 for processing (e.g., communicate alerts to mobile device 112). The part policy information 711 may include multiple levels of threshold information 712 paired with maintenance policy information 714 (e.g., "LEVEL 1," "LEVEL 2," "LEVEL 3"). For example, the levels may be graduated based on the level of wear (e.g., 75%—"SUGGEST," 85% —"WARN," 95%—"REPLACE").

Figure 7F:
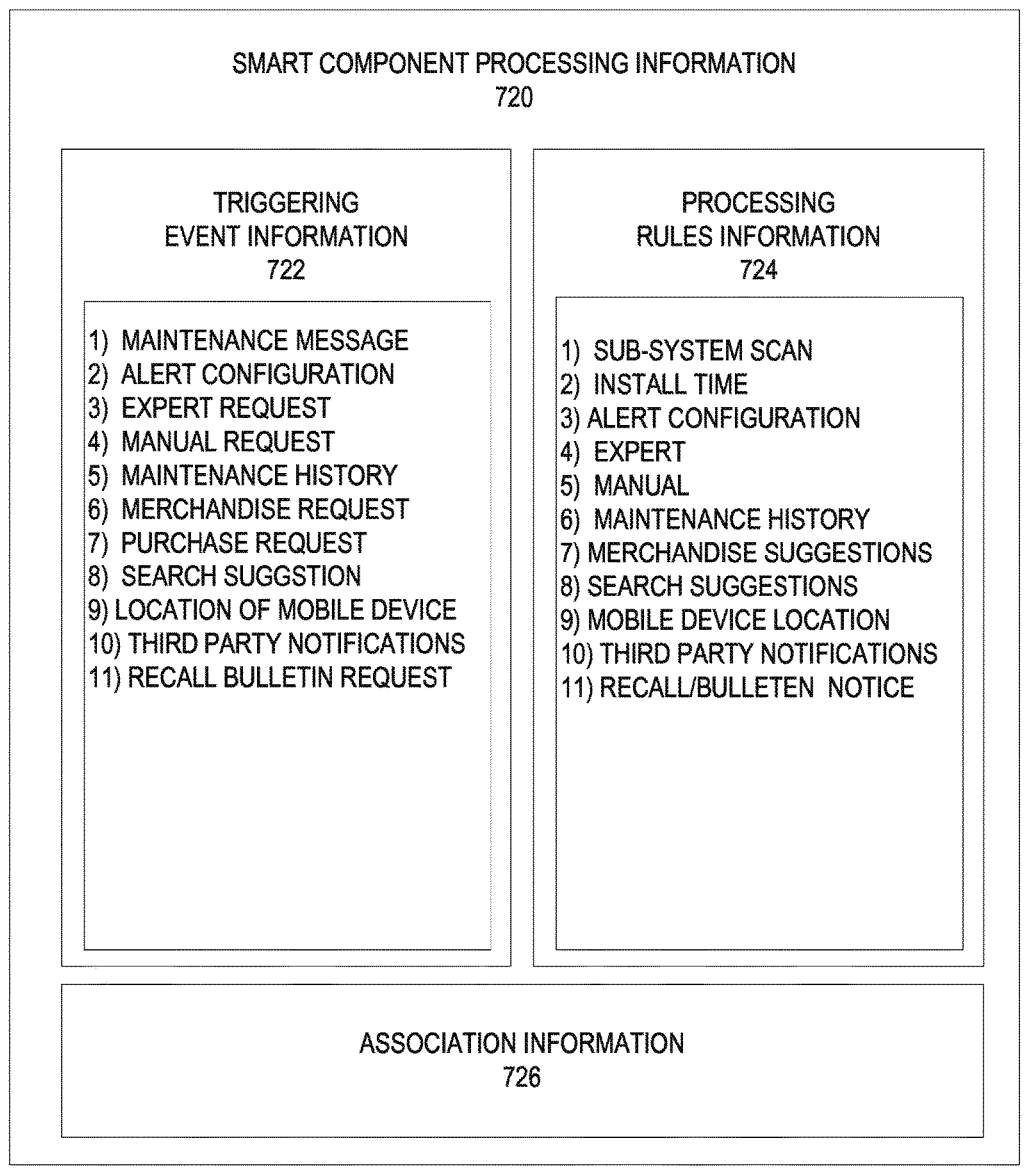
FIG. 7F illustrates smart component processing information, according to an embodiment.

FIG. 7F illustrates smart component processing information 720, according to an embodiment. The smart component processing information 720 may include triggering event information 722 that defines triggering events, processing rules information 724 that includes sets of processing rules, and association information 726 to associate each triggering event to one or more sets of processing rules. The smart component processing information 720 may be utilized by the smart component engine 505 to associate a triggering event with one or more sets of processing rules based on the association information 726, load the one or more sets of processing rules into the smart component engine 505 and execute the one or more sets of processing rules.

Maintenance Message Triggering Event

The triggering event information 722 may include a maintenance message triggering event. The maintenance message triggering event may be communicated by the processing module 504 to the smart component engine 505 responsive to receipt of the maintenance message 400 at the network-based marketplace 118. Recall that the mobile device 112 may receive characterization information 312 from a smart component 102 (e.g., part 106 and sensor 108), the mobile device 112, in turn, communicating a maintenance message 400, including the characterization information 312, to the network-based marketplace 118 including the processing module 504 that, in turn, processes the maintenance message 400 to communicate the maintenance message triggering event to the smart component engine 505. For example, the processing module 504 may process the maintenance message 400 for the part 106 (e.g., engine hose) to identify a new service level (e.g., "REPLACE," "WARN," "SUGGEST") in the service level information 318 for the part 106. Further, the association information 726 may be utilized by the smart component engine 505 to associate the maintenance message triggering event with sub-system scan rules, and install time processing rules, according to one embodiment. According to another embodiment, additional or fewer sets of processing rules may be associated with the maintenance message triggering event. The sub-system processing rules may be executed by the smart component engine 505 to identify a service level (e.g., "REPLACE," "WARN," "SUGGEST") other than "OK" in the service level information 318 for the part 106. If a service level other than "OK" is identified then the sub-system processing rules may further be executed to identify a sub-system that includes the part 106, and communicate a message to the mobile device 112 that causes the mobile device 112 to scan all of the smart components 102 in the identified sub-system. For example, an engine hose in an engine that is identified with a service level other than "OK" may be identified by the smart component engine 505 that causes a message to be communicated to the mobile device 112 that causes the mobile device 112 to scan all the parts 106 in the identified engine sub-system. In one embodiment, related sub-systems may be scanned responsive to identification of a service level other than "OK" for a part 106. In one embodiment, the scan of the sub-system is not performed if the engine-sub system or the entire vehicle 104 was scanned in a predetermined period of time (e.g., five minutes) prior to receipt of the maintenance message 400 by the network-based marketplace 118. In one embodiment the period of time may be configured. In another embodiment, a part scan, sub-system part scan, or vehicle part scan may optionally or automatically be delayed to enable the car to warm up, or otherwise reach a stable operating condition.

The install time processing rules may be utilized by the smart component engine 505 to identify a service level (e.g., "REPLACE," "WARN," "SUGGEST") other than "OK" in the service level information 318 for the part 106. If a service level other than "OK" is identified the sub-system processing rules may further be executed to generate an estimated replacement time for the part 106, and communicate an alert to the mobile device 112 that includes the replacement time. In one embodiment, the replacement time may be computed based on the location of the mobile device 112. For example, responsive to the smart component engine 505 identifying the mobile device 112 as being located in a geographic circle that includes the garage of the user, the smart component engine 505 may compute the replacement time for the part 106 based on the assumption that the user is performing the replacement and the competence level of the user. Further, for example, responsive to the smart component engine 505 identifying the mobile device 112 as being located within a geographic circle that includes a vehicle repair shop, the smart component engine 505 may compute the replacement time based on the competence level of the repair shop. In one embodiment, the center of the circle is the location of the mobile device 112 and the radius of the circle is a predetermined length. In one embodiment the length of the radius may be configured. In another embodiment, a geographic area may further include an irregular region or set of regions that are determined from navigation route information, calculated travel paths between common destinations (e.g., home-to-work), or historical location information (with or without respect to any specific travel path).

Alert Configuration Triggering Event

The triggering event information 722 may include an alert configuration triggering event. The alert configuration triggering event may be communicated by the mobile device 112 or client machine 120 to the smart component engine 505, via the network-based marketplace 118, responsive to receipt of one or more selections at the respective mobile device 112 or client machine 120. The alert configuration triggering event may include configuration information that is used to configure threshold information 712 and maintenance policy information 714 for a particular part 106. The association information 726 may be utilized by the smart component engine 505 to associate the alert configuration triggering event with the alert configuration processing rules that, in turn, are executed by the smart component engine 505 to receive the configuration information, process the configuration information to generate the threshold information 712 and maintenance policy information 714, store the threshold information 712 in the part policy information 711 that is identified for the part 106, and store the maintenance policy information 714 in the part policy information 711 that is identified for the part 106.

Expert Request Triggering Event

The triggering event information 722 may include an expert request triggering event. The expert request triggering event may be sent by the mobile device 112 or client machine 120 to the smart component engine 505, via the network-based marketplace 118, responsive to receipt of a selection at the respective mobile device 112 or client machine 120. The expert request triggering event may include a part type identifier 308 and/or sub-system identifier 708 and/or vehicle identification information 302. The association information 726 may be utilized by the smart component engine 505 to associate the expert request triggering event with the alert expert processing rules that, in turn, are executed by the smart component engine 505 to identify experts in the user information 216 based on the expert information 220. For example, the smart component engine 505 may execute the alert expert processing rules to identify experts in the user information 216 by matching the part type identifier 308 and/or sub-system identifier 708 and/or vehicle identification information 302 in the expert request triggering event with the expert information 220 in the user information 216 and communicating the results back to the respective mobile device 112 or client machine 120 that initiated the request.

Manual Request Triggering Event

The triggering event information 722 may include a manual request triggering event. The manual request triggering event may be sent by the mobile device 112 or client machine 120 via the network-based marketplace 118, in response to receipt of a selection at the respective mobile device 112 or client machine 120. For example, a user who is operating his mobile device 112 may be attempting to replace a part 106 in his vehicle 104 in his garage at home and make a selection on his mobile device 112 to request a manual to repair a particular part 106. The manual request triggering event may include a part identifier 306 and/or, a part type identifier 308 and/or sub-system identifier 708 and/or vehicle identification information 302. The association information 726 may be utilized by the smart component engine 505 to associate the manual request triggering event with the manual processing rules which are executed by the smart component engine 505 to identify and communicate the appropriate manual(s) to the mobile device 112 or client machine 120.

Maintenance History Triggering Event

The triggering event information 722 may include a maintenance history triggering event. The maintenance history triggering event may be sent by the mobile device 112 or client machine 120 to the smart component engine 505, at the network-based marketplace 118, responsive to receipt of a selection at the mobile device 112 of the client machine 120. For example, a user who is operating his mobile device 112 may want to know the maintenance history of one or more parts 106 in his vehicle 104 and make one or more selections on his mobile device 112 which causes the mobile device 112 to communicate the maintenance history triggering event to the network-based marketplace 118. The maintenance history triggering event may include a part identifier 306 and/or, a part type identifier 308 and/or sub-system identifier 708 and/or vehicle identification information 302. The association information 726 may be used by the smart component engine 505 to associate the maintenance history triggering event with the maintenance history processing rules which, in turn, are executed by the smart component engine 505 to retrieve one or more entries of maintenance history information 316 from the corresponding entries part description information 304 for one or more parts 106, parts 106 included in one or more sub-systems and parts 106 included in one or more vehicles 104 and to communicate the maintenance history information 316 that was retrieved to the mobile device 112 or client machine 120.

Merchandise Request Triggering Event

The triggering event information 722 may include an entry for a merchandise request triggering event. The merchandise request triggering event may be sent by a process in the network-based marketplace 118 to the smart component engine 505 responsive to an identification of a presentation of merchandising information. For example, a user who is operating his mobile device 112 or the client machine 120 may be targeted for a presentation of merchandising information (e.g., presentation of purchase opportunities) that is updated or modified by the smart component engine 505 to include purchase opportunities for parts 106 that are identified by the smart component engine 505. Responsive to receipt of the merchandise request triggering event, the smart component engine 505 may utilize the association information 726 to associate the merchandise request triggering event with the merchandise suggestion processing rules which, in turn, are executed by the smart component engine 505 to identify service level information 318 in the vehicle information 300 of the garage information 706 that is associated with the user of the mobile device 112 or client machine 120. Responsive to identifying service level information 318 that is not "OK" (e.g., "SUGGEST," "WARN," "REPLACE") for parts 106 of vehicles 104 in the garage information 706 at the network-based marketplace 118, the smart component engine 505 may utilize the associated maintenance history information 316 to modify the merchandising information. For example, the smart component engine 505 may identify parts 106 with service level information 318 that are not "OK" and modify the merchandising information to include merchandising content for one or more of the identified parts 106 where the merchandising content is modified to include buying opportunities for the identified parts 106 that are filtered according to the brands that are preferred by the user as determined by the corresponding maintenance history information 316. For example, the smart component engine 505 may modify merchandising content to push unsolicited content to a user, realize an intra-purchase opportunity with a suggestion (e.g., "Do you also need X" or "Other users often purchase Y" or "Purchase Z at the same time and save XX %"), realize a post-purchase opportunity with a suggestion (e.g., "You might also like"). For example, the smart component engine 505 may modify merchandising content to present a wish list of parts 106 and send alerts to any device associated with the current user (e.g., another device on which the user is running and signed-into a marketplace-connected app) (e.g., any device that has been indirectly associated with the user's profile—for example, given an operating system or environment in which the user profile information 702 is associated with a cloud account).

Purchase Request Triggering Event

The triggering event information 722 may include an entry for a purchase request triggering event. The purchase request triggering event may be sent by a process in the network-based marketplace 118 to the smart component engine 505 responsive to an identification of a presentation of merchandising information at the time of purchase. The purchase request triggering event operates similar to the merchandise request triggering event.

Search Suggestion Triggering Event

The triggering event information 722 may include an entry for a search suggestion triggering event. The search suggestion triggering event may be sent by a process in the network-based marketplace 118 to the smart component engine 505 responsive to an identification of a user entering a query from a mobile device 112 or the client machine 120. In one embodiment, an input box that receives a query from the user may include a drop-down box immediately below the input box. The drop-down box may contain search suggestions that may be selected by the user to overwrite the current query. Responsive to receiving a search suggestion triggering event, the smart component engine 505 may utilize the association information 726 to associate the search suggestion triggering event to search suggestions processing rules that, when executed by the smart component engine 505, identify parts 106 with service level information 318 that is not "OK" (e.g., "SUGGEST," "WARN," "REPLACE") for vehicles 104 in the garage information 706 or the user, and modify the search suggestions in the drop-down box to include search suggestions that target the identified parts 106. For example, the smart component engine 505 may modify the search suggestions to include categories, brands, performance characteristics, and compatibility attributes based on the identified parts 106.

Location of Mobile Device Triggering Event

The triggering event information 722 may include an entry for a location of mobile device triggering event. The location of mobile device triggering event may be sent by a scheduling process in the network-based marketplace 118 to the smart component engine 505 responsive to the expiration of a mobile device timer. The mobile device triggering event may be sent to identify the location of the mobile device 112 and initiate ecommerce activity. In one embodiment, the mobile device timer may be reinitialized with a predetermined timeout of five minutes each time the triggering event is processed. In one embodiment, the predetermined timeout may be configured by a user. Responsive to receiving a location of mobile device triggering event, the smart component engine 505 may utilize the association information 726 to associate the mobile device triggering event with mobile device location rules that, when executed by the smart component engine 505, identify the current location of the mobile device 112, identify parts 106 with service level information 318 that is, respectively not "OK" (e.g., "SUGGEST," "WARN," "REPLACE") for vehicles 104 in the garage information 706 of the user associated with a particular mobile device 112, identify whether the current location of the mobile device 112 is within a geographic area (e.g., geographic circle) that includes a facility that may repair the identified part(s) 106, identify a wait time for the facility to perform the service, identify an estimated repair time to repair the part 106, communicate a message to the mobile device 112 that prompts the user of the opportunity to repair the part 106 at the facility including an estimated wait time for the facility to perform the service and an estimated repair time for the facility to repair the part 106, and initialize the mobile device timer with the predetermined timeout. In one embodiment, the center of the circle is the location of the mobile device 112 and the radius of the circle is a predetermined length from the location of the mobile device 112. In one embodiment the length of the radius may be configured.

Third Party Notification Triggering Event

The triggering event information 722 may include an entry for a third party notification triggering event. Information may be communicated to a third party responsive to receiving this event. Responsive to receiving a third party triggering event, the smart component engine 505 may utilize the association information 726 to associate the third party notification triggering event with third party triggering event rules that, when executed by the smart component engine 505, generate third party information and communicate the third party information, over a network (e.g., network 116), to a third party (e.g., fleet management). For example, the third party information may include service level information 318 for a part 106, maintenance history information 316 for a part 106, or any other information for a part 106, subsystem 103, or vehicle 104.

Recall/Bulletin Triggering Event

The triggering event information 722 may include an entry for recall/bulletin triggering event. A recall/bulletin for one or more parts 106 may be communicated to the mobile device 112 or client machine 120 responsive to receiving a request from one of these devices for such information. Responsive to receiving a recall/bulletin triggering event, the smart component engine 505 may utilize the association information 726 to associate the recall/bulletin triggering event with recall/bulletin rules that, when executed by the smart component engine 505 cause the smart component engine 505 to identify garage information 706 associated with a user associated with the client machine 120 or mobile device 112, identify one or more entries of vehicle information 300 in the garage information 706 associated with the user, identify part type identifiers 308 in the respective vehicle information 300 for which recall/bulletins have been published, and communicate the recall/bulletins to the mobile device 112 or client machine 120.

Figure 7G:
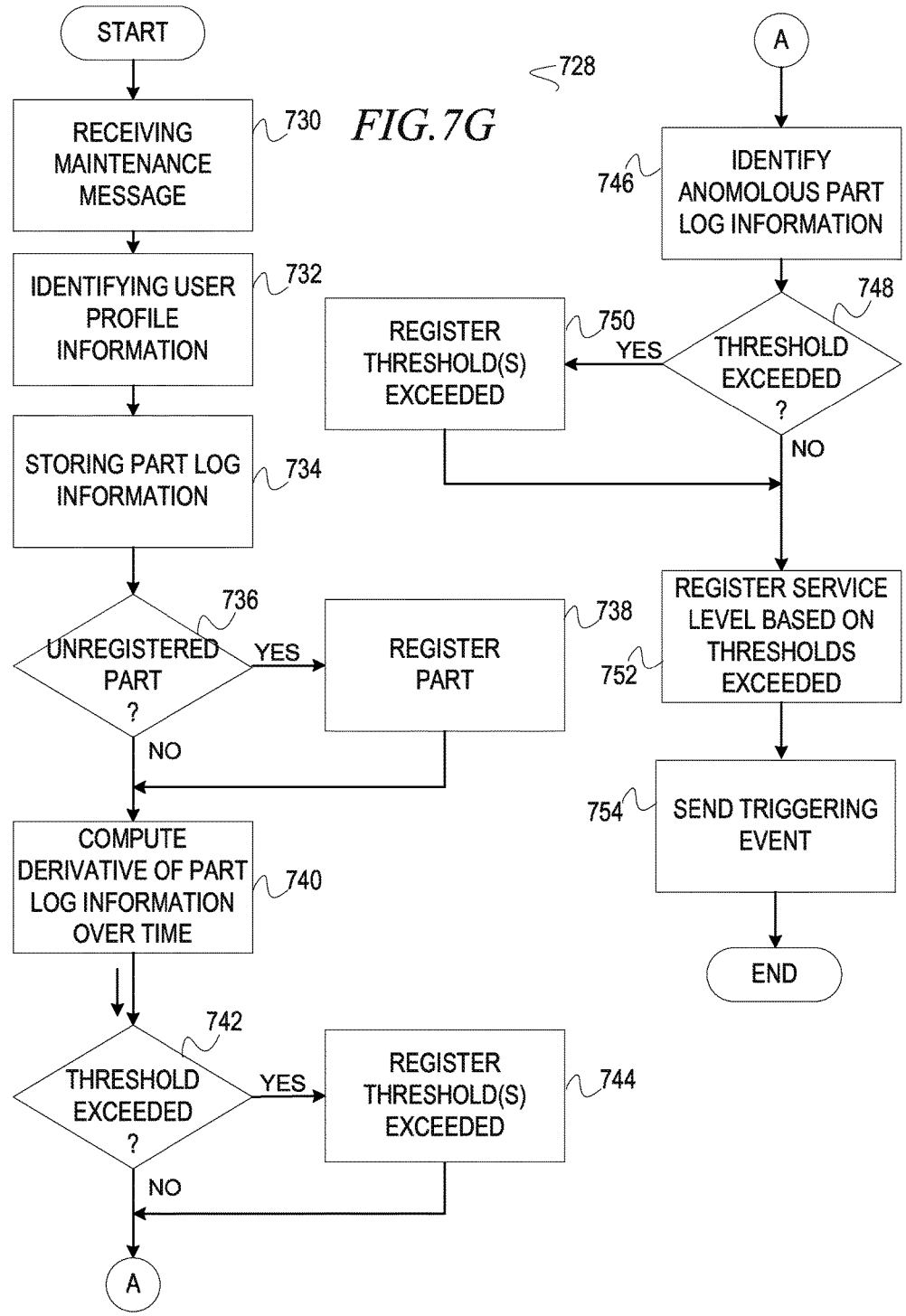
FIG. 7G illustrates a method to utilize a smart component, according to an embodiment.

FIG. 7G illustrates a method 728 to utilize smart components, according to an embodiment. The method 728 may commence at operation 730, at the network-based marketplace 118, with the receiving module 502 receiving a maintenance message 400 from a mobile device 112. For example, the mobile device 112 may have received a selection to execute a part scan, sub-system scan part scan, or a vehicle scan for a vehicle 104. Responsive to execution of one of the aforementioned scans, the mobile device may receive characterization information 312 from a smart component 102 on the vehicle 104 and communicate a maintenance message 400 including the characterization information 312 and timestamp 314 to the network-based marketplace 118.

At operation 732, the processing module 504 may identify the user profile information 702 in the user table 700 based on the maintenance message 400.

At operation 734, the processing module 504 may store the characterization information 312 and the timestamp 314 as part log information 310 in the appropriate part description information 304 (e.g., part 106). For example, the processing module 504 may identify the vehicle information 300 in the garage information 706 in the user profile information 702 based on the vehicle identification information 302 in the maintenance message 400. In addition, the processing module 504 may identify the appropriate part description information 304 in the identified vehicle information 300 based on the part identifier 306 or part type identifier 308 in the maintenance message 400. Finally, the processing module 504 may copy the characterization information 312 and the timestamp 314 from the maintenance message 400 to next available location in the part log information 310 in the identified part description information 304. In one embodiment, the processing module 504 may create the vehicle information 300 in the garage information 706 responsive to receipt of the maintenance message 400.

At decision operation 736, the processing module 504 may identify whether a part 106 has not previously been registered in the garage information 706. For example, a part 106 that is not registered in the garage information 706 may include replacing a part 106 that is old with a part 106 that is new for a particular part type identifier 308. If the part identifier 306 in the maintenance message 400 is not found in the garage information 706 then processing continues at operation 738. Otherwise, processing continues at operation 740.

At operation 738, the processing module performs multiple steps to register the part 106. First, the processing module 504 may identify an existing part 106 in the garage information 706 with a part type identifier 308 that matches the part type identifier 308 in the maintenance message 400. If found, the processing module 504 may utilize the existing entry by overwriting the part identifier 306 that is old with the part identifier 306 that is new. Otherwise, the processing module 504 may create a new entry of part description information 304 in the vehicle information 300. Second, the processing module 504 may update the maintenance history information 316 for the part type identifier 308 by recording an entry chronicling the replacement of the part 106 that is old with the part 106 that is new. For example, the brand names of the two parts 106, the part identifiers 306, the part type identifier 308, the current date, odometer reading, vehicle identification information 302, and part log information 310 for the part 106 that is old may be stored in the maintenance history information 316. Third, the part identifier 306 for the part 106 that is being registered may be compared with the part identifiers 306 in the OEM tracking information. If a match is found, then the part 106 is validated as an authentic OEM part. Otherwise the part is not validated as an authentic OEM part. In either instance, at operation 738, the processing module 504 may store the appropriate status in the OEM authentic information 320 in the part description information 304 for the part 106 and communicate the status to the associated client machine 120 or mobile device 112. Fourth, the processing module 504 may communicate a recall/bulletin triggering event to the smart component engine 505 to identify whether recall/bulletin notices are available for the part 106 and, responsive to such an identification communicate an alert to the mobile device 112 or client machine 120 that includes a notice of the recall/bulleting for the part 106.

At operation 740, the processing module 504 may compute a derivative of part log information 310 over time. The processing module 504 may compute multiple derivatives of the part log information 310 including a first-derivative to generate first-derivative information (e.g., a simple change over time (e.g., the average wear rate)), a second derivative to generate second derivative information (e.g., an acceleration over time (e.g., the rate at which the rate is changing—acceleration may indicate partial failure, failure in related parts, conditions exceeding some 'elastic' threshold, etc.)), and/or a third derivative to generate third derivative information (e.g., a 'jerk'—the rate at which the acceleration is changing—a sudden 'jerk' possibly indicating a catastrophic failure or other transient but significant change not following the 'usual' degradation). For example, processing module 504 may generate first-derivative information for an aggregate often entries of characterization information 312. The quantity of time may be computed by subtracting a timestamp 314 associated with the first entry (e.g., earliest) in the aggregate from the timestamp 314 associated with the last entry (e.g., latest) in the aggregate. Further, the quantity of wear may be computed by subtracting the characterization information 312 associated with the first entry (e.g., earliest) in the aggregate from the characterization information 312 associated with the last entry in the aggregate. Further, where the first-derivative is computed by dividing the quantity of wear by the quantity of time and, optionally, by smoothing the resulting derivative.

At decision operation 742, the processing module 504 may compare the first derivative information and/or the second derivative information and/or the third derivative information with respective threshold information 712 in the part maintenance information 710 associated with the part type identifier 308 to identify whether a threshold has been exceeded. If a threshold is exceeded then processing continues at operation 744. Otherwise, processing continues at operation 746. In one embodiment, the threshold may be calculated dynamically at the time operation 742 is executed by the processing module 504. At operation 744, the processing module 504, may register the one or more thresholds that have been exceeded.

At operation 746, the processing module 504 may interrogate the part log information 310 to identify anomalous part log information 310. The processing module 504 may identify anomalous part log information 310 in many different ways. For some part types (e.g., part type identifier(s) 308), the processing module 504 may expect the part log information 310 to represent a discrete approximation or sampling of a continuous set whose ideal trend is expected to progress in one direction, after accounting for measurement noise due to sensor 108 and extreme environmental conditions. For example, brake wear is ideally expected to trend smoothly from 0% to 100% wear. In this instance it is reasonable to apply averaging or outlier elimination to obtain a more accurate approximation of actual wear level. Consequently, a single anomalous reading may not be considered actionable. In contrast, other parts 106 may supply measurements that result in part log information 310 that is largely uncorrelated to other measurements except in very close temporal proximity. For example, the part log information 310 for boost pressure is expected to vary rapidly with no intrinsic trend. While for some measurement error is still expected, a single reading that falls out of expected range by more than some value can indicate a gasket failure, blowoff malfunction, etc. The processing module 504 may evaluate these measurements individually for such characteristics. According to another embodiment the processing module 504 may evaluate the part log information 310 for boost pressure relative to a continuous function derived from other contemporaneous readings such as throttle, engine speed, gear ratio, etc. Yet according to another embodiment, the processing module 504 may identify sequences or combinations of individually-valid values that are recognized as aberrant when evaluated together (e.g., correlation of simultaneous or sequential signals vs. covariance models). For an example of a sequence of values that might be recognized as aberrant, consider a leaf spring capable of reporting the apparent load on the spring as determined by the degree of deformation. Values may range freely between some well-known extremes, but are expected to maintain a constant average given a constant load. While the vehicle 104 is in motion, deflections in the spring should return (via damped motion) to a reasonable and stable center-point. If an extreme (but normal) inflection returns to a stable center significantly different than the center prior to the inflection, it may be an indication that a crack in the leaf spring has reduced the ability of the spring to hold a load. For an example of a sequence of values that might be recognized as aberrant, when correlated to other values, consider deflection/compression measurements as reported by brake calipers. If a hydraulic line is faulty, one caliper may experience considerably less deflection than the opposed caliper, even though both deflection measurements are individually within tolerance. Similarly, various signals could be correlated with those from related smart components 102, with engine speed, etc. . . . . In one embodiment, the processing module 504 may identify the lack or unexpected rate of appearance of an expected signal. For example, if a previously-recorded sensor 108 fails to report a signal altogether, the processing module 504 may determine the part 106 has failed catastrophically, but may more plausibly be a signal that the sensor 108 itself has failed, or the part 106 was replaced.

At decision operation 748, the processing module 504 may compare the anomalies in the part log information 310 with threshold information 712 in the part maintenance information 710, as described above, to identify whether any thresholds have been exceeded. If a threshold is exceeded, then processing continues at operation 750. Otherwise, processing continues at operation 752. In another embodiment, the processing module 504 may branch to operation 750 based on an identification of one or more anomalies without making a comparison with the threshold information 712. At operation 750, the processing module 504, may register threshold(s) that have been exceeded. In another embodiment, the processing module 504 may register one or more anomalies that were identified notwithstanding the threshold information 712.

At operation 752, the processing module 504, may register the service level (e.g., "OK," "SUGGEST," "WARN," "REPLACE") for the part 106 in the service level information 318. For example, the processing module 504 may generate the service level based on identifying the one or more thresholds that were registered as exceeded in operations 744 and 750. In one embodiment, the processing module 504 may identify the service level based on one or more thresholds that have been exceeded as registered in operation 744 and/or based on the identification anomalous part log information 310.

At operation 754, the processing module 504 may send a triggering event to the smart component engine 505. For example, the processing module 504 may send the maintenance message triggering event to the smart component engine 505. In one embodiment, the maintenance message triggering event may include the maintenance message 400. The method 728 ends.

FIG. 7H illustrates a method 756 to utilize smart components, according to an embodiment. The method 756 may commence at operation 758, at the network-based marketplace 118, with the smart component engine 505 receiving a triggering event. At operation 758, the smart component engine 505 may associate the triggering event with processing rules, as described further in this document, and load the processing rules in the smart component engine 505. At operation 760, the smart component engine 505 may execute the processing rules.

Figure 7I:
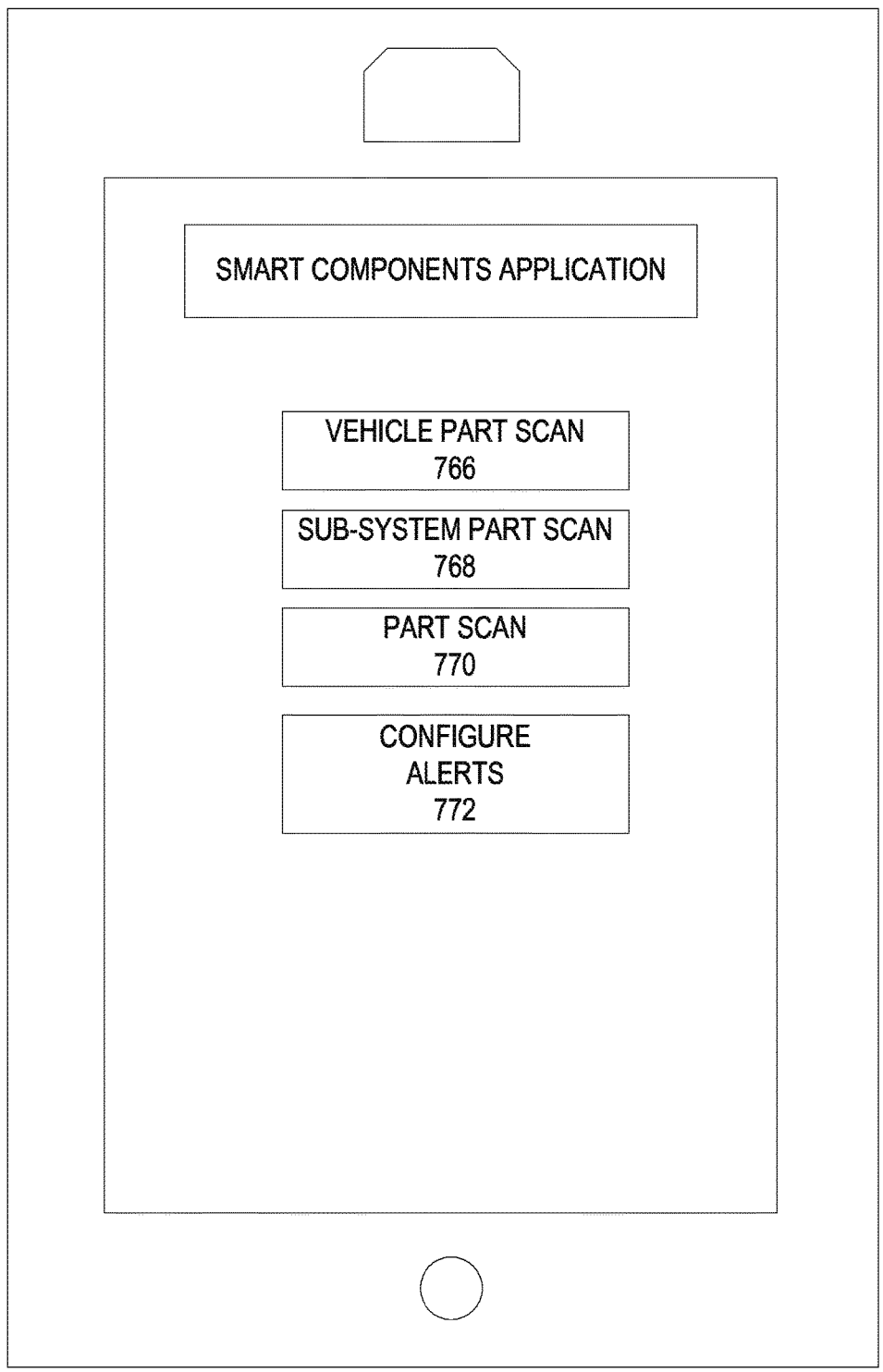
FIG. 7I illustrates a user interface, according to an embodiment.

FIG. 7I illustrates a user interface 764, according to an embodiment. The user interface 764 is illustrated as being displayed on a mobile device 112 (e.g., Apple iPhone). The user interface 764 includes the string, "Smart Components Application" indicating the name of an "app" that is displaying the user interface 764. For example, the "Smart Components Application" may embody the maintenance application 200 illustrated in FIG. 1 to execute any of the methods described in this document. According to one embodiment, the "Smart Components Application" "app" may be loaded from the "app store" provided by Apple, Inc. of Cupertino, Calif. The user interface 764 may include a vehicle part scan user interface element 766, a sub-system part scan user interface element 768, a part scan user interface element 770, and a configure alerts user interface element 772. The vehicle part scan user interface element 766 may be selected to scan all smart components 102 on one or more a vehicles 104 included within a geographic circle where the center of the circle is identified as the location of the mobile device 112 and the radius of the circle is a predetermined length measured from the location of the mobile device 112. In one embodiment, the radius is configurable. According to one embodiment, the range of a signal for a smart component 102 (not shown) may be a determining factor (e.g., sending or receiving signal). However, a third party (e.g., the vehicle 104 or shop environment) could conceivably provide area-effect 'power' for the sensors 108 (e.g., via inductive or RF wireless power transmission) upon instigation by a triggering signal originating in the mobile device 112. In these scenarios, the range of the signal may be configurable based upon the power of the output signal, strength of the return signal, sensitivity of the receiver, or a selection of which of the localized third-party power transmitters were activated. The sub-system part scan user interface element 768 may be selected to scan a sub-system (e.g., smart components 102 in an engine, chassis, electrical, trunk, etc.) that is identified by the user and included within a geographic circle, as previously described. The part scan user interface element 770 may be selected to scan a part type that is identified by the user and included within a geographic circle, as previously described. It will be observed that proximity-based scans (e.g., vehicle part scan user interface element 766, sub-system part scan user interface element 768, or part scan user interface element 770) may pick up parts 106 from neighboring vehicles 104. According to one embodiment, the system 100 (as shown in FIG. 1) may eliminate false positives from nearby vehicles 104 by correlating smart components 102 identified in multiple scans varied in time & location, and then 'recognizing' only those smart components 102 that have been consistently identified across multiple scans for a particular vehicle 104.

The configure alerts user interface element 772 may be selected to enter a set of user interfaces that enable configuring of threshold information 712 (e.g., threshold) and maintenance policy information 714 for a particular part type, as identified by the network-based marketplace 118 with a part type identifier 308, and vehicle 104, as identified by the network-based marketplace 118 with vehicle identification information 302. In one embodiment, the threshold information 712 may be configured to enable the dynamic calculation of a threshold responsive to receiving characterization information 312.

Figure 7J:
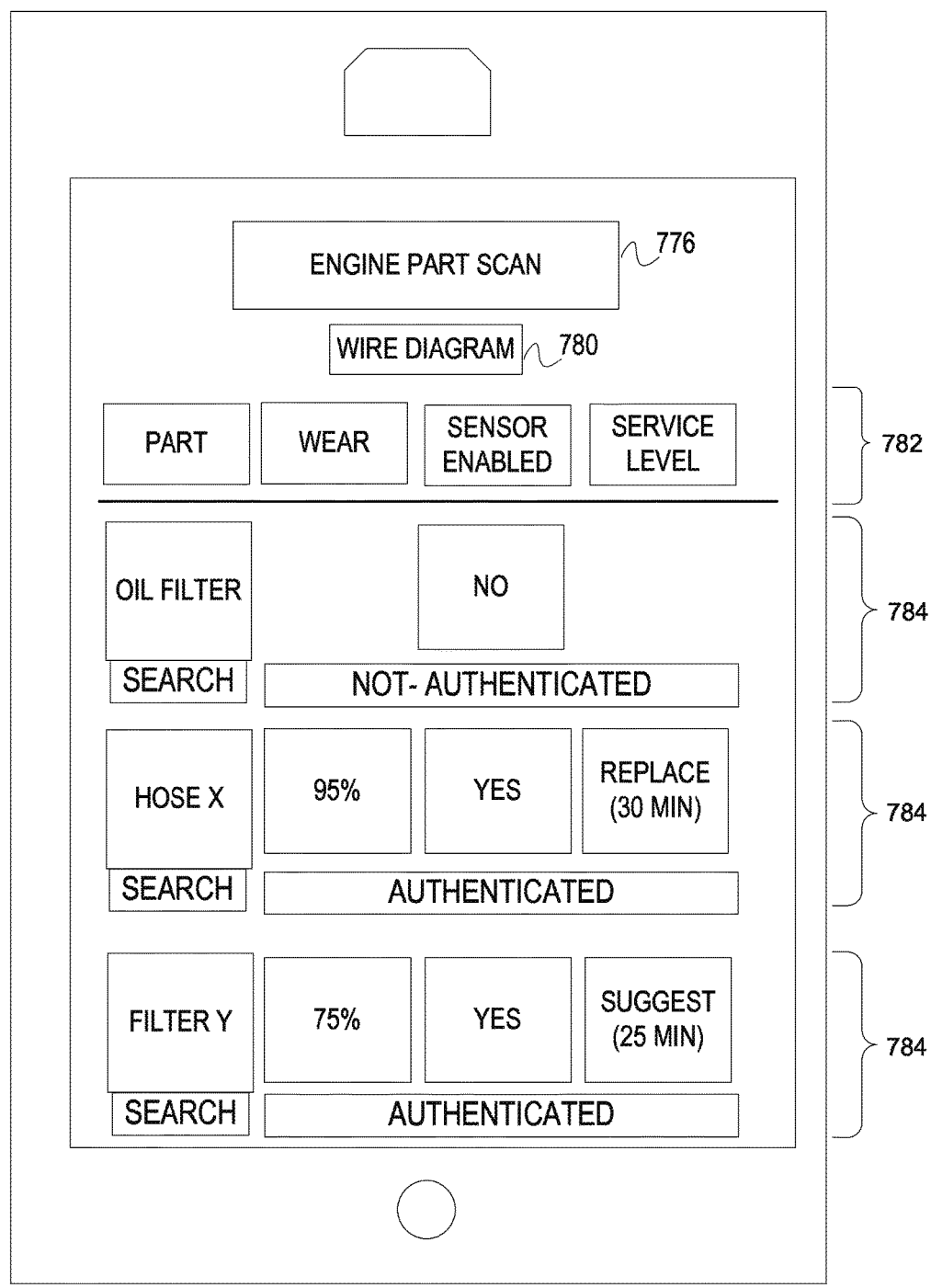
FIG. 7J illustrates user interface, according to an embodiment.

FIG. 7J illustrates a user interface 774, according to an embodiment. The user interface 774 is illustrated as being displayed on a mobile device 112 (e.g., Apple iPhone). The user interface 774 displays a string, "Engine Part Scan" indicating the results of a sub-system part scan. The user interface 774 may include a user interface element 780, column titles 782 for a "Part," "Wear," "Sensor Enabled," and "Service Level. The user interface 774 may further include rows 784 of part information, one for each part 106. The user interface element 780 may be selected to display a wire diagram including the results of a vehicle 104 that was scanned, as illustrated in FIG. 7L. The "Part column displays the name that is associated with the part identifier 306 and/or part type identifier 308 for the part 106. The name of the part 106 is further associated with a user interface element "SEARCH" that may be selected to initiate a search for listings 600 that respectively describe an offering of the part 106 for sale or auction on the network-based marketplace 118. The "Wear" column displays a percentage wear as indicated by the most recent characterization information 312 for the part 106 or an average of a window of recent characterization information 312 for the part 106. The "Sensor Enabled" column displays "YES" for a smart component 102 with its sensor 108 enabled and "NO" for a smart component 102 with its sensor 108 disabled (e.g., not working, turned off, etc.). The "Service Level" column indicates the current service level information 318 (e.g., "OK," "SUGGEST," "WARN," or "REPLACE") and an estimated replace time based on the location of mobile device 112, as previously described. For each row 784, the part 106 is associated with an indication whether the part 106 was authenticated (e.g., "AUTHENTICATED") or not authenticated (e.g., "NOT-AUTHENTICATED"), as previously described.

Figure 7K:
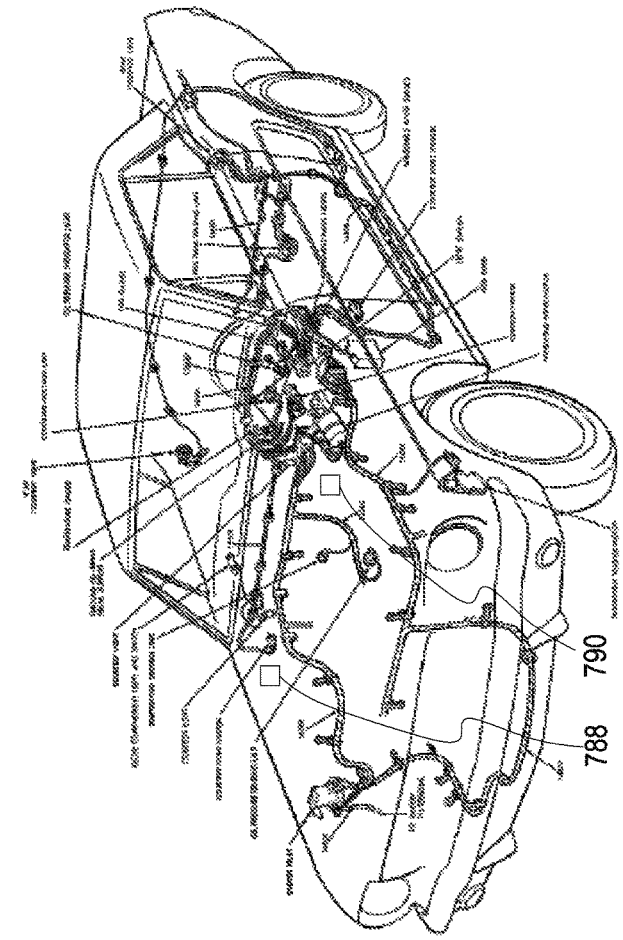
FIG. 7K illustrates user interface, according to an embodiment.

FIG. 7K illustrates a user interface 786, according to an embodiment. The user interface 786 is illustrated as being displayed on a mobile device 112 (e.g., Apple iPhone). The user interface 786 includes user interface elements 788 and 790 respectively representing smart components 102. The user interface element 788 represents a smart component 102 including a courtesy light bulb part 106 and the user interface element 790 represents a smart component 102 including an ignition switch part 106. Recall, the smart components 102 are each associated with a part type identifier 308. The user interface elements (e.g., "HISTORY," "EXPERTS," or "MANUALS") may be selected in conjunction with a selection of one of the user interface elements 788 or 790 to display the selected type of information. For example, the user interface element for "HISTORY" may be selected after selecting the user interface elements 788 or 790 to display the maintenance history information 316 for the smart component 102 that was selected. Similarly, the user interface element "EXPERT" may be selected after selecting the user interface elements 788 or 790 to identify an expert for the part 106 included in the respective smart component 102 and/or enter a chat room that includes the identified expert and/or initiate a communication with the identified expert. For example, the expert may be identified based on the part type identifier 308 for the part 106 and the expert information 220, as shown on FIG. 7C, in the user table 700, as shown on FIG. 7A. The user interface element, "MANUAL," may be selected after selecting the user interface elements 788 or 790 to identify a manual to replace the smart component 102 that was selected. In one embodiment, the manual may be identified based an expertise level (e.g., novice, casual fixer, expert) of the user associated with the mobile device 112.

Systems and Methods to Utilize an Electronic Garage Shelf

Figure 8A:
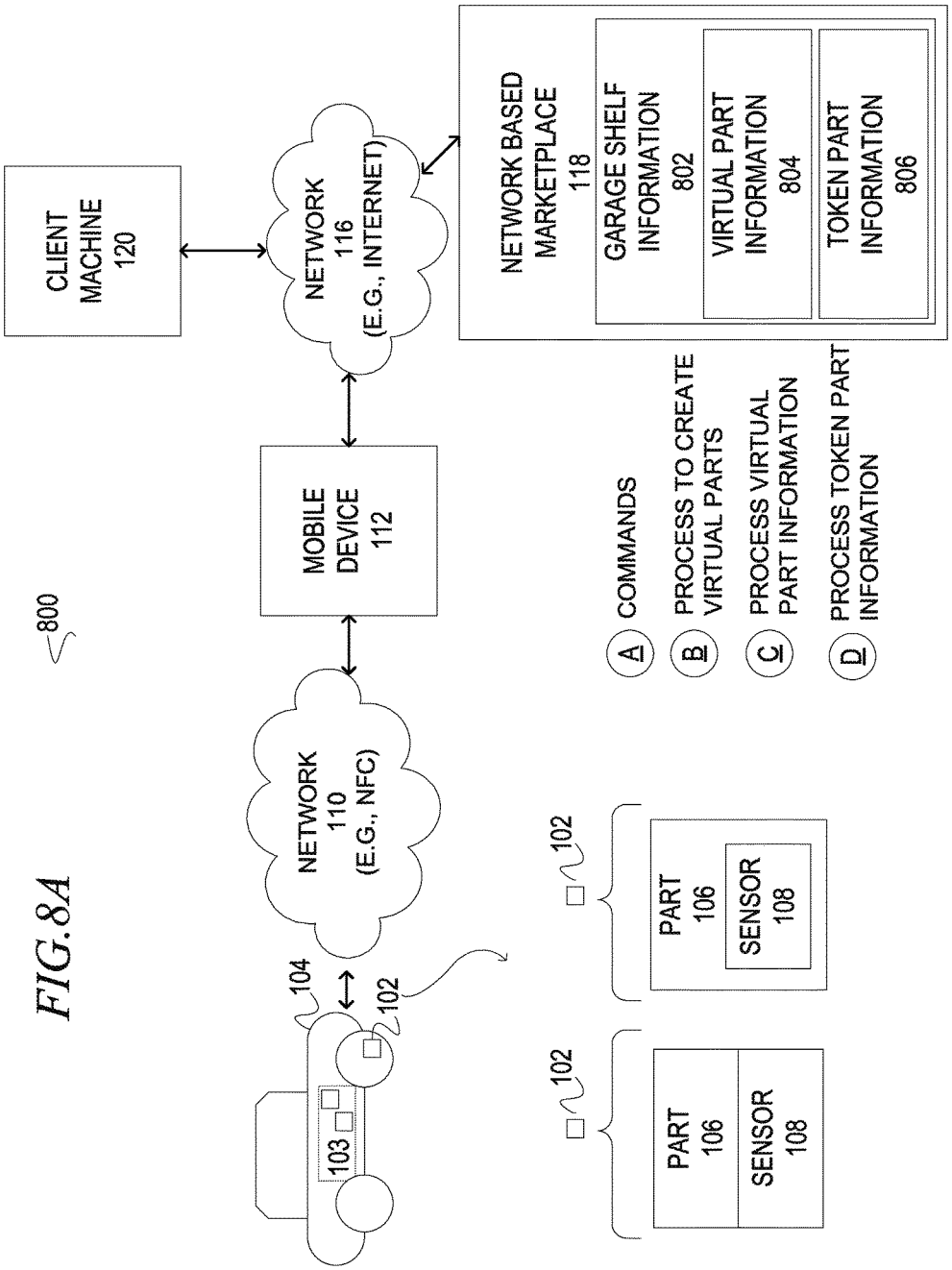
FIG. 8A illustrates a system to utilize an electronic garage shelf, according to an embodiment.

FIG. 8A illustrates a system 800 to utilize an electronic garage shelf, according to an embodiment. The electronic garage shelf may be a metaphor for a shelf in a garage that is used to store parts 106. Merely for example, the electronic garage shelf may store token parts that respectively represent parts 106 or smart components 102 including oil filters, carburetors, spark plugs, and fuses that are stored on a garage shelf in the user's garage. Further, the metaphor for a shelf in the garage may be expanded to include virtual parts that represent parts 106 or smart components 102 of interest to the user. Accordingly, the system 800 may include garage shelf information 802 comprising virtual part information 804 and token part information 806. The virtual part information 804 may store virtual parts signifying parts 106 that are desirable for acquisition and the token part information 806 may store token parts signifying parts 106 that are in the user's possession.

Broadly, the system 800 may include: "A") a set of commands to add, delete, and configure the virtual parts and token parts; "B") processing to create virtual parts; "C") processing of the virtual parts; and "D") processing of the token parts. Processing to create virtual parts may include alerting a particular user to create a virtual part. For example, an alert to create a virtual part may be sent to a user who has expressed interest in a part 106/smart component 102 by searching for the part 106. Further for example, an alert to create a virtual part may be sent to a user for a smart component 102 that reports excessive wear. Processing virtual parts may be proactive or reactive. Processing that is proactive may include alerting a particular user of a purchase opportunity related to the virtual part, community content related to the virtual part, and creating a token part based on the virtual part to prompt the acquisition of the part 106 or smart component 102. Processing that is reactive may include modifying dynamically selected content based on a virtual part. For example, the virtual parts for a particular user may be input to a mechanism that dynamically selects and ranks content. For example, a search mechanism executing a search on behalf of a user is configured to receive virtual parts as input to select and rank listings that are returned in a search result to the user. Further, for example, an automatically invoked merchandising mechanism (e.g., shopping cart being displayed) is configured to receive virtual parts as input to select and rank listings that are merchandised in association with the shopping cart to the user. In both instances a user's implicit interest in a part 106 is accommodated by utilizing the corresponding virtual part. Processing token parts may be proactive or reactive. Processing token parts that is proactive may include alerting a particular user of a sales opportunity to sell the part 106 or smart component 102 signified by the token part, alerting a particular user of community content related to the token part, alerting a particular user of installation of the part 106 or smart component 102 signified by the token part, and alerting a particular user of deleting the token part. Processing of token parts that is reactive may include evaluating whether token parts are compatible with a vehicle 104 that is added to a garage that is associated with a user. For example, a vehicle 104 may be added to vehicle garage information 706 (not shown) that is associated with a user and responsive to the addition of the vehicle 104 an analysis is performed to identify whether any of the token parts are compatible with the vehicle (e.g., for repair). For example, a token part that is identified as compatible signifies a part 106 in the real world that is suitable to replace the corresponding part 106 and/or smart component 102 in the vehicle 104.

The system 800 may operate in conjunction with smart components 102 as previously described with respect to the system 100 in FIG. 1. Accordingly, the same or similar references have been used to indicate the same or similar features unless otherwise indicated. While the vehicle 104 is illustrated as an automobile, it will be appreciated that trucks, all-terrain vehicles, jeeps, aircraft, water-born vessels, space vessels, and the like may embody the illustrated vehicle 104. Merely for example, a smart component 102 in a Ford Mustang may include a sensor 108 for a brake pad that senses information 312 and communicates the characterization information 312 over the network 110 (e.g., NFC) to an iPhone that, in turn, communicates a maintenance message 400 including the characterization information 312 and a timestamp 314 to the network-based marketplace 118 that, in turn, stores the characterization information 312 and the timestamp 314 in garage information 706 for the Ford Mustang in user profile information 702 associated with a user and processes the characterization information 312 to identify a "REPLACE" service level for the brake-pad. Responsive to identifying a service level for the brake pad that is not "OK" (e.g., "REPLACE"), the network-based marketplace 118 may communicate an alert to the mobile device 112 or the client machine 120 to create a virtual part for the brake pad. The user may respond by entering a command to create a virtual part for the brake pad in the virtual part information 804. Next, the network-based marketplace 118 may process the virtual part for the brake pad in the virtual part information 804 to identify a purchase opportunity on the network-based marketplace 118. For example, an electronic storefront may be advertising a sale on the brake pad and the user may be alerted of the sale. Next, the user may purchase the brake pad and enter a command to change the virtual part that was previously created into a token part signifying acquisition the brake pad. In some embodiments, the virtual part may be changed automatically by the network-based marketplace 115. For example, in one embodiment, the network-based marketplace 118 change the virtual part to the token part responsive to identifying the purchase as concluding an online transaction that was initiated with a search based on the virtual part. Further for example, in one embodiment, the network-based marketplace 118 may change the virtual part to the token part responsive to identifying the purchase as concluding an online transaction that was initiated with a search based on an alert that described the virtual part. Next, the network-based marketplace 118 may process the virtual part for the brake pad in the garage shelf information 802 to communicate an alert to the user to prompt the user to install the brake pad as the corresponding smart component 102 for the break pad is now reporting 99% wear. Further details and features are described below.

Figure 8B:
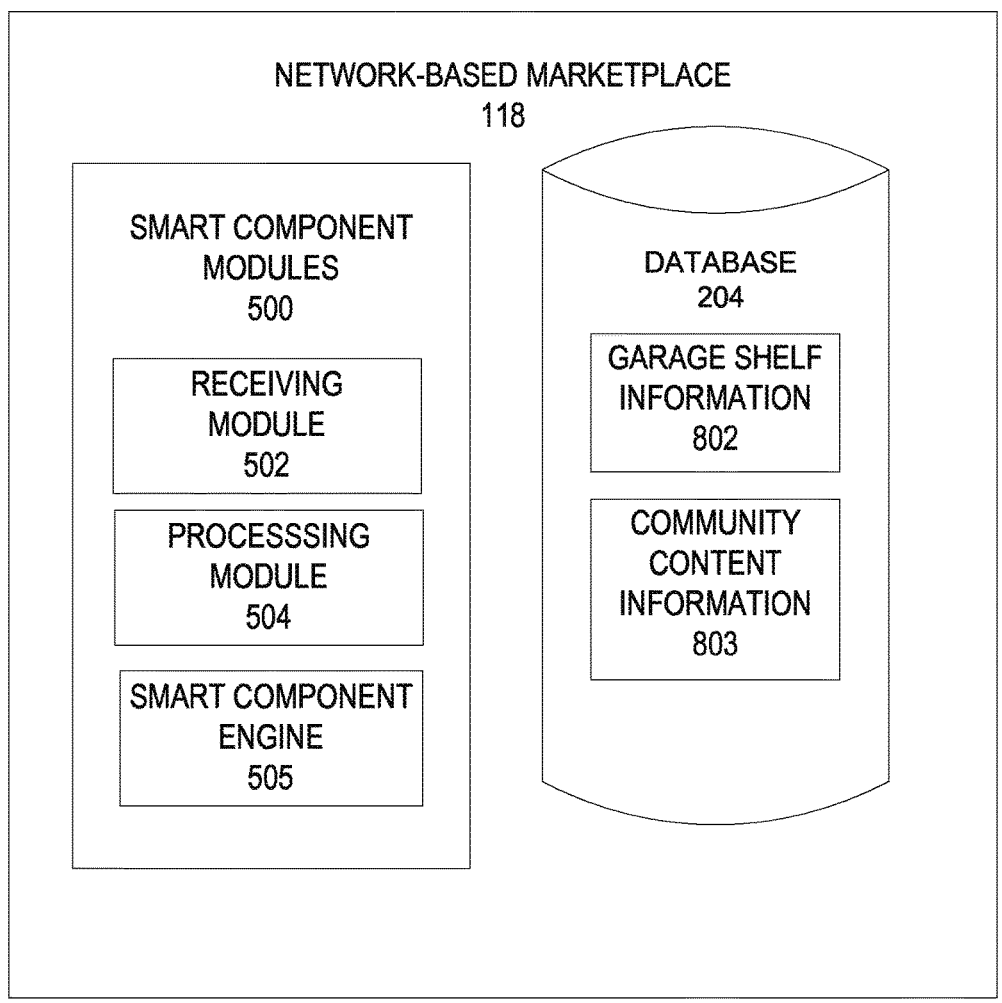
FIG. 8B illustrates a network-based marketplace, according to an embodiment.

FIG. 8B illustrates the network-based marketplace 118, according to an embodiment. The network-based marketplace 118 may include smart component modules 500 and the database 204. The network-based marketplace 118, smart component modules 500 and database 204 operate as previously described and as follows. The smart component modules 500 may include a receiving module 502 and a processing module 504 and a smart component engine 505. The receiving module 502 may receive the commands from the mobile device 112 or the client machine 120 and the processing module 504 may process the commands to update the database 204. Further, the processing module 504 may communicate responses to the commands, periodically identify and communicate alerts to create virtual parts, process the virtual parts and process the token parts. The processing module 504 may process the virtual parts to communicate alerts and perform other operations and process the token parts to communicate alerts and to perform other operations, both as described below. In some instances, the processing module 504 may further generate a triggering event and communicate the triggering event to the smart component engine 505 for further processing although other processes on the network-based marketplace 118 may generate and communicate a triggering event to the smart component engine 505. The database 204 may include the garage shelf information 802 and community content information 803 in addition to the other data structures previously described in this document though not presently shown. The community content information 803 may include bulletin, recalls, service manuals, installation guides, pricing guides, recommendations, and any other community sourced content that may be used to maintain, fix, repair, price, acquire, evaluate, etc. a part 106 or smart component 102, subsystem 103, vehicle 104 or fleet of vehicles, etc.

Figure 8C:
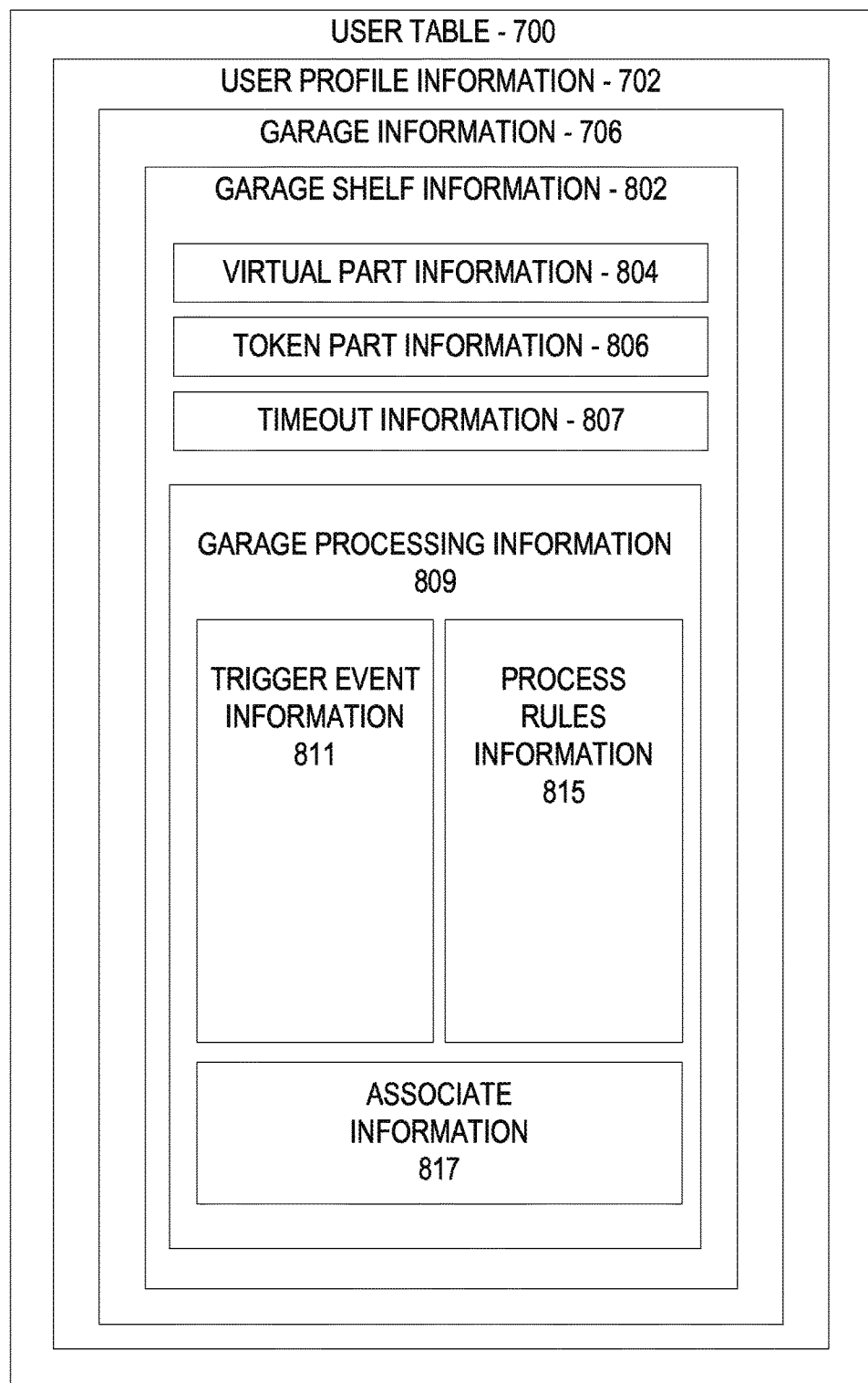
FIG. 8C illustrates a user table, according to an embodiment.

FIG. 8C illustrates a user table 700 including the garage shelf information 802, according to an embodiment. The garage shelf information 802 is stored in the garage information 706 that, in turn, is stored in user profile information 702 that, in turn, is stored in the user table 700. The garage shelf information 802 may include virtual part information 804 and token part information 806, as previously described. The garage shelf information 802 may further include timeout information 807 and garage processing information 809. The timeout information 807 may include three timeouts including a timeout to process an alert to create a virtual part, a timeout to process virtual parts and a timeout to process token parts. Responsive to an expiration of one of the timeouts a corresponding method is executed. For example responsive to the expiration of a timeout to process an alert to create a virtual part a corresponding method is executed, as described below. Responsive to an expiration of a timeout to process virtual parts a corresponding method is executed, as described below and responsive to an expiration of a timeout to process token parts a corresponding method is executed, as described below. The garage processing information 809 may include trigger event information 811 that defines triggering events, process rules information 815 that stores multiple sets of processing rules, and associate information 817 to associate each triggering event to one or more sets of processing rules. The garage processing information 809 may be utilized by the smart component engine 505 to associate a triggering event with one or more sets of processing rules based on the associate information 817, load the one or more sets of processing rules into the smart component engine 505 and execute the one or more sets of processing rules.

Search Triggering Event—The trigger event information 811 may include the "search triggering event." The "search triggering event" may be communicated by a search mechanism including a search algorithm to the smart component engine 505. The "search triggering event" may be communicated responsive to an execution of a search by a user associated with the garage shelf information 802. For example, the network-based marketplace may receive a request for search that is initiated by selecting a virtual part or a token part that is registered in garage shelf information 802 associated with the user. Responsive to a search that is initiated by selecting a virtual part, the smart component engine 505 may utilize the associate information 817 to associate the "search triggering event" with "get virtual parts process rules" and retrieve the "get virtual parts process rules" from the process rules information 815. Responsive to a search that is initiated by selecting a token part, the smart component engine 505 may utilize the associate information 817 to associate the "search triggering event" with "get token parts processing rules" and retrieve the "get token parts processing rules" from the process rules information 815. The smart component engine 505 may execute the "get virtual parts processing rules" to identify the virtual parts in the virtual part information associated with the user and communicate a list of the virtual parts to the search algorithm that, in turn, selects and ranks listings 600 based on the contents of the list and other factors. The smart component engine 505 may execute the "get token parts processing rules" to identify the token parts in the token part information 806 associated with the user and communicate a list of the token parts to the search algorithm that, in turn, selects and ranks listings 600 based on the contents of the list and other factors. The search algorithm includes the selected listings 600 in search results that are communicated to the user.

Merchandise Triggering Event—The trigger event information 811 may include the "merchandise triggering event." The "merchandise triggering event" may be communicated by a merchandising algorithm to the smart component engine 505 responsive to a user performing a predetermined activity that suggests the user is receptive to a suggestion (e.g., making a purchase, browsing for a predetermined period of time, searching for a predetermined period of time, etc.) regarding merchandise (e.g., an item described by a listing 600). The merchandising algorithm may select content in the form of listings 600 that describe items to merchandise to the user. Responsive to receiving the "merchandise triggering event," the smart component engine 505 may utilize the associate information 817 to associate the "merchandise triggering event" with "get virtual parts process rules," retrieve the "get virtual parts processing rules" from the process rules information 815, associate the "merchandise triggering event" with "get token parts processing rules" and retrieve the "get token parts processing rules" from the process rules information 81. The smart component engine 505 may execute the "get virtual parts processing rules" to identify the virtual parts in the virtual part information associated with the user based on the interest of the user matching a virtual part interest profile associated with a virtual part. The smart component engine 505 may execute the "get token parts processing rules" to identify the token parts in the token part information associated with the user based on the expressed interest of the user matching a token part interest profile associated with a token part. The smart component engine 505 may execute the "get virtual parts processing rules" based on the expressed interest of the user to identify a list of virtual parts and communicate the list of virtual parts to the merchandising algorithm. The smart component engine 505 may execute the "get token parts processing rules" based on the expressed interest of the user to identify a list of token parts and communicate the list of token parts to the merchandising algorithm. The merchandising algorithm may receive one or both of the lists and process the respective lists to select and rank the listings 600 based on the contents of the list(s), in addition to other factors. The merchandising algorithm may merchandise one or more of the selected listings 600 to the user based on the ranking.

Completed Transaction Triggering Event

The trigger event information 811 may include the "completed transaction triggering event." The "completed transaction triggering event" may be communicated by a transaction mechanism including a transaction algorithm to the smart component engine 505. The "completed transaction triggering event" may be communicated to the smart component engine 505 responsive to a user completing a transaction (e.g., payment for an item) for an item that was initiated based on a virtual part. For example, the user may initiate a search for listings 600 based on a virtual part by selecting the virtual part in an alert that is communicated to the user. Responsive to receiving the "completed transaction triggering event," the smart component engine 505 may utilize the associate information 817 to associate the "completed transaction triggering event" with "completed transaction processing rules" and retrieve the "completed transaction processing rules" from the process rules information 815. The smart component engine 505 may execute the "completed transaction processing rules" to change the virtual part to a token part. For example, the smart component engine 505 may execute the "completed transaction processing rules" to change the virtual part that was utilized to initiate the transaction to a token part.

Vehicle Registration Triggering Event

The trigger event information 811 may include the "vehicle registration triggering event." The "vehicle registration triggering event" may be communicated by the processing module 504 to the smart component engine 505 responsive to vehicle information 300 being registered in the garage information 706, as previously described. Recall that registration of vehicle information 300 in association with the user signifies a physical possession of a vehicle 104 associated with the user. Responsive to receiving the "vehicle registration triggering event," the smart component engine 505 may utilize the associate information 817 to associate the "vehicle registration triggering event" with "alert compatible parts processing rules" and retrieve the "alert compatible token parts processing rules" from the process rules information 815. The smart component engine 505 may execute the "alert compatible parts processing rules" to identify token parts in the token part information 806 that are compatible with the vehicle 104 that is being registered and, responsive to the identification, communicate an alert to the user that includes a message that indicates possession of a part 106 that is compatible with the vehicle 104. For example, the part 106 that is identified as compatible with the vehicle 104 may be utilized to fix the vehicle 104.

Vehicle Registration Spare Parts Triggering Event

The trigger event information 811 may include the "vehicle registration spare parts triggering event." The "vehicle registration spare parts triggering event" may be communicated by the processing module 504 to the smart component engine 505 responsive to vehicle information 300 being registered in the garage information 706 as spare parts. For example, the user may intend to cannibalize the vehicle 104 to use/and or sell its parts 106 and indicate as much in the registration of the vehicle 104 on the network-based marketplace 118. Responsive to receipt of the "vehicle registration spare parts triggering event," the smart component engine 505 may associate the "vehicle registration spare parts triggering event" with "generate virtual parts for vehicle processing rules." The smart component engine 505 may execute the "generate virtual parts processing rules" to identify the parts 106 included in the vehicle 104 based on the community content information 803 and generate virtual parts 814 for all of the parts 106 identified for the registered vehicle 104.

Search Virtual Part—Sale Triggering Event

The trigger event information 811 may include the "search virtual part—sale triggering event." The "search virtual part—sale triggering" event may be communicated by a sales algorithm to the smart component engine 505 responsive to a sales algorithm identifying a purchase of an item as concluding an online transaction that was initiated with a search for a virtual part. For example, a user may execute a "Search VP command" (described later) to identify one or more matching virtual parts in the garage shelf information 802 on the network-based marketplace 118, select a particular virtual part from the search results, contact the user (e.g., owner), and purchase the corresponding part 106 or win the part 106 in an auction. Recall the virtual part signifies a part 106 that may be acquired from the user associated with the garage shelf information that includes the virtual part. Responsive to receiving the "search virtual part—sale triggering event," the smart component engine 505 may utilize the associate information 817 to associate the "search virtual part—sale triggering event" with "change virtual part processing rules" and retrieve the "change virtual part processing rules" from the process rules information 815. The smart component engine 505 may execute the "change virtual part processing rules" to change the virtual part corresponding to the part 106 that was purchased to a token part. For example, the smart component engine 505 may execute "Change VP to TP" command, as described later, to change the virtual part to a token part.

Bar Code Scan Triggering Event

The trigger event information 811 may include the "bar code scan triggering event." The "bar code scan triggering event" may be communicated by the smart component engine 505 responsive to a user scanning a bar code on a part 106 and identifying the part 106 based on the bar code. Responsive to receiving the "bar code scan triggering event," the smart component engine 505 may utilize the associate information 817 to associate the "bar code scan triggering event" with "change virtual part processing rules" and retrieve the "change virtual part processing rules" from the process rules information 815. The smart component engine 505 may execute the "change virtual part processing rules" to identify a virtual part that corresponds to the scanned part 106 and change the virtual part to a token part. For example, the smart component engine may execute "Change VP to TP" command, as described later, to change the virtual part to a token part.

FIG. 8D illustrates a table 808 of garage shelf commands, according to an embodiment. The table 808 includes an "add virtual part command," a "delete virtual part command," a "configure virtual part command," an "add token part command," a "delete token part command," a "configure token part command," a "change virtual part to token part command," a ", search virtual part command," and a "search token part command."

The "add virtual part command" may be utilized to add a virtual part to the virtual part information 804. The "add virtual part command" may receive input parameters including a vehicle identifier (e.g., year, make, model, vehicle identification number, etc.), a part type identifier 308 (e.g., oil filter), and a part identifier 306 (e.g., unique identifier or range of unique identifiers) and process the input parameters to add an a virtual part to the virtual part virtual part information 804 in the garage shelf information 802 associated with the user who entered the command.

The "delete virtual part command" may be utilized to delete a virtual part from the virtual part information 804 in the garage shelf information 802 associated with the user who entered the command. The "delete virtual part command" may receive an input parameter including a virtual part identifier and process the virtual part identifier to delete the identified virtual part.

The "configure virtual part command" may receive input parameters including a virtual part identifier and other parameters and process the input parameters to configure the virtual part in the garage shelf information 802 associated with the user who entered the command. For example, the virtual part information 804 may include user-preferred brands, YES/NO alert configuration settings, and a timeout period to process the virtual part.

The "add token part command" may receive input parameters including a vehicle identifier (e.g., year, make, model, vehicle identification number, etc.), a part type identifier 308 (e.g., oil filter), and a part identifier 306 (e.g., unique identifier or range of unique identifiers) and process the input parameters to add one token part to the token part information 806 in the garage shelf information 802 associated with the user who entered the command.

The "delete token part command" may be utilized to delete a token part from the token part information 806 in the garage shelf information 802 associated with the user who entered the command. The "delete token part command" may receive a token part identifier and be process the token part identifier to delete the identified token part.

The "configure token part command" may receive input parameters including a token part identifier and other parameters and process the input parameters to configure the token part in the token part information 806 in the garage shelf information 802 of the user who entered the command. For example, the token part information 806 may include user-preferred brands, YES/NO alert configuration settings, and a timeout period to process the token part.

The "change virtual part to token part command" may receive a virtual part identifier and change the identified virtual part to a token part. According to one embodiment, the "change virtual part to token part command" may be automatically executed responsive to scanning a bar code or part identifier on a part 106 or smart component 102, as previously described. For example, a user may utilize their mobile device 112 to scan a part identifier on a part 106 or smart component 102 and communicate a message to the network-based marketplace 118 that, in turn, causes the smart component modules 500 to receive the message, identify a virtual part with a matching part identifier 306 or part type identifier 308 and responsive to the identification, communicate the "bar code can triggering event" to the smart component engine 505 to change the virtual part to a corresponding token part.

The "search virtual part command" may be utilized to identify a virtual part in the virtual part information 804 in the garage shelf information 802. For example, the "search virtual part command" may receive input parameters including a part type identifier 308 or part identifier 306 or some other search criteria (e.g., alphanumeric string) and process the input parameters to search all of the virtual part information 804 in the network-based marketplace 118. For example, a user may want to make an offer to another user to sell a part 106 to a user who is associated with a corresponding virtual part.

The "search token part command" may be utilized to identify a token part in garage shelf information 802. For example, the "search token part command" may receive input parameters including a part type identifier 308 or part identifier 306 or some other search criteria (e.g., alphanumeric string) and process the input parameters to search all of the token part information 806 in the network-based marketplace 118. For example, a user may want to make an offer to another user to purchase a part 106 a part from user who is associated with a corresponding token part.

In one embodiment, a virtual part or token part may be utilized to search the items table 506 for matching listings 600. For example, the input parameter for the search may include a virtual part or a token part. In one embodiment, the search parameters may further include a vehicle 104 to limit the scope of the search to the vehicle 104. For example, that input parameters may specify one more elements of the vehicle information 300 including the make, model and year of the vehicle. In one embodiment, the input parameters may further include a brand preference that describe brands and other preferences that limit the scope of the search to the brands and other preferences. For example, the search parameters may include one or more elements of user preference information 704 including a brand preference.

In one embodiment, a virtual part or token part may be utilized to search the items table 506 for compatible listings 600. For example, a compatible listing 600 may describe an item that is compatible with the virtual part or the token part. For example, an item that is compatible may be an accessory to the virtual part or the token part. Further, an item that is compatible may be assembled with the virtual part or token part. Further, an item that is compatible may be inserted into the virtual part or token part. Further, an item that is compatible may be contained by the virtual part or token part.

Figure 8E:
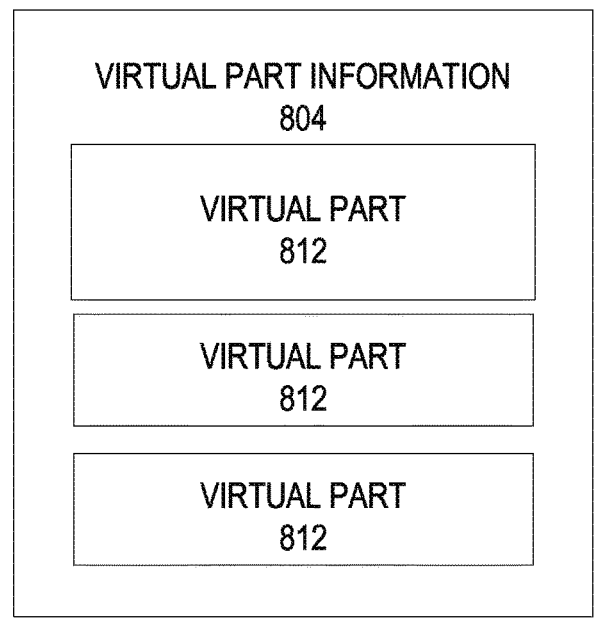
FIG. 8E illustrates virtual part information, according to an embodiment.

FIG. 8E illustrates virtual part information 804, according to an embodiment. The virtual part information 804 may store one or more virtual parts 812. The virtual parts 812 may be created with the "add virtual part command" and deleted with the "delete virtual part command."

Figure 8F:
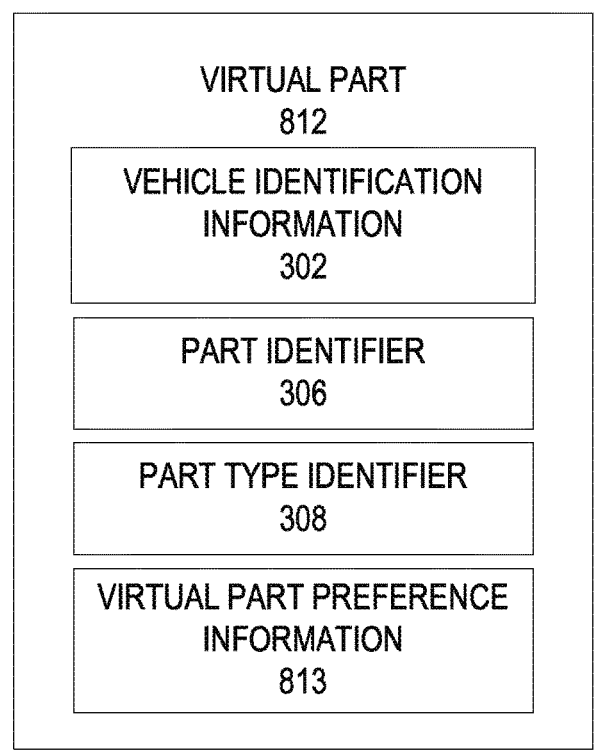
FIG. 8F illustrates a virtual part, according to an embodiment.

FIG. 8F illustrates a virtual part 812, according to an embodiment. The virtual part 812 may include vehicle identification information 302, as previously described; a part identifier 306, as previously described; a part type identifier 308, as previously described; virtual part preference information 813 and other content for describing, illustrating or imaging the virtual part 812. The virtual part preference information 813 may store user-preferred brands and other preferences, as configured by the user.

Figure 8G:
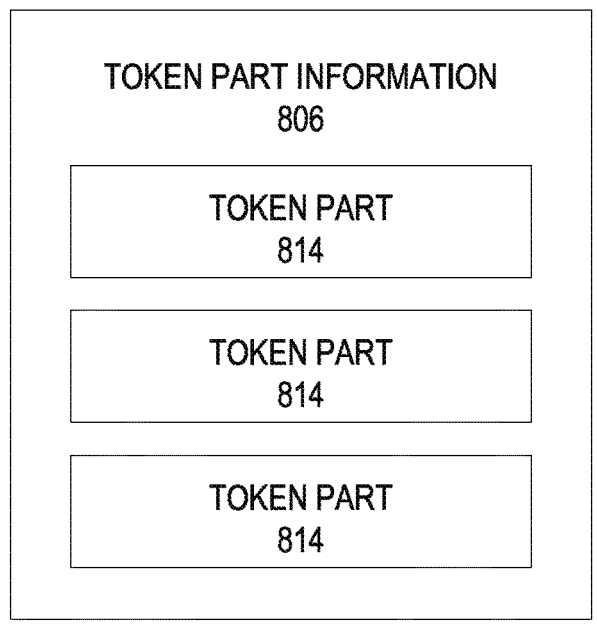
FIG. 8G illustrates token part information, according to an embodiment.

FIG. 8G illustrates token part information 806, according to an embodiment. The token part information 806 may store one or more token parts 814. The token parts 814 may be created with the "add token part command" and the "change virtual part to token part command." The token parts 814 may further be deleted with the "delete token part command."

Figure 8H:
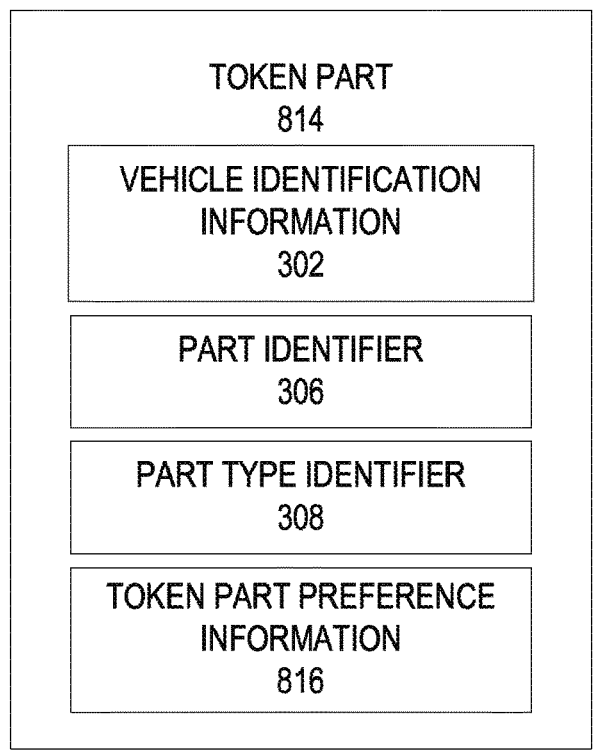
FIG. 8H illustrates a token part, according to an embodiment.

FIG. 8H illustrates a token part 814, according to an embodiment. The token part 814 may include vehicle identification information 302, as previously described; a part identifier 306, as previously described; a part type identifier 308, as previously described, token part preference information 816 and other content for describing, illustrating or imaging the token part 814. The token part preference information 816 may store user-preferred brands and other preferences, as configured by the user.

Figure 8I:
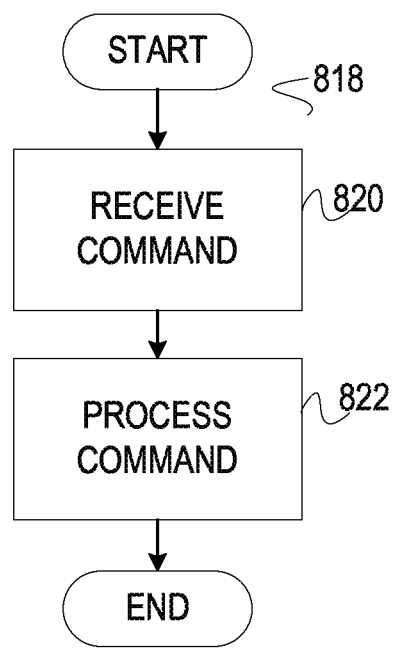
FIG. 8I illustrates a method to process commands, according to an embodiment.

FIG. 8I illustrates a method 818 to process commands, according to an embodiment. The method 818 describes processing commands for controlling the electronic garage including the commands in table 808, as shown in FIG. 8D. The method 818 may commence, at operation 820, with the receiving module 502 receiving the command and its corresponding input parameters. Merely for example, a user may enter the input parameters into an input box on the mobile device 112 or the client machine 120. In another embodiment, the receiving module 502 may utilize a menu-driven interface to interact with the user operating the mobile device 112 to receive the command and input parameters. At operation 822, the processing module 504 may process the command. For example, the processing module 504 may process the commands related to a virtual part to store user-preferred brands, YES/NO alert configuration settings, and a timeout period. Further for example, the processing module 504 may process the commands related to a token part to store user-preferred brands, YES/NO alert configuration settings, and a timeout period.

Figure 8J:
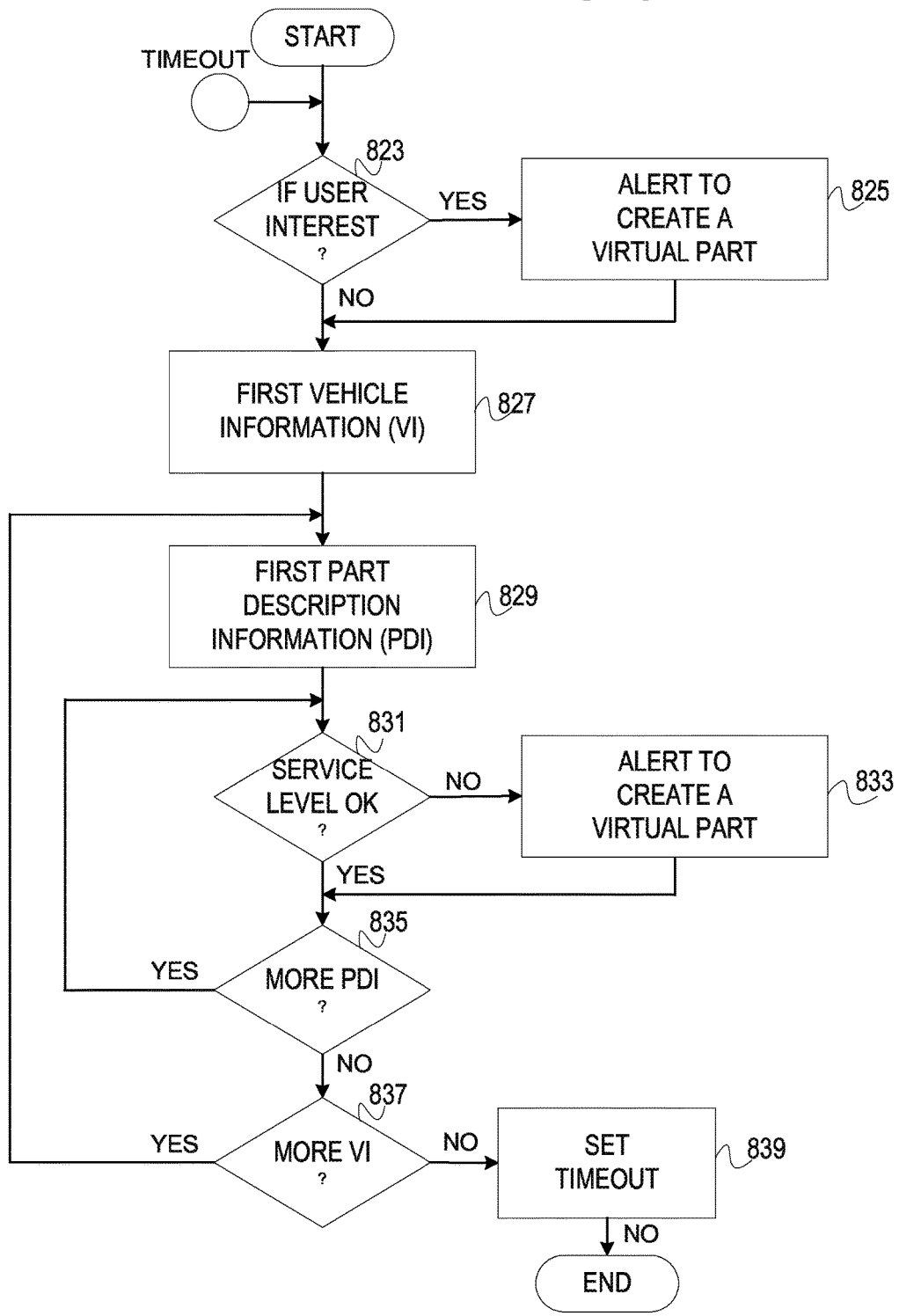
FIG. 8J illustrates a method to alert a creation of a virtual part, according to an embodiment.

FIG. 8J illustrates a method 821 to alert a creation of a virtual part, according to an embodiment. The method 821 commences, at operation 823, for a particular user on the network-based marketplace 118 responsive to the expiration of a timeout for the method 821 in the timeout information 807 in garage shelf information 802 associated with the user. The timeout may be configured to periodically expire (e.g., once per day) by the user or an administrator.

At decision operation 823, the processing module 504 may identify whether the user has expressed an interest in one or more parts 106. For example, the user may express an interest in a part 106 by searching for the part 106, browsing to the part 106, or watching the part 106. If the user has expressed interest then a branch is made to operation 825. Otherwise the processing module 504 branches to operation 827. At operation 825, the processing module 504 may communicate an alert to the user to create a virtual part 812. For example, the alert may include a message indicating that the user expressed interest in a part 106 or smart component 102 and a question asking the user whether they would like to create a virtual part 812 that corresponds to the part 106 or smart component 102.

At operation 827, the processing module 504 may advance to the first entry of vehicle information 300 (e.g., vehicle 104) in the garage information 707 in the user profile information 702. At operation 829, the processing module 504 may advance to the first entry of part description information 304 (e.g., smart component 102) for the particular vehicle 104.

At decision operation 831, the processing module 504 may identify whether the smart component 102 has a service level that is not "OK." For example, the processing module 504 may identify service level information 318 that includes a service level that is "SUGGEST," "WARN", or "REPLACE." If the service level is "OK," then the processing module 504 branches to decision operation 835. Otherwise the processing module 504 branches to operation 833.

At operation 833, the processing module 504 may communicate an alert to the user including a message to create a virtual part 812 corresponding to the identified smart component 102 in the vehicle 104 associated with the user. For example, the alert may include a question that asks the user whether they would like to create a virtual part 812 based on the identified smart component 102. In some embodiments, the alert may further include the service level for the smart component 102 and a warning that is appropriate for the service level, as previously described.

At decision operation 835, the processing module 504 identifies whether more part description information 304 in the current vehicle information 300 is to be processed. If more part description information 304 is to be processed then the processing module 504 advances to the next part description information 304 in the current vehicle information 300 and then branches to decision operation 831. Otherwise the processing module 504 branches to decision operation 837.

At decision operation 837, the processing module 504 may identify whether more vehicle information 300 (e.g., for a vehicle 104) in the garage information 706 that is associated with the current user is to be processed. If more vehicle information 300 is to be processed then the processing module 504 advances to the next vehicle information 300 in the garage information 706 and then branches to operation 829. Otherwise the processing module 504 branches to operation 839. At operation 839, the processing module 504 sets the timeout for the method 821 in the timeout information 807. For example the processing module 504 sets the timeout for the method 821 in the timeout information 807 in garage shelf information 802 associated with the particular user on the network-based marketplace 118.

Figure 8K:
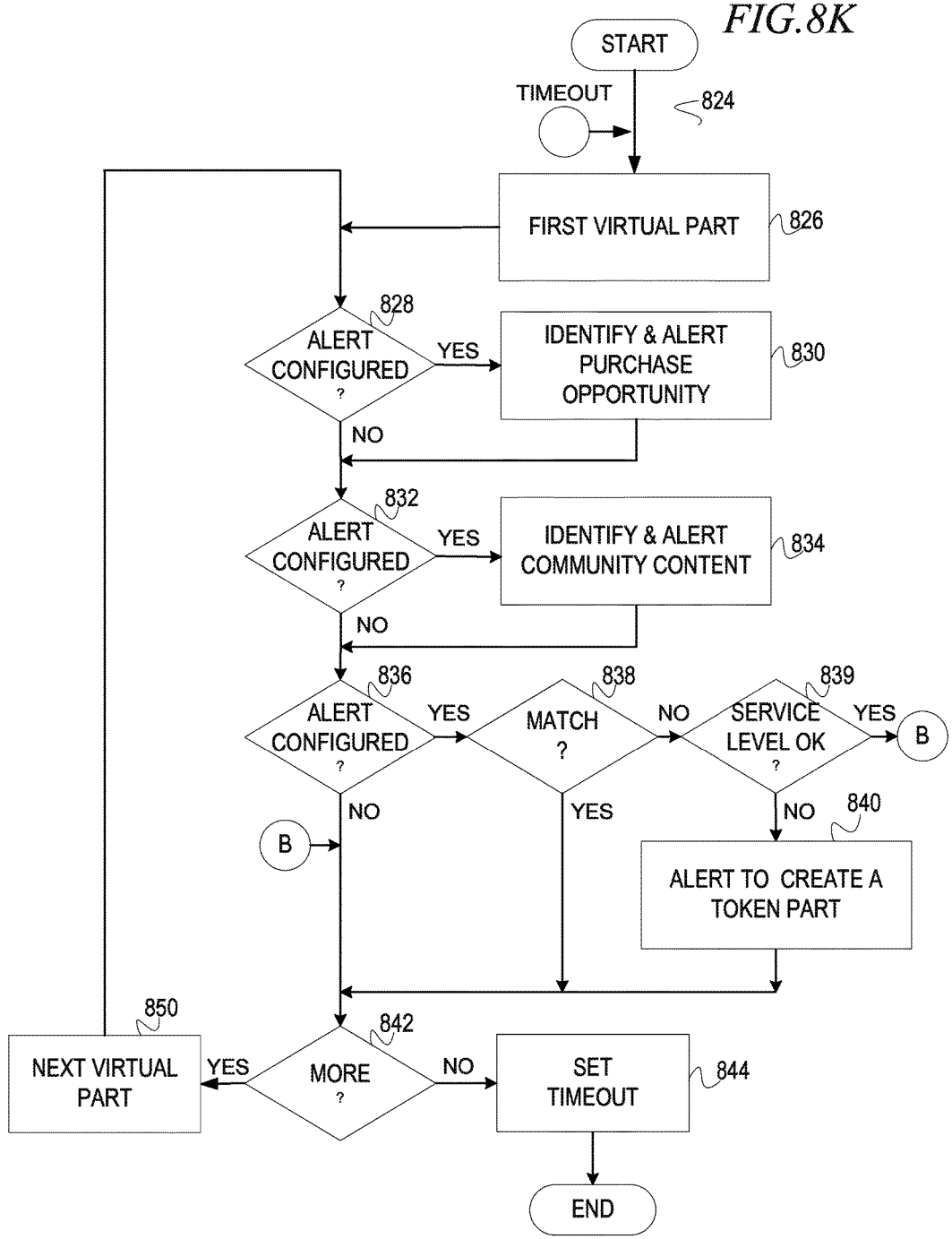
FIG. 8K illustrates a method to process virtual parts, according to an embodiment.

FIG. 8K illustrates a method 824 to process virtual parts, according to an embodiment. The method 824 commences, at operation 826, responsive to the expiration of a timeout for the method 824 in the timeout information 807 in garage shelf information 802 associated with a particular user on the network-based marketplace 118. The timeout may be configured (e.g., once a day) by the user with the "configure virtual part command." At operation 826, the processing module 504 may advance to the first virtual part 812 in the virtual part information 804 in the garage information 706 associated with the user.

At decision operation 828, the processing module 504 may identify whether an alert is configured for purchase opportunities. For example, an alert may be configured "YES" by the user with the "configure virtual part command." If the alert is configured "YES," then processing continues at operation 830. Otherwise processing continues at decision operation 832. At operation 830, the processing module 504 may identify whether any purchase opportunities are available based on the current virtual part 812. For example, the processing module 504 may execute a search of the items table 506 utilizing information in the current virtual part 812 including the part identifier 306 and/or the part type identifier 308 and/or virtual part preference information (e.g., favorite brands, style, discounted items, etc.) and communicate an alert to the current user responsive to identifying one or more listings 600 that match. For example, the processing module 504 may communicate an alert that includes links to the listings 600 describing items being offered for sale that match the current virtual part 812. Further, for example, the processing module 504 may execute a search of token part information 806 on the network-based marketplace 118 utilizing information in the current virtual part 812 including the part identifier 306 and/or the part type identifier 308 and/or virtual part preference information (e.g., favorite brands, style, discounted items, etc.) and communicate an alert to the current user responsive to identifying one or more listings 600 that match. For example, the processing module 504 may communicate an alert that includes links to the token parts 814 describing items being offered for sale that match the current virtual part 812 and the identity of the users respectively associated with the token parts 814. Other embodiments of the alert do not disclose the identity of the users. Further for example, the alert may include links that invoke a search for compatible listings 600 on the network-based marketplace 118. Compatible listings 600 describe an item that is related to the virtual part 812. For example, the item may be an accessory to the virtual part 812 or an element that is assembled with the virtual part 812 or an element that is inserted into the virtual part 812.

At decision operation 832, the processing module 504 may identify whether an alert is configured for community content. For example, the alert may be configured "YES" by the user with the "configure virtual part command." If the alert is configured "YES," then processing continues at operation 834. Otherwise processing continues at decision operation 836. At operation 834, the processing module 504 may identify whether new community content is available based on the current virtual part 812 and, if so, communicate an alert to the user. For example, the processing module 504 may execute a search of the community content information 803 utilizing information in the current virtual part 812 including the part identifier 306 and/or the part type identifier 308 and/or virtual part preference information (e.g., favorite brands, style, discounted items, etc.) and communicate an alert to the user responsive to identifying one or more new elements of community content information 803 that match. Further for example, the processing module 504 may communicate an alert including links to the elements of community content information 803 (e.g., installation guide).

At decision operation 836, the processing module 504 may identify whether an alert is configured to alert the creation of a token part 814 based on the current virtual part 812. For example, the alert may be configured "YES" by the user with the "configure virtual part command." If the alert is configured "YES," then processing continues at decision operation 838. Otherwise processing continues at decision operation 842. At decision operation 838, the processing module 504 may identify whether the current virtual part 812 corresponds to a smart component 102 that is registered in the user's garage information 706. For example, the processing module 504 may identify the smart component 102 by respectively matching the vehicle identification information 302 in the virtual part 812 with the vehicle identification information 302 in any of the entries of vehicle information 300 in the same user profile information 702 and further respectively matching the part type identifier 308 and the part identifier 306 in the virtual part 812 with the part type identifier 308 and the part identifier 306 in any of the entries of part description information 304 in the identified vehicle information 300. In some embodiments, a fuzzy match may be sufficient to register a match (e.g., part identifier 306 is not included to register a match, a range of part identifiers 306 sufficient to register a match, a range of vehicle identification information 302 is sufficient to register a match, or any combination thereof). At decision operation 839, the processing module 504 may identify whether the service level information 318 includes a service level for the identified smart component 102 that is registered as "OK." If the service level information 318 for the identified smart component 102 is registered as "OK" then processing continues at decision operation 842. Otherwise processing continues at operation 840 (e.g., service level is "SUGGEST," "WARN", or "REPLACE"). At operation 840, the processing module 504 may communicate an alert to the user to create a token part 814 based on the current virtual part 812. Recall that the token part 814 is a proxy for actual possession of the part 106. Accordingly, the alert provides a notice to the user to acquire the part 106 because the corresponding smart component 102 in a vehicle 104 has a service level that registers not "OK." In some embodiments, the alert may include the service level of the identified smart component 102.

At decision operation 842, the processing module 504 may identify whether more virtual parts 812 are in the virtual part information 804. If more virtual parts 812 are included in the virtual part information 804 then processing continues at operation 850. Otherwise the processing module 504 branches to operation 844. At operation 850, the processing module 504 advances to the next virtual part 812 and then continues processing at decision operation 828. At operation 844, the processing module 504 sets the timeout that, upon expiration, initiates the method 824 for the user. For example the processing module 504 sets the timeout for the method 824 in the timeout information 807 in garage shelf information 802 associated with the particular user on the network-based marketplace 118.

Figure 8L:
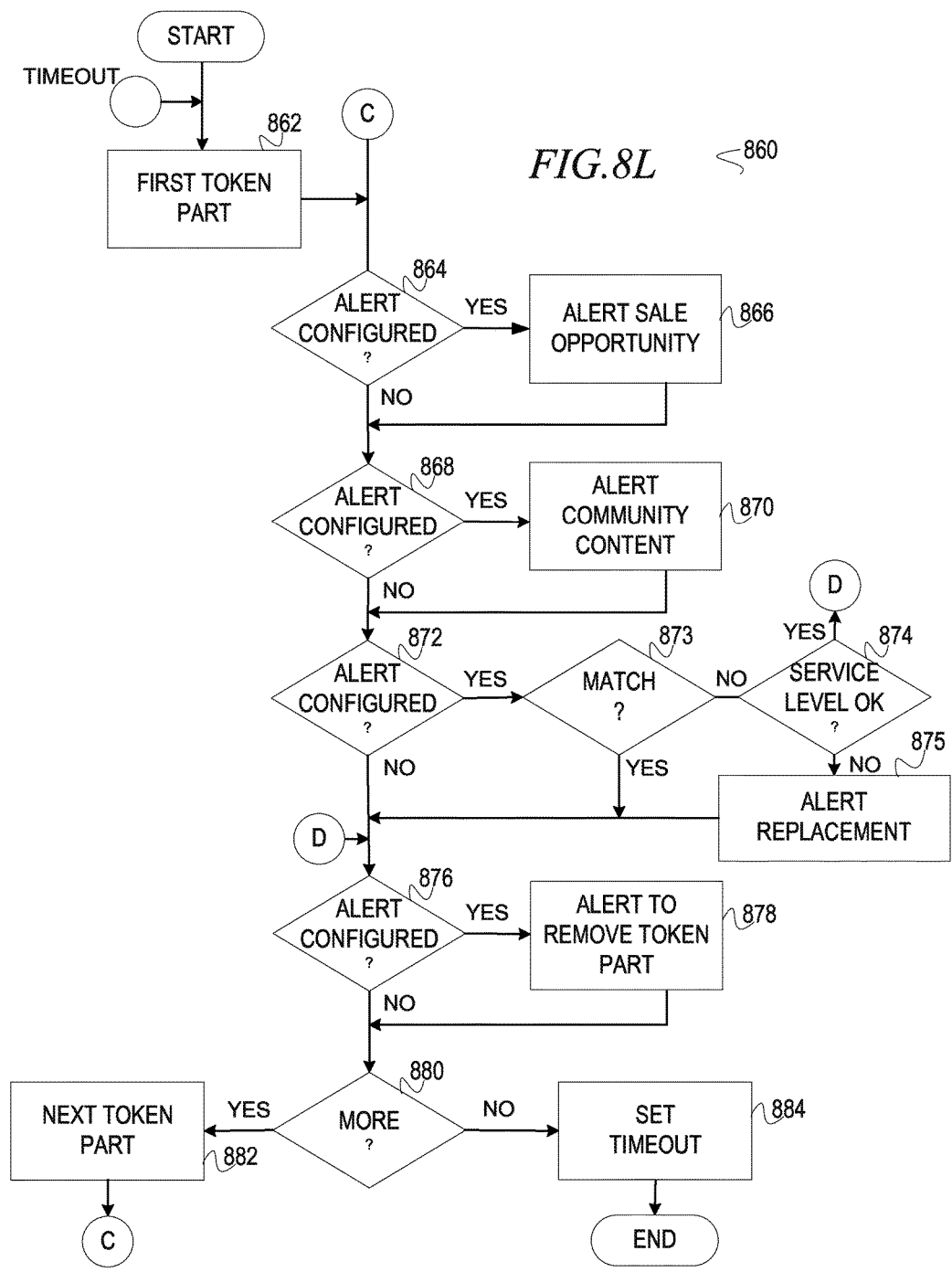
FIG. 8L illustrates a method to process token parts, according to an embodiment.

FIG. 8L illustrates a method 860 to process token parts, according to an embodiment. The method 860 commences at operation 862 responsive to the expiration of a timeout for the method 860 in the timeout information 807 in garage shelf information 802 associated with a particular user on the network-based marketplace 118. The timeout may be configured (e.g., once a day) by the user with the "configure token part command." At operation 862, the processing module 504 may advance to the first token part 814 in the token part information 806 in the garage information 706 associated with the user.

At decision operation 864, the processing module 504 may identify whether an alert is configured for sales opportunities. For example, the alert may be configured "YES" by the user with the "configure token part command." If the alert is configured "YES," then processing continues at operation 866. Otherwise processing continues at decision operation 868. At operation 866, the processing module 504 may communicate an alert indicating a part 106 that corresponds to the present virtual part 812 is being offered for sale. For example, the processing module 504 may communicate the alert to users on the network-based marketplace 118 who are looking for the part 106 that corresponds to the current token part 814 (e.g., operation 830 on FIG. 8K, users who are "watching" for the part 106, etc.).

At decision operation 868, the processing module 504 may identify whether an alert is configured for community content. For example, the alert may be configured "YES" by the user with the "configure token part command." If the alert is configured "YES," then processing continues at operation 870. Otherwise processing continues at decision operation 872. At operation 870, the processing module 504 may identify whether new community content is available based on the current token part 814 and, if so, communicate an alert to the user. For example, the processing module 504 may execute a search of the community content information 803 utilizing information in the current token part 814 including the vehicle identification information 302, the part identifier 306 and/or the part type identifier 308 and/or virtual part preference information (e.g., favorite brands, style, discounted items, etc.) and communicate an alert to the user responsive to identifying one or more new elements of community content information 803 that match. For example, the processing module 504 may communicate an alert that includes one or more links to elements of community content information 803 (e.g., installation guide).

At decision operation 872, the processing module 504 may identify whether an alert is configured to replace a smart component 102 in a vehicle 104. For example, the alert may be configured "YES" by the user with the "configure token part command." Recall that the current token part 814 is a proxy for a real part 106 or smart component 102 on a shelf in the user's garage. If the alert is configured "YES," then processing continues at decision operation 873. Otherwise processing continues at decision operation 876.

At decision operation 873, the processing module 504 may identify whether the current token part 814 corresponds to a smart component 102 that is registered in user's garage information 706. For example, the processing module 504 may identify a smart component 102 in user's garage information 706 by matching the vehicle identification information 302, the part type identifier 308 and/or the part identifier 306 of the current token part 814 with the respective information in a smart component 102 that is registered in user's garage information 706. In some embodiments, a fuzzy match may be sufficient to register a match (e.g., part identifier 306 is not included to register a match, a range of part identifiers 306 is sufficient to register a match, a range of vehicle identification information 302 is sufficient to register a match, or any combination thereof). At decision operation 874, the processing module 504 may identify whether the service level information 318 for the smart component 102 includes a service level that is registered as "OK." If the service level for the identified smart component 102 is registered "OK" then processing continues at decision operation 876 and the user is not alerted. Otherwise processing continues at operation 875 (e.g., service level is "SUGGEST," "WARN", or "REPLACE") and the user is alerted. At operation 875, the processing module 504 may communicate an alert to the user to replace the smart component 102 with the part 106 or smart component 102 corresponding to the current token part 814. In some embodiments, the alert may include the service level.

At decision operation 876, the processing module 504 may identify whether to alert the user to remove the current token part 814. For example, the processing module 504 may identify a smart component 102 that is being reported by a vehicle 104 that is registered with vehicle information 300 in the garage information 706 for the user with a part identifier 306 that matches the part identifier of the current token part 814. If the processing module 504 identifies a match then processing continues at operation 878. Otherwise processing continues at decision operation 880. At operation 878, the processing module 504 may communicate an alert to the user to delete the current token part 814. In some embodiments, the current token part 814 may be automatically deleted responsive to receiving a maintenance message or some other message reporting a matching vehicle identification information 302, part type identifier 308 and part identifier 306.

At decision operation 880, the processing module 504 may identify whether more token parts 814 are in the token part information 806. If the token part information 806 includes more token parts 814, then processing continues at operation 882. Otherwise processing continues at operation 844. At operation 882, the processing module 504 advances to the next token part 814 and processing continues at decision operation 864. At operation 884, the processing module 504 sets the timeout that, upon expiration, initiates the method 860. For example the processing module 504 sets the timeout for the method 860 in the timeout information 807 in garage shelf information 802 associated with the particular user on the network-based marketplace 118.

Figure 8M:
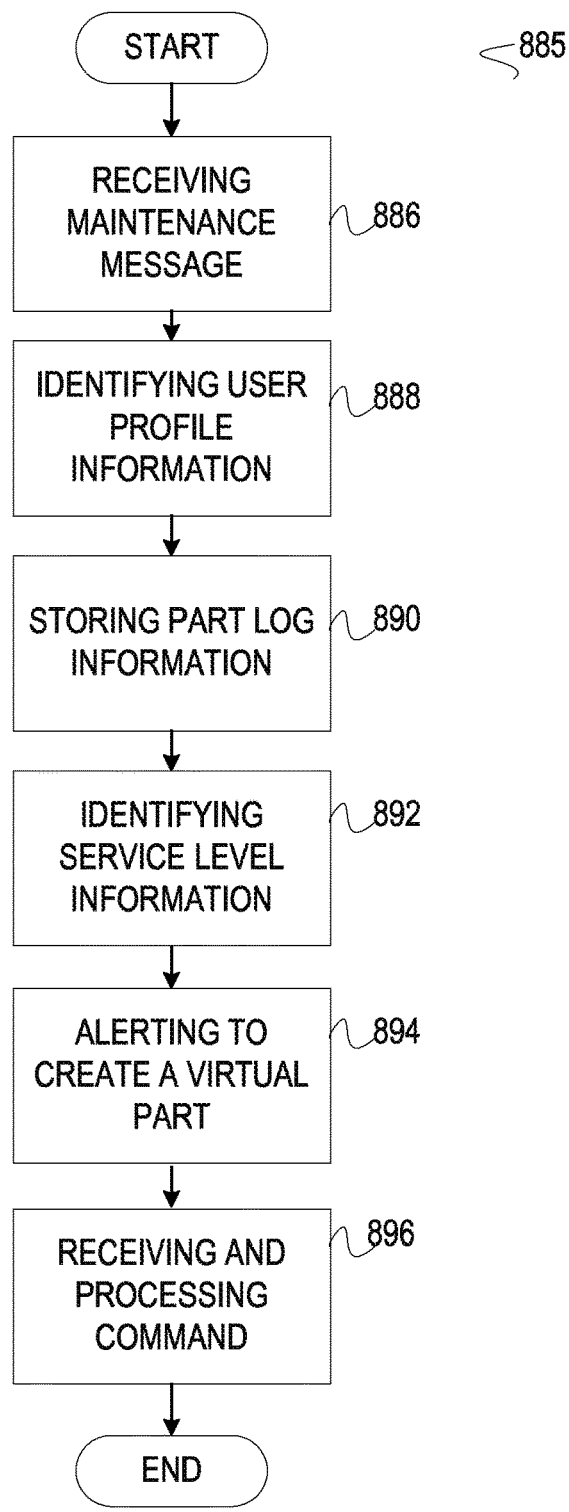
FIG. 8M illustrates a method to utilize an electronic garage shelf, according to an embodiment.

FIG. 8M illustrates a method 885 to utilize an electronic garage shelf, according to an embodiment. The method 885 may commence at operation 886 with the receiving module 502, at the network-based marketplace 118, receiving a maintenance message 400, as described in operation 730 in FIG. 7G. The maintenance message 400 is communicated by the mobile device 112 to the network-based marketplace 118 responsive the mobile device 112 receiving characterization information 312 from a smart component 102 that operates in a vehicle 104. For example, the smart component 102 may include a sensor 108 that senses the wear of a brake pad that provides braking for the front left wheel of a 1999 Ford Explorer.

At operation 888, the processing module 504 may identify user profile information 702 (e.g., John Doe) in a user table 700 based on a user identifier 218 in the maintenance message 400, as described in operation 732 in FIG. 7G.

At operation 890, the processing module 504 may store the characterization information 312 and the timestamp 314 for the brake pad, as part log information 310, in the appropriate part description information 304 (e.g., part 106—brake pad) in the appropriate vehicle information 300 (e.g., vehicle 104—199 Ford Explorer) in the garage information 706 (e.g., garage) in the user profile information 702 (e.g., user—John Doe), as described in operation 734 in FIG. 7G.

At operation 892, the processing module 504 may register a service level for the smart component 102 in the vehicle 104, as described in operations 740-752 in FIG. 7G. For example, the processing module 504 may register a service level of "REPLACE" for the brake pad.

At operation 894, the processing module 504 may communicate an alert to the user (e.g., John Doe) to create a virtual part 812, as described in operations 831 and 833 in FIG. 8J. For example, the processing module 504 may communicate an alert to create a virtual part 812 for the brake pad responsive to identifying a service level that is not "OK" (e.g., "REPLACE").

At operation 896, the receiving module 502 may receive an "add virtual part" command for the brake pad from the user, as described in operation 820 in FIG. 8I. Further at operation 896, the processing module 504 may add the virtual part 812 to the virtual part information 804 in the garage information 706 of the user profile information 702 of the user, as described in operation 822 in FIG. 8I.

Figure 8N:
FIG. 8N illustrates a user interface, according to an embodiment.

FIG. 8N illustrates a user interface 898, according to an embodiment. The user interface 774 is one example of the "add a virtual part" command.

Systems and Methods for Multi-Signal Automated Fault Analysis

FIG. 9A illustrates a system 900, according to an embodiment, for multi-signal fault analysis. The system 900 may include a collection device 901 that utilizes a network 110 to collect multiple signals from a vehicle 104, communicate the signals, over a network 116 to a network-based marketplace 118 that, in turn, stores the multiple signals as multi-signal information 902, analyzes the multi-signal information 902 to identify a diagnosis of the fault and communicates the diagnosis back over the network 116 to one of the mobile devices 112 or a client machine 120. The collection device 901 may be comprised of one or more mobile devices 112. The collection device 901 may further be configured using one of the mobile devices 112 or the client machine 120. Each mobile device 112 may be utilized to sense one or more physical phenomena and communicate signal messages including signal information that represents the physical phenomena, over the network 116, to the network-based marketplace 118. The sensed phenomena, at the mobile device 112, may include optical phenomena, motion phenomena, orientation phenomena. geolocation phenomena, temperature phenomena, humidity phenomena, weather phenomena including atmospheric pressure phenomena, and any other physical phenomena that are representable as signal information. Further, each mobile device 112 may be used to receive characterization information 312 from one or more smart components 102 in the vehicle 104 and communicate the characterization information 312 (e.g., signal information) in a signal message, over the network 116, to the network-based marketplace 118, as previously described. Accordingly, a single mobile device 112 may be configured to sense and communicate one or more types of physical phenomena that are sensed by the mobile device 112 and/or relay one or more types of characterization information 312 that are sensed by smart components 102 that communicate the characterization information 312 to the mobile device 112. The signal information may be stored at the network-based marketplace 118 as multi-signal information 902 according to channels that respectively correspond to the mobile devices 112 and sub-channels that are utilized to distinguish different streams of signal information at the same mobile device 112. The network-based marketplace 118 may analyze the multi-signal information 902 to identify a correlated event that is defined in the fault analysis repository 904 as one or more sets of signal information or derived characteristics that, when combined together, characterize a diagnosis. For example, a squeaking sound and a smart component 102 reporting 90% brake wear that are both received as signal information within five seconds of applying brakes in a 1967 Ford Mustang are received and analyzed as multi-signal information 902 to identify a correlated event corresponding to a diagnosis of a brake failure. Further, the network-based marketplace 118 may associate the diagnosis with a prognosis to facilitate a repair of the identified fault. It will be appreciated by one skilled in the art that the system 900 may operate in conjunction with smart components 102, as described in this document. Accordingly, the same or similar references have been used to indicate the same or similar features unless otherwise indicated. While the vehicle 104 is illustrated as an automobile, it will be appreciated that trucks, all-terrain vehicles, jeeps, aircraft, water-born vessels, space vessels, and the like may embody the illustrated vehicle 104. Further, one skilled will appreciate that a ruggedized form of multi-signal fault analysis may be performed on entities other than the vehicle 104 and in environments that are deemed too difficult to access (e.g., desert, mountain, cliff, top of a structure, etc.) or too hazardous to access (e.g., military/combat). For example, in an environment where direct human placement of the mobile devices 112 is too hazardous, one or more mobile devices 112 may be mounted on one or more drones, configured as a collection device 901, and flown into the hazardous environment to collect signal information from the test object. Accordingly, the collection device 901 may be flown to a recently destroyed bridge in a combat zone to collect signal information in an otherwise too hazardous environment. Further for example, in an environment where direct human placement of the mobile devices 112 is too difficult to access, one or more mobile devices 112 may be mounted on one or more drones, configured as a collection device 901, and flown to the difficult to access environment to collect signal information from the test object. For example, the collection device 901 may be flown to a turbine in a wind tower to collect signal information in an otherwise too hazardous environment.

In a more typical example, a user may perform a fault analysis on a 1967 Ford Mustang by configuring the collection device 901 to collect (operation "A'") signal information from a first mobile device 112 that receives signal information from a smart component 102 that includes a sensor 108 that senses a brake pad that is mounted on the front right wheel of the Mustang and signal information from a second mobile device 112 that includes a microphone that receives audio. Further, the user may operate wearable technology such as an optical head-mounted receiver and display (e.g., Google Glass) that may be tapped by the user to arm the collection device 901 to monitor for receipt of signaling information for the squeaking sound to initiate the capture and storage of multi-signal information 902 including the above described audio signal information and signal information from a smart component 102. For a particular test, the user follows test design information including instructions to rest the second mobile device 112 on a passenger seat of the Mustang, accelerate to a speed of five mph, tap on the Google Glass to arm the collection device 901, and apply the brakes to achieve a dead stop. Accordingly, the network-based marketplace 118 may respond to the tap on the Google Glass by monitoring the signal message information from the second mobile device for receipt of the squeaking sound and responsive to receipt of the squeaking sound store (operation "B'") multiple instances of the signal message information from the first and second mobile devices. Further, the network-based marketplace 118 may respond to an end of the test event by initiating an analysis (operation "C'") of the multi-signal information 902 that was collected to diagnose (operation "D'") the fault (e.g., right front brake is worn out) and communicate a message including the diagnosis of the fault to the first mobile device. In some embodiments, the message may further include a prognosis (operation "E'") including an estimated cost for repair at a local service shop and a list of parts.

The collection device 901 may be comprised of one or more mobile devices 112 including mobile devices 112 that are carried (e.g., smart phones and other devices that are carried), mobile devices 112 that are worn (e.g., smart glasses, smart watches, and other smart devices that are worn), and mobile devices 112 that are purpose built. The mobile devices 112 that are purpose built are now further described. Mobile devices 112 that are purpose built are designed for a particular purpose and location. Mobile devices 112 that are purpose built may be designed to include a magnetic attachment or fastener attachment for attachment to target location (e.g., engine compartment, wheel well, etc.). Mobile devices 112 that are purpose built may provide in-operation monitoring from the target locations that not accessible to a human-held or consumer-grade device. Mobile devices 112 that are purpose built may be different in appearance from a consumer device (e.g., no display, ruggedized exterior, hermetically sealed, etc. . . . ), nevertheless, implement the same functions as other mobile devices 112 that operate in the collection device 901. For example, mobile devices 112 that are purpose built may operate as general-purpose single or multi-channel signal devices. Further, mobile devices 112 that are purpose built may operate to capture one or more specific types of signals and/or in specific use cases (e.g., including a monitor designed to diagnose engine noise with an optional rigid temperature resistant module containing only noise/vibration sensors 108) (e.g., including a monitor designed to diagnose engine noise with an optional rigid temperature resistant module containing only an adhesive single-use temperature and flexion monitor)(e.g., including a monitor designed to capture belt timing via a strobe & camera).

FIG. 9B illustrates a test protocol 906, according to an embodiment. Illustrated on the left are operations performed by one or more mobile devices 112 and illustrated on the right are operations performed by the network-based marketplace 118. The test protocol 906 may include communications originating from the mobile devices 112 including the user test request information 908 and fault analysis test session 912 and a communication originating from the network-based marketplace 118 including the test design information 910.

The user test request information 908 may include a request for a fault analysis. For example, the user test request information 908 may include information typically communicated to a mechanic who is skilled in fixing vehicles 104 including symptoms, sounds, failures, conditions, etc. Responsive to receipt of the user test request information 908, the network-based marketplace 118 may match the user test request information 908 to corresponding system test request information in the fault analysis repository 904 (not shown) to identify the appropriate test design information 910 and communicate the test design information 910 back to the mobile device 112.

The test design information 910 may include instructions to configure the collection device 901, instructions to establish conditions for performing the data collection (e.g., drive at a specific speed and apply brakes), and instructions to arm the collection device 901 (e.g., tap on the Google Glass) to collect signal information. For example, the user may follow the instructions in the test design information 910 to register mobile devices 112 and the type of signal information being received by each of the mobile devices 112 with one or more commands that are entered from the mobile device 112. Further for example, the user may follow the instructions in the test design information 910 to register a wearable device by pairing the wearable device (e.g., Google Glass, smart watch, etc.) with a particular mobile device 112.

The fault analysis test session 912 is comprised of a test arming event 914, a test triggering event 916, multi-signal information 902, and a test end event 918. The test arming event 914 may be received from one of the mobile devices 112 as signal information to signal the network-based marketplace 118 to begin monitoring signal information for a test triggering event 916. For example, the test arming event

914 may be a tap on Google Glass. The test triggering event 916 may further be received as signal information to signal the network-based marketplace 118 to begin collecting and storing the multi-signal information 902. For example, the test triggering event 916 may be a squeaking sound that is sensed after the test arming event 914 has been received. In some cases, the test design information 910 may describe the test arming event 914 and the test triggering event 916 as the same event. The test end event 918 may be received as signal information or a system timeout that signals to the network-based marketplace 118 that the fault analysis test session 912 has completed and to begin an analysis of the multi-signal information 902 that was collected. For example, responsive to receipt of the test end event 918, the network-based marketplace 118 may register the end of the fault analysis test session 912 and analyze the multi-signal information 902 to identify whether the fault identified with the user test request information 908 was diagnosed. The network-based marketplace 118 may analyze the multi-signal information 902 by comparing it with the multi-signal information 902 in the fault analysis repository 904 to identify a one or more correlated events. Identification of one or more correlated events constitutes a diagnosis of the problem. On the other hand, if the problem is not diagnosed, the fault analysis test session 912 may be repeated with a new set of test design information 910. For example, the network-based marketplace 118 may alter the test conditions or add a new mobile device 112 to collect additional signal information or add more signal information (e.g., speed, sound, image, motion picture, etc.) to an existing mobile device 112. The process described above may be iterated until the problem is diagnosed or until all available tests are exhausted. In some embodiments, the network-based marketplace 118 may request expert manual intervention in response to identifying all available tests is exhausted.

Figure 9C:
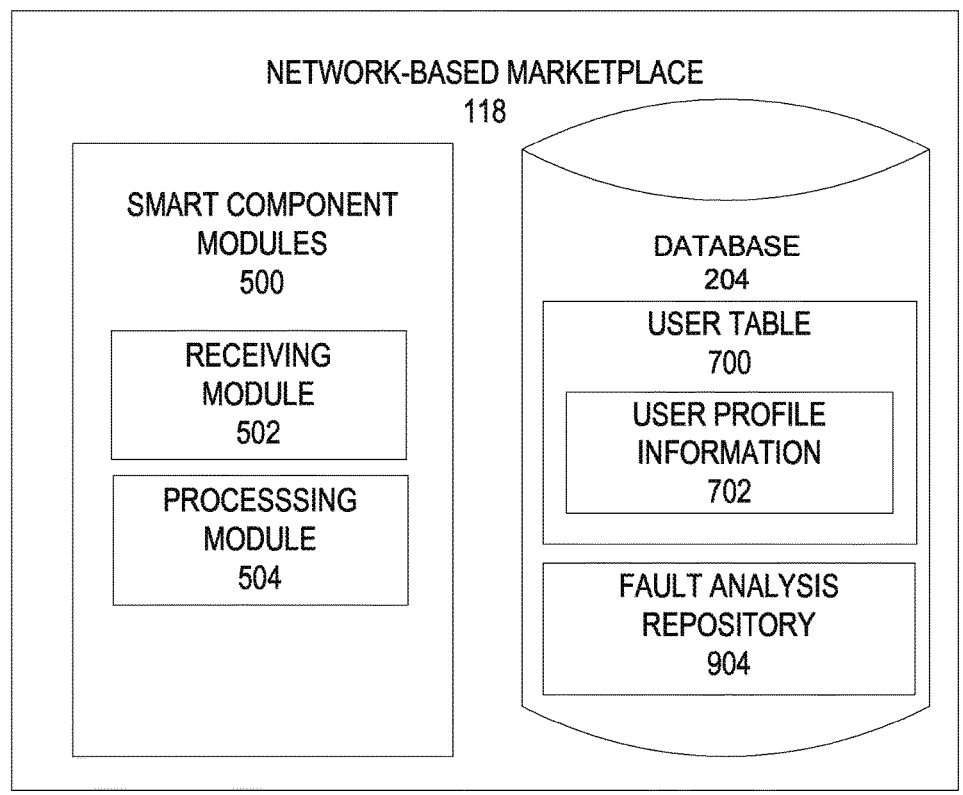
FIG. 9C illustrates a network-based marketplace, according to an embodiment.

FIG. 9C illustrates a network-based marketplace 118, according to an embodiment. The network-based marketplace 118 may include smart component modules 500 and a database 204. The network-based marketplace 118, smart component modules 500 and database 204 operate as previously described and further as follows. The smart component modules 500 may include a receiving module 502 and a processing module 504. The receiving module 502 may receive commands from the mobile device 112 or the client machine 120. Further, the receiving module 502 may receive the user test request information 908 (not shown), events included in the fault analysis test session 912 (not shown) and the signaling messages from the mobile devices 112 (not shown) including signal information that is collectively stored as multi-signal information 902 (not shown) in the appropriate user profile information 702. The processing module 504 may process the aforementioned information, events, and messages including the signal information to update the database 204, and respond to the mobile devices 112 and client machine 120. The database 204 may include the user profile information 702 in the user table 700 and fault analysis repository 904 in addition to other data structures previously described though not presently shown. The user profile information 702 may be used to store the multi-signal information 902 for one or more fault analysis according to users on the network-based marketplace 118. The fault analysis repository 904 may be used to store multiple entries of system fault analysis information 953 that are used to diagnose the problems/faults described by the user fault analysis information 920.

Figure 9D:
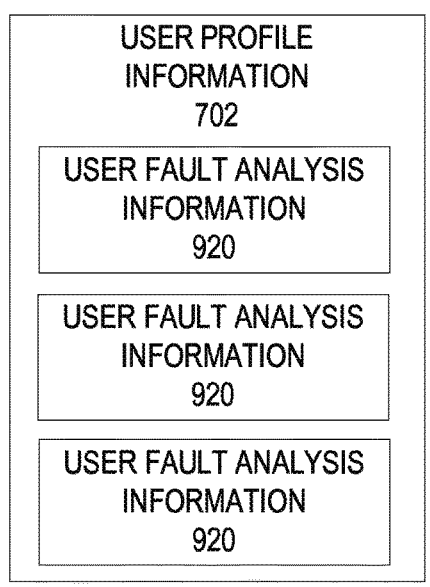
FIG. 9D illustrates user profile information, according to an embodiment.

FIG. 9D illustrates user profile information 702, according to an embodiment. The user profile information 702 has been previously described. With respect to the current feature, the user profile information 702 may store one or more entries of user fault analysis information 920 for a particular user on the network-based marketplace 118. For example, each fault analysis that is initiated by a user with the user test request information 908 may be associated with one entry of user fault analysis information 920.

Figure 9E:
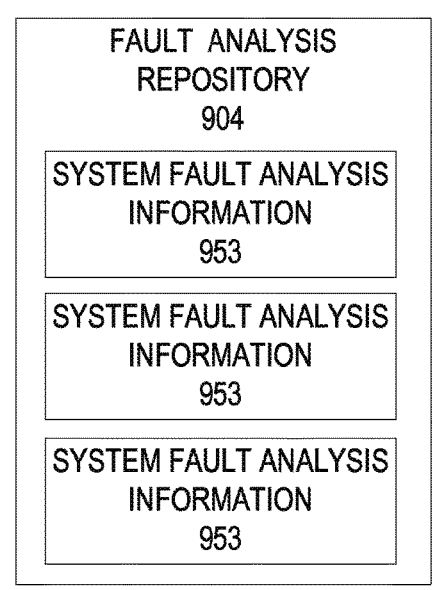
FIG. 9E illustrates a fault analysis repository, according to an embodiment.

FIG. 9E illustrates a fault analysis repository 904, according to an embodiment. The fault analysis repository 904 may be used to store system fault analysis information 953 entries that are used for fault/problem diagnosis. For example, multiple system fault analysis information 953 entries may be stored in the fault analysis repository 904 for diagnosing a front brake failure for a 1967 Ford Mustang and other types of failures. Accordingly, a user fault analysis information 920 entry in the user profile information 702 that is being utilized to perform a fault analysis for a particular user may be compared with relevant entries of system fault analysis information 953 in the fault analysis repository 904 to identify and communicate test design information 910, diagnose a fault, identify a prognosis of a fault and identify one or more experts. Accordingly, each of the system fault analysis information 953 entries may be considered signatures for a particular problem diagnosis, as described further below. The fault analysis repository 904 may be generated based on different sources of information. For example, an entry of system fault analysis information 953 may be generated based on a bulletin or a recall notice. According to one embodiment, an entry of system fault analysis information 953 that is generated based on a bulletin or a recall notice may be utilized to confirm or pre-qualify a particular vehicle 104 as exhibiting symptoms associated with the bulletin or recall.

Figure 9F:
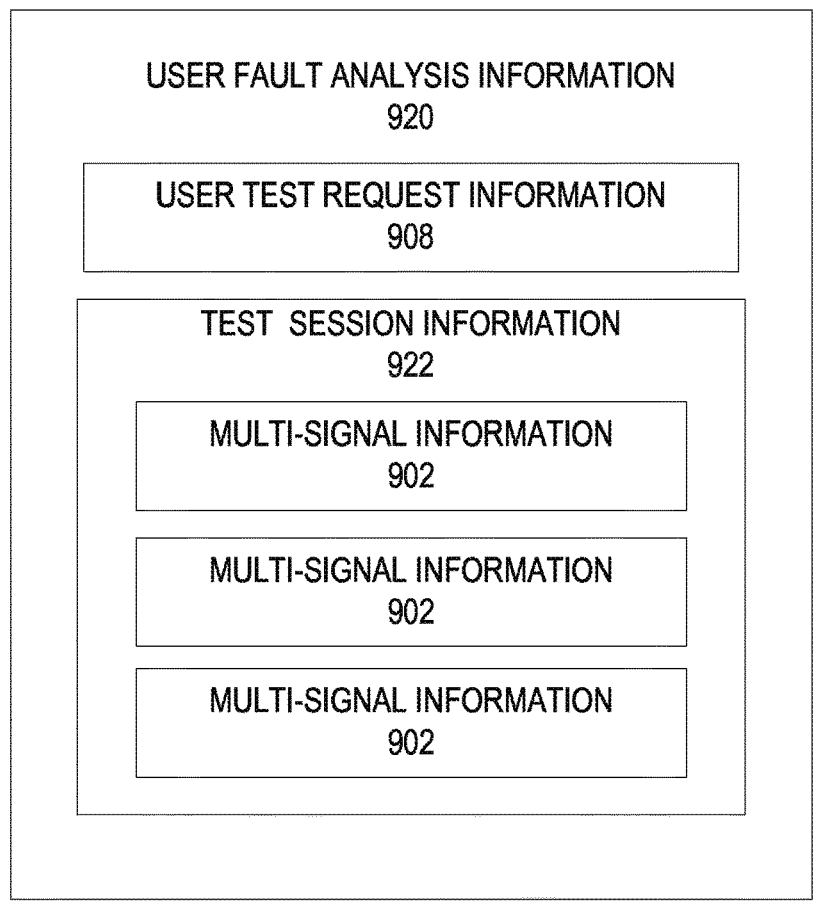
FIG. 9F illustrates user fault analysis information, according to an embodiment.
Figure 9F:
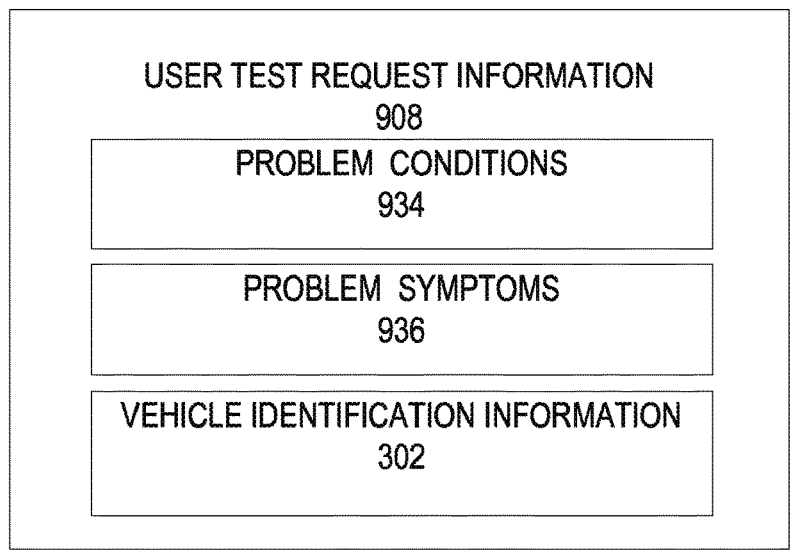

FIG. 9F illustrates user fault analysis information 920, according to an embodiment. The user fault analysis information 920 may include user test request information 908 and test session information 922. The user test request information 908 may be received from the user or the network-based marketplace 118 and stored in the user fault analysis information 920. Receipt of user test request information 908 initiates a fault analysis. The user test request information 908 in the user fault analysis information 920 may be compared with the system test request information in system fault analysis information 953 to identify a match. Responsive to identification of the match, the test design information 910 and other information from the system fault analysis information 953 may be utilized to perform a fault analysis, as described further below. The test session information 922 includes one or more entries of multi-signal information 902 that are collected with the collection device 901. Each entry of multi-signal information 902 corresponds to one fault analysis test session 912.

FIG. 9FF illustrates user test request information 908, according to an embodiment. The user test request information 908 may be received from a user or from the network-based marketplace 118 to initiate multi-signal fault analysis. For example, a user may interact with a set of user interfaces to make selections that are utilized to generate the user test request information 908 for storage in the user fault analysis information 920 in the user profile information 702. Further, for example, the network-based marketplace 118 may automatically generate the user test request information 908 based on a recall or service bulletin that identifies a part 106 and vehicle 104, the user test request information 908 being communicated to a mobile device 112 that, in turn, receives an affirmation from the user that is communicated with the user test request information 908 back to the network-based marketplace 118 to initiate multi-signal fault analysis for a particular vehicle 104. In another embodiment, the processing module 504 may automatically generate the user test request information 908 responsive to receiving characterization information 312 from smart component 102 that is stored in part description information 304 (e.g., part 106) associated with a user. For example, responsive to receipt of characterization information 312, the processing module 504 may identify the characterization information 312 for the particular part 106 and vehicle 104 as being associated with a particular type of user test request information 908 by performing a mapping operation (e.g., identifying an predetermined association between (part 106, vehicle 104, identified characterization information 312) and the user test request information 908), communicating the user test request information 908 to a mobile device 112 that, in turn, receives an affirmation from the user that is communicated with the user test request information 908 back to the network-based marketplace 118 to initiate multi-signal fault analysis for a particular vehicle 104. In another embodiment, the user test request information 908 may be communicated directly to the network-based marketplace 118 to initiate multi-signal fault analysis and a notice of test initiation may be communicated to the user. In another embodiment, the processing module 504 may automatically generate the user test request information 908 responsive to identifying a level of service in service level information 318 in part description information 304 (e.g., part 106) associated with a user. For example, responsive to identification of service level information 318 that is not "OK," the processing module 504 may identify the identification of a service level in service level information 318 that is not "OK" for the particular part 106 and vehicle 104 as being associated with a particular type of user test request information 908 by performing a mapping operation (e.g., identifying an predetermined association between (part 106, vehicle 104, identified service level information 318) and the user test request information 908), communicating the user test request information 908 to a mobile device 112 that, in turn, receives an affirmation from the user that is communicated with the user test request information 908 back to the network-based marketplace 118 to initiate multi-signal fault analysis for a particular vehicle 104. In another embodiment, the user test request information 908 may be communicated directly to the network-based marketplace 118 to initiate multi-signal fault analysis and a notice of test initiation may be communicated to the user.

The user test request information 908 may include problem conditions 934, problem symptoms 936 and vehicle identification information 302. The problem conditions 934 may describe conditions that are associated with the problem symptoms 936. For example, the problem conditions 934 may include a particular range of speed and/or motion such as turning right, turning left, backing up, etc. The problem symptoms 936 may include some discretely observable phenomena such as a high pitched sound, a low rumbling sound, a loss of power, a vibration, etc. that occurs in association with the problem conditions 934. The vehicle identification information 302 describes a make, model, and year of a vehicle 104, as previously described. All or part of the vehicle identification information 302 may be optionally entered.

Figure 9G:
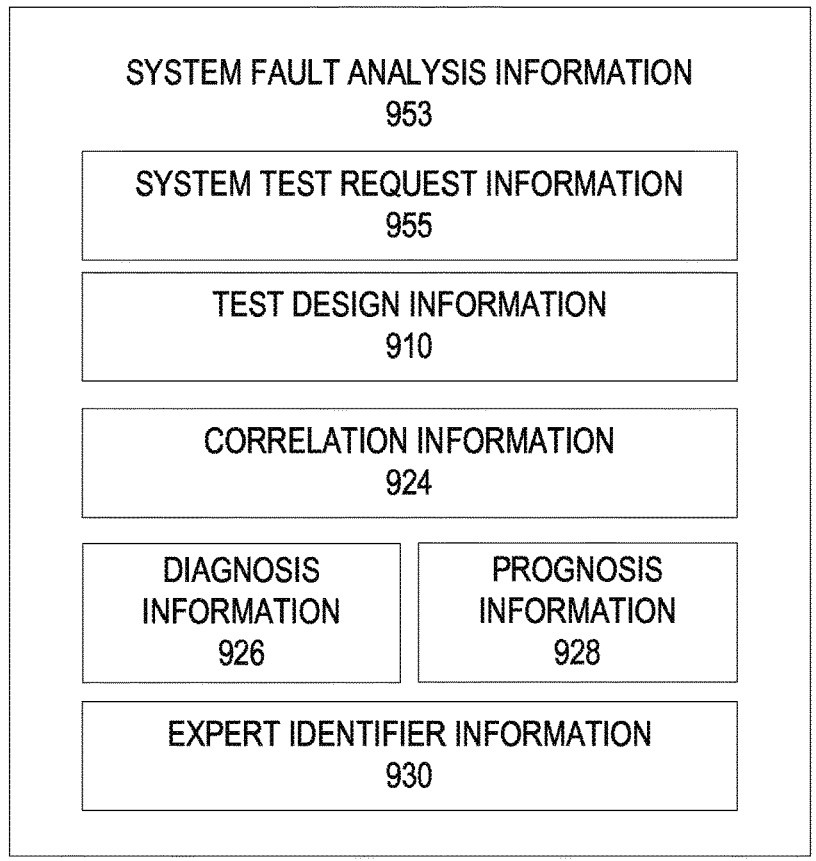
FIG. 9G illustrates system fault analysis information, according to an embodiment.
Figure 9G:
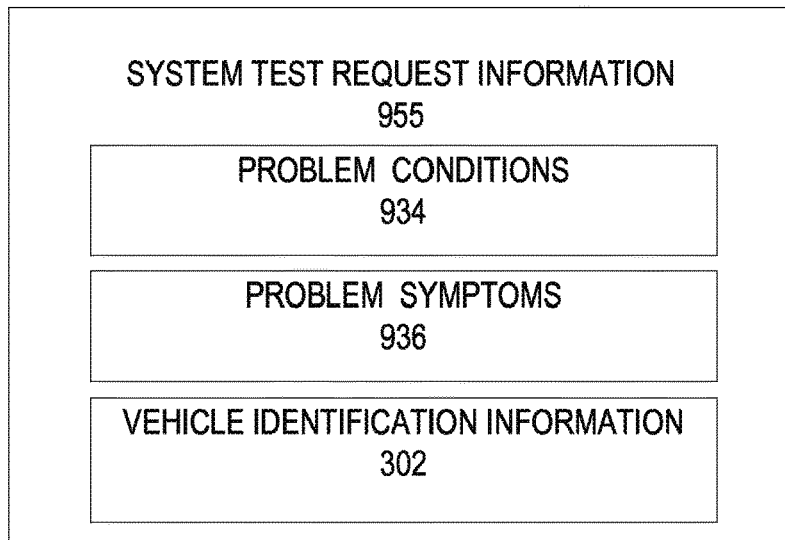

FIG. 9G illustrates system fault analysis information 953, according to an embodiment. The system fault analysis information 953 may be utilized to identify and communicate test design information 910 and analyze the test session information 922 in the user fault analysis information 920 (not shown) to diagnose a fault. The system fault analysis information 953 may include the system test request information 955, test design information 910, correlation information 924, diagnosis information 926, prognosis information 928, and expert identifier information 930. The system test request information 955 may be utilized to associate a particular entry of system fault analysis information 953 with user test request information 908 to initiate a fault analysis test session 912 (not shown). The test design information 910 was previously described. The correlation information 924 may be utilized to analyze the multi-signal information 902 in the user fault analysis information 920 (not shown). The diagnosis information 926 may include diagnostic problem information, diagnostic repair information and diagnostic certainty information. The diagnostic problem information includes a diagnosis of the problem described by the associated system test request information 955. For example, the diagnostic problem information may include "front left tire is low on air," "spark plug in number 4 cylinder is misfiring," "engine is running roughly," "battery low." The diagnostic repair information may include a remedy to the diagnosed problem such as "replace front left tire," "replace spark plug in number four cylinder," "perform tune-up," "replace battery." The diagnostic certainty information may include a quantified certainty that the diagnosis of the problem is correct. For example, the diagnostic certainty information may include 90%. The prognosis information 928 may include information related to fixing the fault that is diagnosed. For example, the prognosis information 928 may include repair estimate information and repair list information. The repair estimate information may be utilized to generate estimates for repair based on a user performing their own work or based on a local shop performing the work. The repair estimate information utilized to generate estimates for repair based on a local shop performing the work may include a monetary estimate to fix the vehicle 104, an estimate of time to perform the work, a likelihood that the repair will address the problem (e.g., a percentage), and an estimate of urgency to fix the problem including a level of risk (e.g., YELLOW, ORANGE, or RED) or a cascading failure description describing other failures likely to occur if the current problem is not fixed. The repair list information may be utilized to generate a list of parts that are needed to repair the problem described by the associated user test request information 908. The list may further include an estimated cost for each of the parts from a supplier. The expert identifier information 930 may include user identifiers 218 that identify users on the network-based marketplace 118 that are qualified experts to diagnose or fix the problem described by the associated system test request information 955.

FIG. 9GG illustrates system test request information 955, according to an embodiment. The system test request information 955 may be initialized by a system administrator. The system test request information 955 may include problem conditions 934, problem symptoms 936 and vehicle identification information 302, as previously described. The system test request information 955 may be compared with user test request information 908 to identify a match. A fuzzy match may constitute a match. For example, overlapping ranges of problem conditions 934 and/or overlapping ranges of problem symptoms 936 and/or overlapping ranges of vehicle identification information 302 or parts of the vehicle identification information 302 may constitute a match.

Figure 9H:
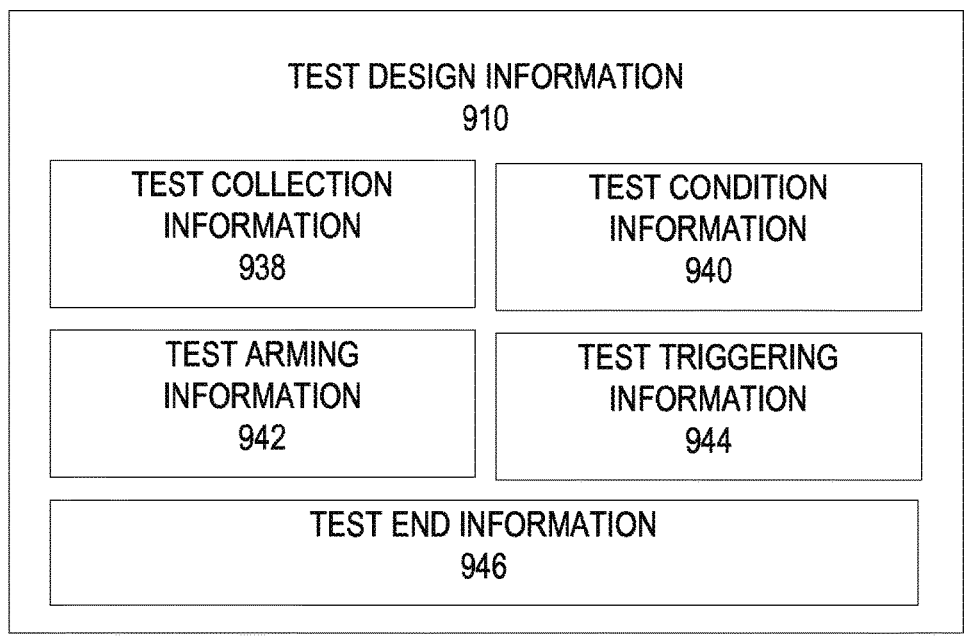
FIG. 9H illustrates test design information, according to an embodiment.

FIG. 9H illustrates test design information 910, according to an embodiment. The test design information 910 may include test collection information 938, test condition information 940, test arming information 942, test triggering information 944 and test end information 946. Recall that the test design information 910 is communicated to a user responsive to receiving from the user the user test request information 908 that includes a description of a problem with a vehicle 104. The test design information 910 provides instructions for the user to perform a fault analysis test session 912 (not shown). The test collection information 938 may provide specifications for configuring the collection device 901. For example, the test collection information 938 may specify the number of mobile devices 112 and the type of signaling information that is collected at each of the mobile devices 112. Further, the test collection information 938 may specify whether one or more wearable devices are included in the collection device 901 and other information related to the wearable devices including the type of signaling information to collect and the identity of the mobile device 112 to pair with the wearable device. Further the test collection information 938 may instruct the user to perform multiple fault analysis test sessions 912 as prompted by the network-based marketplace 118 with a notice that includes a reminder. For example, the network-based marketplace 118 may communicate a notice to the user including a reminder for the user to perform the next multiple fault analysis test session 912. In one embodiment, the network-based marketplace 118 may communicate the notice for the next fault analysis test session 912 based on a schedule (e.g., date and time). In one embodiment, the network-based marketplace 118 may communicate the notice for the next fault analysis test sessions 912 to be performed based on the network-based marketplace 118 identifying one or more conditions (e.g., time and/or date and/or presence in the car and/or driving condition) that maximize the value of the fault analysis test sessions 912. The test condition information 940 may specify the conditions under which to perform the fault analysis test session 912. For example, the test condition information 940 may specify the position (e.g., on the dashboard, under the hood, back seat, front seat, etc.) of the mobile device(s) 112, the driving activities (e.g., speed, motion, activity, etc.), and the driving conditions (e.g., rain, snow, up a hill, down a hill, etc.) for the fault analysis test session 912. The test arming information 942 may specify a test arming event 914 that is received by a mobile device 112 or wearable device to arm the collection device 901. For example, the test arming event 914 may include a tap, a push of a button, a waving motion, or some other signal that is sensed. The test triggering information 944 may specify a test triggering event 916 that is received by a mobile device 112 to initiate collection and storage of signal information. For example, the test triggering event 916 may include signaling information for a discrete phenomenon that is received as signal information by one of the mobile devices 112 in the collection device 901. For example, the test triggering event 916 may include one of the problem symptoms 936 included in the user test request information 908. The test end information 946 may specify a test end event 918 that terminates the fault analysis test session 912. For example, the test end event 918 may include a timeout that expires a period of time after the test triggering event 916 is received. Further for example, the test end event 918 may include a discrete phenomenon that is received as signal information by one of the mobile devices 112 in the collection device 901.

Figure 9I:
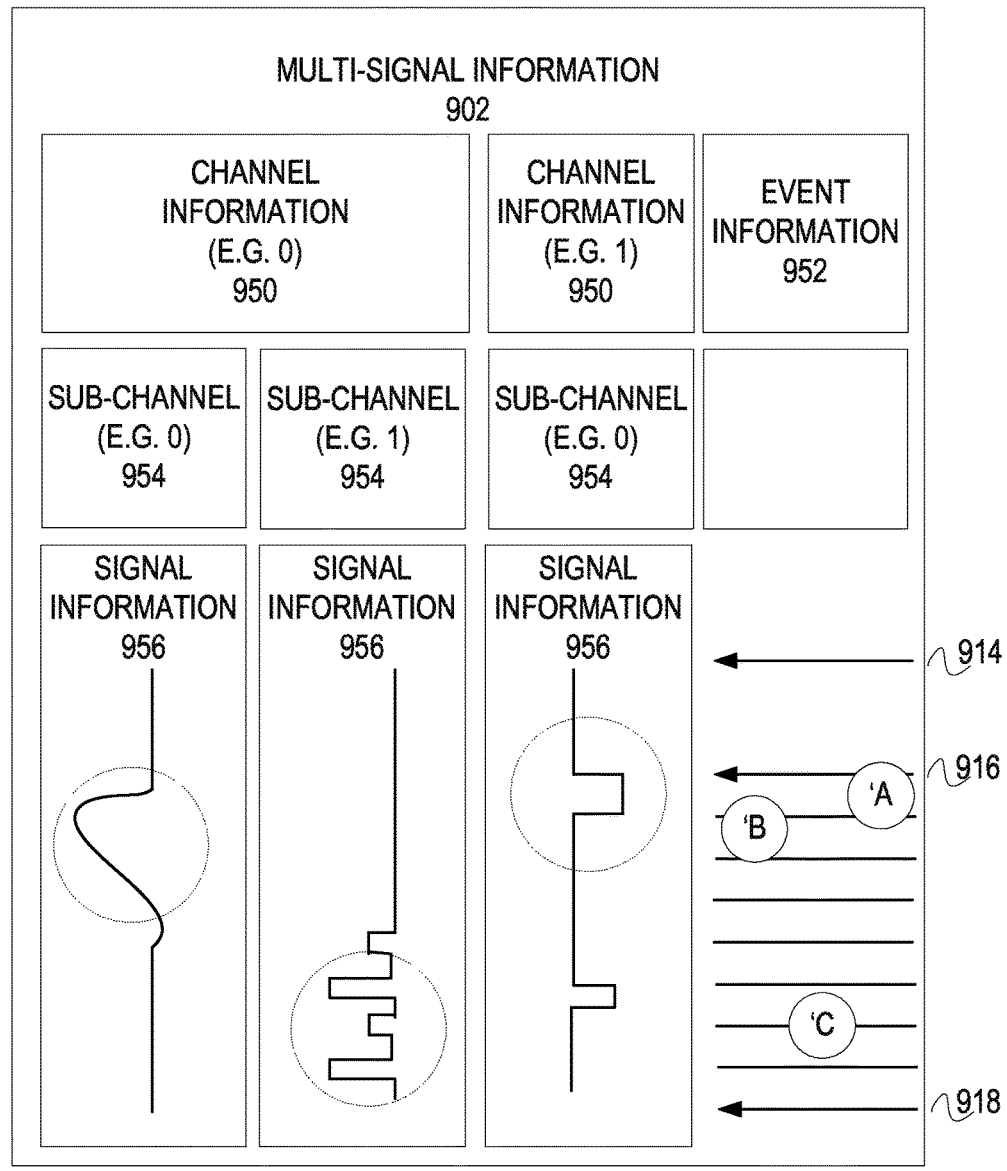
FIG. 9I illustrates multi-signal information, according to an embodiment.

FIG. 9I illustrates multi-signal information 902, according to an embodiment. The multi-signal information 902 may include channel information 950, event information 952, sub-channels 954, and signal information 856. All channel information 950 in the multi-signal information 902 is associated with a single collection device 901 and fault analysis test session 912. Each entry of channel information 950 is associated a mobile device 112 that may receive one or more entries of signal information 956 respectively identified according to sub-channels 954. Two sub-channels 954 are illustrated on the left as associated with one channel information 950 (e.g., channel zero), however, more or fewer sub-channels 954 may be configured. The signal information 956 may be received from a mobile device 112 in signal messages and stored in the multi-signal information 902 in chronological order according to the timestamps 314. The signal information 956 is illustrated as being received with earlier timestamps 314 towards the top. Signal information 965 may be compressed without loss, compressed with acceptable loss with acceptable lossiness as defined by a system administrator or user, sparsely represented (e.g., omitting "uninteresting" data leaving resulting signal information 965 that is discontinuous according to timestamps 314 and optionally annotated), represented as a processed or derived form (e.g., frequency-domain transform), annotated as sequence of interpreted events (e.g., ["time 1:05: event 85C", "time 1:10: event 85C"]), annotated with an indirect reference (e.g., stored signal information 965 is equivalent to reference (or previously-delivered) signal ABC 123 within specified tolerances). In addition, the signal information 965 may not be anomalous. In these instances the signal information 965 may be annotated "not anomalous," "existing," "no-anomaly," "provided upon request," "folded," or "delta." The "folded" annotation signifies signal information 965 is based upon a fixed periodicity where a repeating signal is treated as a series of many measurement windows with only the averaged measurement of one or more windows being reported. The "delta" annotation signifies signal information 965 that is being reported as the difference of a reference signal (e.g., natural, synthetic, modeled, etc.). The "phase" annotation signifies a shift of one instance of signal information 965, in time, relative to another instance of signal information 965. The "delta" and "phase" annotations may be used in conjunction. For example, if a sample of signal information 965 is slightly delayed relative to a reference sample of signal information 965, and also contains a small amount of 'interesting' noise, then the time shift can be represented by a single phase measurement, with the remaining noise being represented efficiently by delta measurements between the phase-corrected signals.

Each of the signal information 956 is further illustrated as representing different phenomena over time with different characteristics (e.g., hill, little ratchet, big ratchet). The event information 952 may store a registration of the test arming event 914, a registration of the test triggering event 916, a registration of correlated events (e.g., '"A," "B," "C"') a registration of the test end event 918, and annotations as described above though not shown. The correlated events are registered, as such, in the event information 952 for a fault analysis test session 912 responsive to an analysis that identifies a match with correlation information 924 in the fault analysis repository 904 (not shown), as described further below. A fuzzy match may be sufficient to constitute a match. For example, the correlated event may be registered in the event information 952 in the multi-signal information 902 responsive to correlated events (e.g., '"A," "B," "C"') that differ in time, magnitude, periodicity, etc. within respective and specified ranges as specified by correlation information 924 in the user fault analysis information 920 in the fault analysis repository 904.

FIG. 9J illustrates correlation information 924, according to an embodiment. The correlation information 924 may store one or more correlated events 958, as previously described. A particular correlated event 958 is a signature to diagnose a failure. The correlation information 924 may include multiple and different correlated events 958 and each correlated event 958 may be sufficient to diagnose the same failure (e.g., brake failure). Each correlated event 958 may be compared with multi-signal information 902 in the user profile information 702 to identify whether the multi-signal information 902 matches the correlated event 958 signifying diagnosis of the failure. For example, the correlated event 958 that is presently illustrated is comprised of an event "'A" that was identified in first signal information 956, an event "'B" that was identified in second signal information 956, and an event "'C" that was identified in third signal information 956 to constitute a single correlated event 958. Further, the events "'A," "'B" and "'C" in the user profile information 702 may be identified to constitute a match with the events "'A," "'B" and "'C" in the correlation information 924 according to predetermined ranges of variability in the shape, timing, amplitude, and periodicity of the respective events. Further, the events "'A," "'B" and "'C" in the user profile information 702 may be identified to constitute a match with the events "'A," "'B" and "'C" in the correlation information 924 according to predetermined ranges of variability in relation to each other. For example, a predetermined range of variability between event "'A" and "'B" may include their occurrence in time within a predetermined range (e.g., two minutes). Further, the number of events in one correlated event 958 may be more or fewer than the number of events in another correlated event 958.

FIG. 9K illustrates a signal message 960, according to first embodiment. The signal message 960 may be communicated by a mobile device 112 to the network-based marketplace 118 responsive the mobile device 112 being configured to sense and report a type of physical phenomena (e.g., image, motion image, sound, pressure, temperature, etc.) at the mobile device 112. The signal message 960 may include a user identifier 218, vehicle identification information 302, channel information 950, sub-channel 954, signal information 956 and the timestamp 314, all as previously described.

FIG. 9L illustrates a signal message 960, according to a second embodiment. The signal message 960 may be communicated by a mobile device 112 to the network-based marketplace 118 in response to the mobile device 112 being configured to receive characterization information 312 from a smart component 102 and communicate the characterization information 312 in the signal message 960 to the network-based marketplace 118. The signal message 960 may include a maintenance message 400, as previously described. The signal message 960 may further include channel information 950 and the sub-channel 954 both as previously described. The characterization information 312 may be received as signal information 956 at the network-based marketplace 118.

FIG. 9M illustrates a method 961 to process a test request, according to an embodiment. Illustrated on the left are operations performed at the mobile device 112 and illustrated on the right are operations performed at the network-based marketplace 118. The method 961 may commence at operation 962, at the mobile device 112, with a user entering user test request information 908 that is communicated to the network-based marketplace 118. For example, the user may navigate a series of screens to generate user test request information 908 including problem symptoms 936 describing a squeaking sound emanating from the right front wheel under problem conditions 934 describing brakes that are applied at a specified speed for vehicle identification information 302 describing a 1967 Ford Mustang with a vehicle identification number of XYZ123245 and odometer reading of 1234567.

At operation 964, at the network-based marketplace 118, the receiving module 502 may receive the user test request information 908 and at decision operation 966 the processing module 504 may identify whether the test design information 910 is identified in the fault analysis repository 904 for the user test request information 908 that was received. The decision operation 966 is described more fully with reference to FIG. 9O as a method 903 to identify test design information 910. If the test design information 910 is identified (e.g., "NEXT TEST"), at decision operation 966, then a branch is made to operation 968. Otherwise a branch is made to connector "E" (e.g., "NO TEST") which corresponds to connector "E" on FIG. 9N. At operation 968, the processing module 504 may communicate the test design information 910 to the mobile device 112.

At operation 970, at the mobile device 112, the user may receive the test design information 910. At operation 972 the user may configure the collection device 901 based on the test collection information 938 in the test design information 910. For example, the user may configure a first mobile device 112 to receive characterization information 312 from a smart component 102 that senses brake wear on the front right brake in the Mustang, configure a second mobile device 112 to sense audio, and execute a pairing operation to pair the Google Glass with the second mobile device 112. At operation 974, the user may setup test conditions based on based on the test condition information 940 in the test design information 910. For example, the user may set the first mobile device 112 and the second mobile device 112 on the passenger's seat in the Mustang, accelerate to five mph, tap the Google Glass and apply the brakes to achieve a dead stop.

FIG. 9N illustrates a method 976 for multi-signal automated fault analysis, according to an embodiment. Illustrated on the left are operations performed at the mobile devices 112 and illustrated on the right are operations performed at the network-based marketplace 118. The method 976 may commence, at operation 978, with the mobile devices 112 in the collection device 901 communicating signal messages 960 to the network-based marketplace 118. According to one embodiment, the mobile devices 112 may commence communicating signal messages 960 responsive to being configured as part of the collection device 901 by the user. According to another embodiment, the mobile devices 112 may commence communicating signal messages 960 responsive to receipt of the test arming event 914. For example, the network-based marketplace 118 may receive a message from the Google Glass via the paired first mobile device 112 and communicate commands to the first mobile device 112 and the second mobile device 112. For example, the network-based marketplace 118 may communicate a command to the first mobile device 112 to enable signal messages 960 to report characterization information 312 by the smart component 102 and to the second mobile device 112 to enable signal messages 960 to report the sensing of audio. According to yet another embodiment, the first mobile device 112 may commence communicating signal messages 960 responsive to receipt of the tap on the Google Glass and the second mobile device 112 may be enabled to commence communicating signal messages 960 responsive to receipt of the test triggering event 916 (e.g., squeaking sound) at the first mobile device 112.

At operation 979, at the network-based marketplace 118, the signal messages 960 are received by the receiving module 502 and at decision operation 980 the processing module 504 processes the signal messages 960 to identify a type of signal processing. The decision operation 980 is described more fully on FIG. 9P as a method 919 to identify signal processing. If the signal information 956 is identified as "NO SIGNAL" then processing ends until another signal message 960 is received. If the signal information 956 is identified as "STORE SIGNAL," then processing continues at operation 982 and if the signal information 956 is identified as "END DATA COLLECTION," then processing continues at decision operation 986. At operation 982, the processing module 504 may identify user profile information 702 based on the user identifier 218 in the signal message 960. At operation 984, the processing module 504 may store the signal information 956 from the signal message 960 in the appropriate user fault analysis information 920 in the user profile information 702. For example, the processing module 504 may utilize the vehicle identification information 302, channel information 950, sub-channel 954, and timestamp 314 in the signal message 960 to identify the appropriate location in the user fault analysis information 920 for storage. Note that the characterization information 312 in the embodiment of the signal message 960 including the maintenance message 400 is stored as signal information 956 in the user fault analysis information 920.

At decision operation 986 the processing module 504 analyzes the multi-signal information 902 in the user fault analysis information 920 based on the current system fault analysis information 953 (e.g., identified previously with the decision operation 966 in FIG. 9M based on matching the user test request information 908 with system test request information 955) to identify whether the fault is diagnosed. The decision operation 986 is illustrated more fully in FIG. 9Q as a method 941 to analyze multiple signals. If the multi-signal information 902 is identified as "DIAGNOSED," then processing continues at operation 990. If the multi-signal information 902 is identified as "NOT DIAGNOSED" then processing continues at decision operation 994.

At decision operation 994 the processing module 504 may identify whether additional test design information 910 is available. The decision operation 994 is described more fully in FIG. 9O as a method 903 to identify test design information 910. If the processing module 504, at decision operation 994, identifies additional test design information 910 is available then a branch is made to connector "F" which corresponds to connector "F" on FIG. 9M. Otherwise a branch is made to operation 996.

At operation 990, the processing module 504 may communicate a message including diagnosis information 926 to the mobile device 112 that initiated the fault analysis. In some embodiments, the client machine 120 may initiate the fault analysis. For example, the message may include diagnosis information 926 that indicates the front right brake pad needs to be replaced. In another embodiment, the message may further include prognosis information 928, as previously described. At operation 998, the mobile device 112 may display the message including the diagnosis information 926 and/or the prognosis information 928.

At operation 996, the processing module 504 may communicate a notice to the mobile device that initiated the fault analysis indicating expert assistance has been requested. For example, the processing module 504 may identify a qualified expert to assist the user based on the expert identifier information 930 in the system fault analysis information 953, communicate a request the expert including a request for their assistance in diagnosing the problem, and communicate a notice to the user that initiated the test indicating that an expert is expected contact the user momentarily to assist the user in diagnosing the problem. At operation 998, the mobile device 112 may receive and display the message including the above described notice.

FIG. 9O illustrates a method 903, according to an embodiment, to identify test design information 910. The method may receive and utilize user test request information 908 and an index, described more fully below, to identify test design information 910. The method 903 may identify test design information 910 by matching the user test request information 908 with system test request information 955 in an entry of system fault analysis information 953 in the fault analysis repository 904. More specifically, the method 903 may be entered multiple times to initiate multiple fault analysis test sessions 912. Each entry of the method 903 includes an index that is passed to the method 903 and designated by the method 903 as the current system fault analysis information 953 (e.g., the place to begin searching the fault analysis repository 904). The method 903 utilizes the current system fault analysis information 953 to begin a search for the next entry of matching system fault analysis information 953. The method 903 may return "NEXT TEST" and an index corresponding to the identified entry of system fault analysis information 953 responsive to identifying a match or "NO TEST" responsive to identifying the fault analysis repository 904 is exhausted. The method 903 may commence, at operation 905, with the processing module 504 receiving an index and designating the index as the "next system fault analysis information 953. Entry of the method 903 from decision operation 966 of FIG. 9M initializes the "next system fault analysis information" to the first entry of system fault analysis information 953. That is, entry of the method 903 from decision operation 966 of FIG. 9M is for initiating execution of the first fault analysis test session 912. Entry of the method 903 from decision operation 994 of FIG. 9N is for execution of a successive fault analysis test session 912. Accordingly, the entry of the method 903 from decision operation 994 of FIG. 9N initializes the "next system fault analysis information" with an index corresponding to the entry of system fault analysis information 953 following the entry of system fault analysis information 953 that was utilized for the previous fault analysis test session 912. For example, the method 903 may be entered from decision operation 994 of FIG. 9N three times to initialize the "next system fault analysis information" with the twentieth, twenty-fifth, and ninetieth entries of the system fault analysis information 953 in the fault analysis repository 904. At decision operation 907, the processing module 504 may identify whether vehicles 104 match. For example, the processing module 504 may compare vehicle identification information 302 in the user fault analysis information 920 in the user profile information 702 with vehicle identification information 302 in the current system fault analysis information 953 in the fault analysis repository 904. If vehicles 104 match, then processing continues at decision operation 909. Otherwise processing continues at decision operation 913. A fuzzy match may constitute a match. For example, an overlapping range of years and/or overlapping range of makes and/or overlapping range of models may constitute a match. Further, the entirety of the vehicle identification information 302 may not be utilized for a particular comparison. For example, the vehicle identification number may not be utilized for a particular comparison.

At decision operation 909, the processing module 504 may identify whether user test request information 908 matches the current system test request information 955. For example, the processing module 504 may compare user test request information 908 in the user fault analysis information 920 in the user profile information 702 with system test request information 955 in the current system fault analysis information 953 in the fault analysis repository 904. If a match is identified then processing continues at operation 911. Otherwise processing continues at decision operation 913. A fuzzy match may constitute a match. For example, overlapping ranges of problem conditions 934 and/or overlapping ranges of problem symptoms 936 may constitute a match. At operation 911, the processing module 504 may return the value "NEXT TEST" to decision operation 994 on FIG. 9N or decision operation 966 on FIG. 9M. The method 903 would then end.

At decision operation 913, the processing module 504 may identify whether more entries of system fault analysis information 953 are present in the fault analysis repository 904 for processing. If more entries are available for processing, then a branch is made to operation 905. Otherwise processing continues at decision operation 915.

At operation 915, the processing module 504 may communicate a message to an expert requesting their assistance in designing a test to diagnose the current problem. For example, the processing module 504 may identify the expert based on the expert identifier information 930 in the current system fault analysis information 953. At operation 917, the processing module 504 may return the value "NO TEST" to decision operation 994 of FIG. 9N or decision operation 966 of FIG. 9M. The method 903 then ends.

Figure 9P:
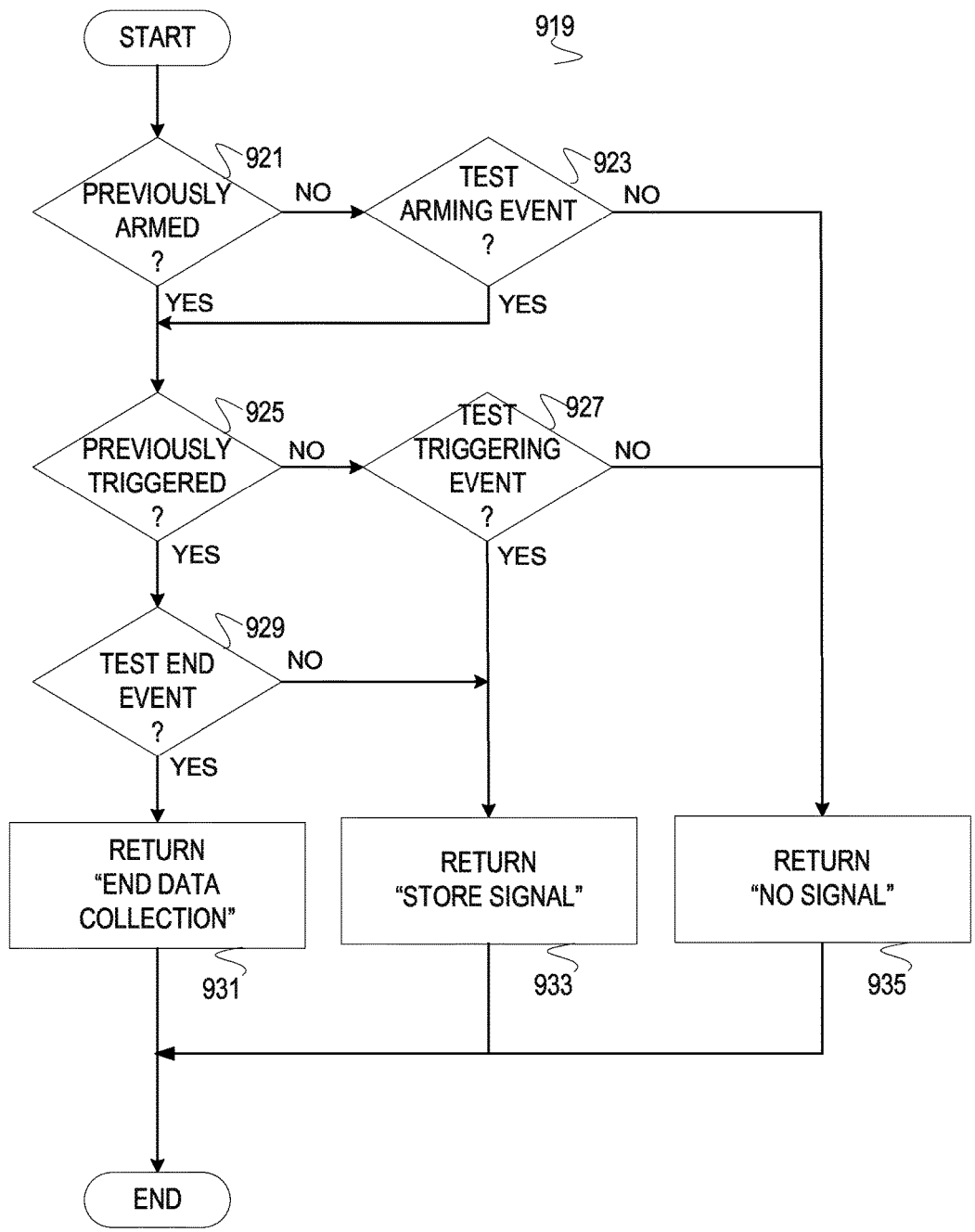
FIG. 9P illustrates a method to identify signal processing, according to an embodiment.

FIG. 9P illustrates a method 919, according to an embodiment, to identify signal processing. The method 919 is entered from decision operation 980 on FIG. 9N to process signal information 956 in a signal message 960 that was received from a mobile device 112. The method 919 commences at decision operation 921 with the processing module 504 identifying whether the collection device 901 was previously armed. If the processing module 504 identifies the collection device 901 as previously armed then processing continues at decision operation 925. Otherwise processing continues at decision operation 923.

At decision operation 923, the processing module 504 identifies whether the signal information 956 in the signal message 960 that is presently being processed includes a test arming event 914. For example, the processing module 504 may utilize the test arming information 942 in the test design information 910 in the current system fault analysis information 953 to identify whether the signal message 960 includes the test arming event 914. If the processing module 504 identifies the test arming event 914 then processing continues at decision operation 925. Otherwise processing continues at operation 935.

At decision operation 925, the processing module 504 identifies whether the collection device 901 was previously triggered. If the processing module 504 identifies the collection device 901 as previously triggered, then processing continues at decision operation 929. Otherwise processing continues at decision operation 927.

At decision operation 927, the processing module 504 identifies whether the signal information 956 in the signal message 960 that is presently being processed includes a test triggering event 916. For example, the processing module 504 may utilize the test triggering information 944 in the test design information 910 in the current system fault analysis information 953 to identify whether the signal message 960 includes the test triggering event 916. If the processing module identifies the test triggering event 916 then processing continues at operation 933. Otherwise processing continues at operation 935.

At decision operation 929, the processing module 504 identifies whether the signal information 956 in the signal message 960 that is presently being processed includes a test end event 918. For example, the processing module 504 may utilize the test end information 946 in the test design information 910 in the current system fault analysis information 953 to identify whether the signal message 960 includes the test end event 918. If the processing module 504 identifies the test end event 918 then processing continues at operation 931. Otherwise processing continues at operation 933. In some embodiments an expired timeout may be utilized to simulate the test end event 918. In other embodiments, the signal message 960 that is presently being processed may be combined with an expired timeout to constitute the test end event 918.

At operation 931, the processing module 504 may return "END DATA COLLECTION" to decision operation 980 of FIG. 9N. At operation 933, the processing module 504 may return "STORE SIGNAL" to decision operation 980 of FIG. 9N. At operation 935, the processing module 504 may return "NO SIGNAL" to decision operation 980 of FIG. 9N.

Figure 9Q:
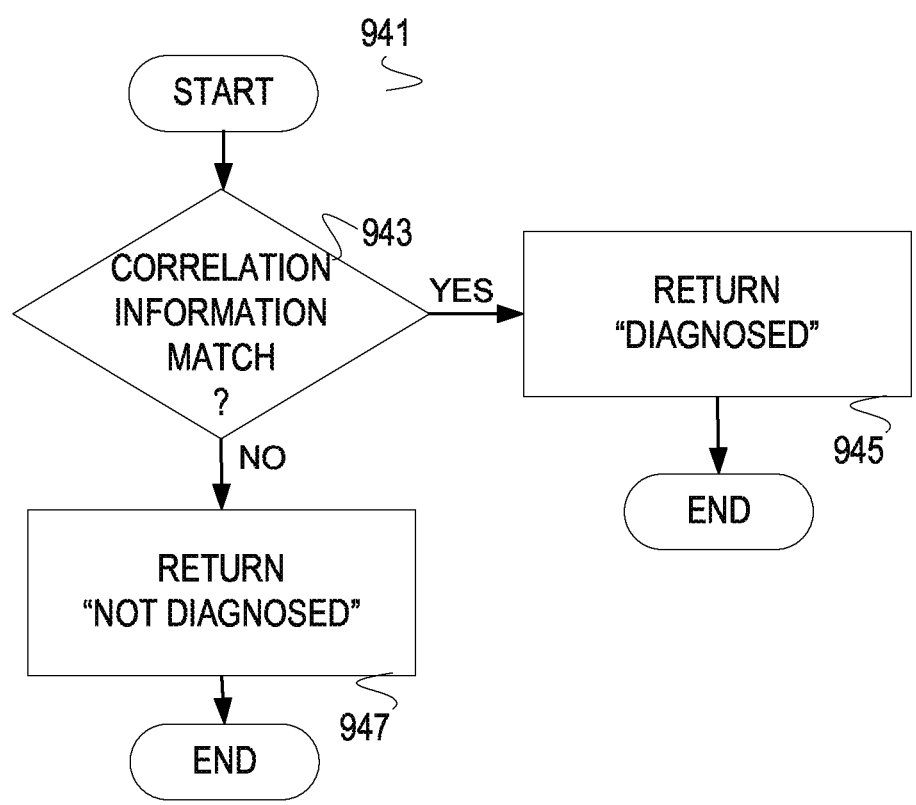
FIG. 9Q illustrates a method to analyze multi-signal information, according to an embodiment.

FIG. 9Q illustrates a method 941, according to an embodiment, to analyze multi-signal information 902. The method 941 is entered from decision operation 986 of FIG. 9N to analyze signal information 956 in multi-signal information 902 in user profile information 702 that was received from a collection device 901. The method 941 commences, at decision operation 943, with the processing module 504 identifying whether the multi-signal information 902 matches at least one correlated event 958 in the correlation information 924 of the current system fault analysis information 953 in the fault analysis repository 904. A fuzzy match may constitute a match, as previously described. At operation 947, the processing module 504 may return "NOT DIAGNOSED" to decision operation 986 on FIG. 9N. At operation 945, the processing module 504 may return "DIAGNOSED" to decision operation 986 on FIG. 9N.

Figure 9R:
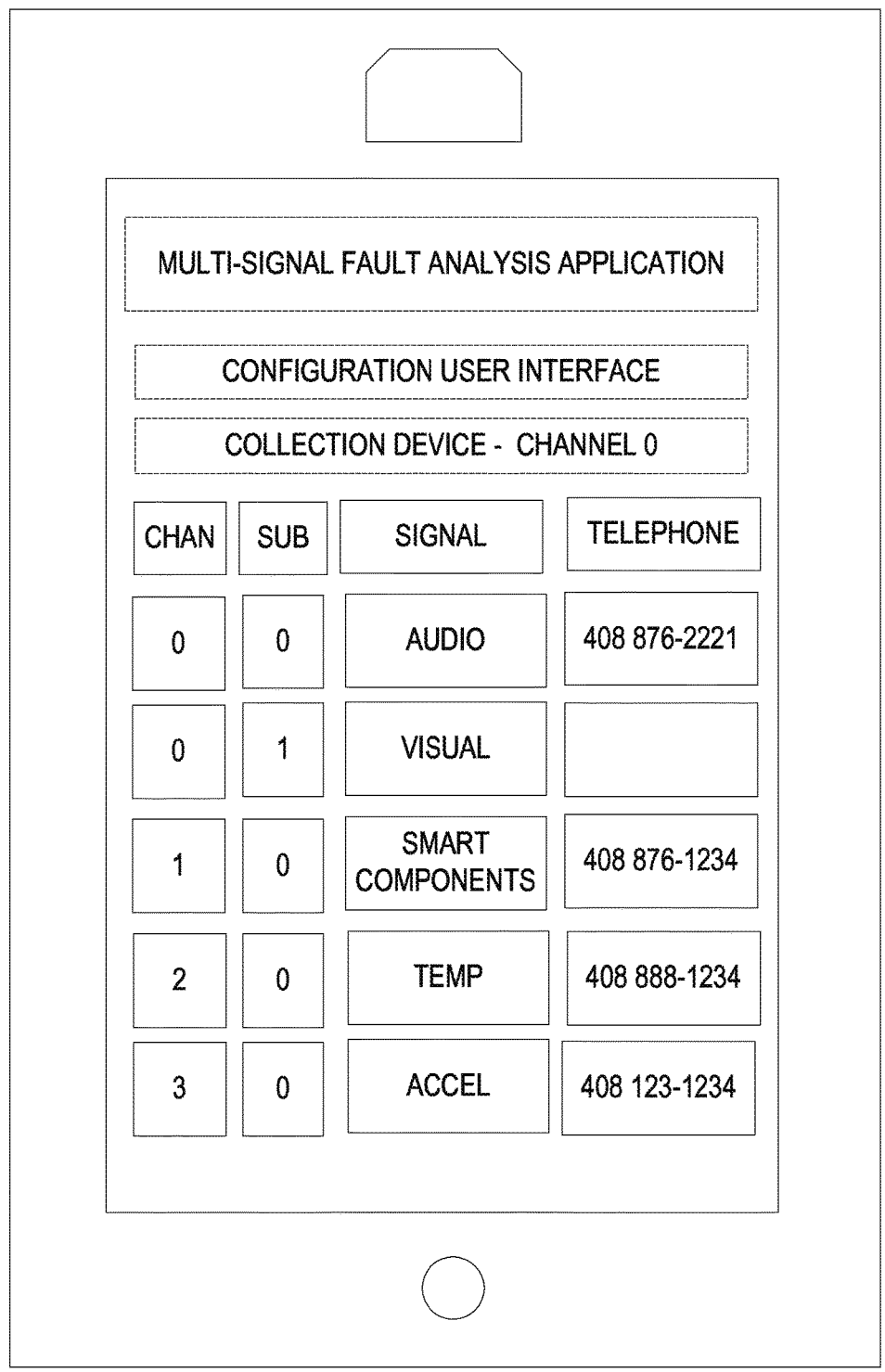
FIGS. 9R-9S illustrate user interfaces, according to an embodiment.

FIG. 9R illustrates a user interface 949, according to an embodiment, to configure a collection device 901. The user interface 949 illustrates a collection device including four mobile devices 112 respectively operating on channels zero, one, two, and three and respectively associated with different telephone numbers. Channel zero includes two sub-channels including a first sub-channel that captures signal information 956 that represents audio phenomena and a second sub-channel that captures signal information 956 that represents visual phenomena. Other embodiments may include additional sub-channels 954. Channel one captures signal information 956 that represents characterization information 312 reported by a smart component 102. Channel two captures signal information 956 that represents temperature phenomena. Channel three captures signal information 956 that represents acceleration phenomena. The user interface 949 further illustrates the mobile device 112 associated with channel zero as being utilized to configure the collection device 901. In some embodiments, the same mobile device 112 may be paired with one or more mobile devices 112 that are wearable (e.g., Google Glasses, smart watch, etc.). Any of the mobile devices 112 may be utilized to capture a test arming event 914 or a test triggering event 916.

Figure 9S:
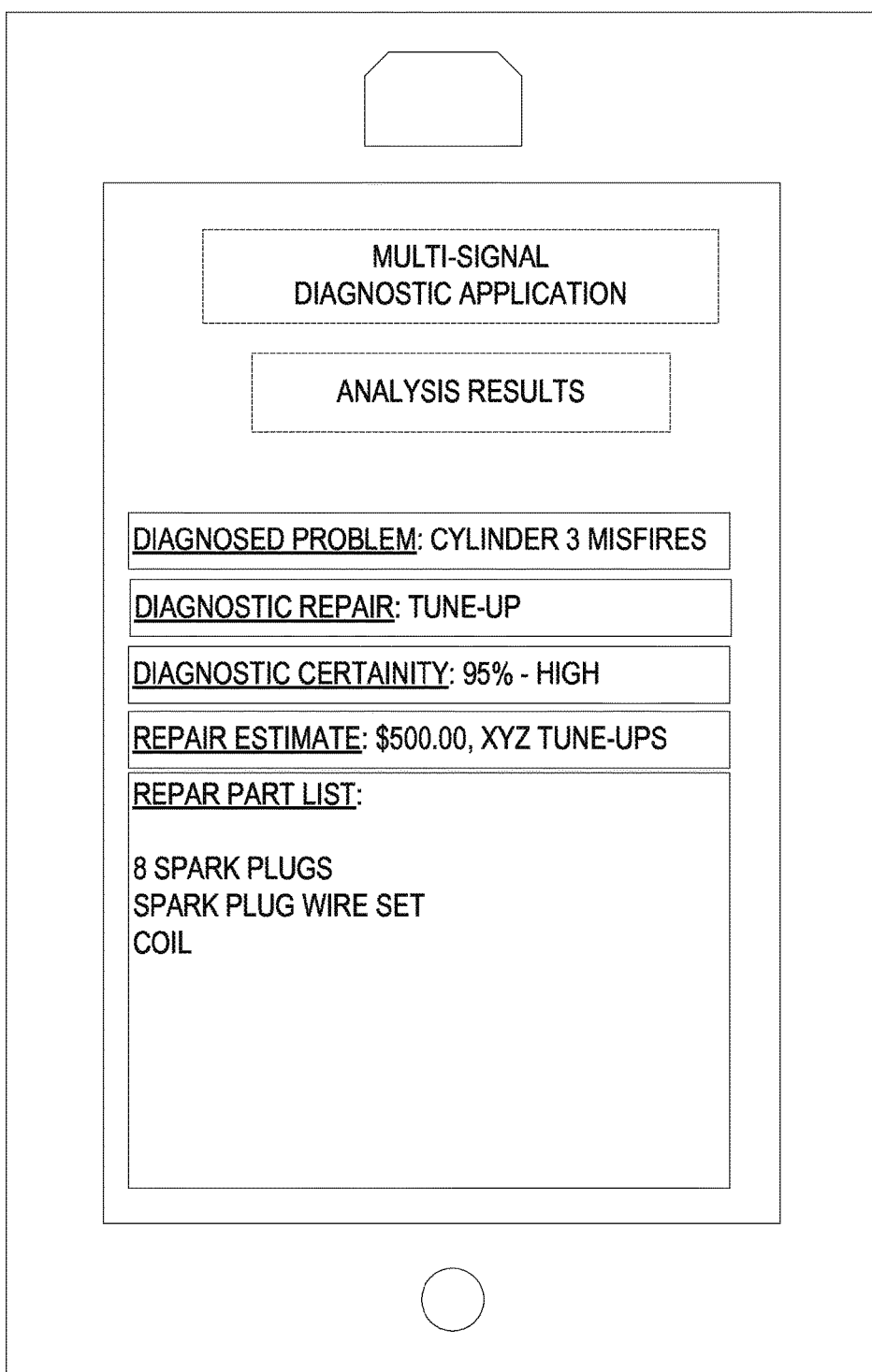

FIG. 9S illustrates a user interface 951, according to an embodiment, to display partial results for a multi-signal automated fault analysis including aspects of the diagnosis information 926 and prognosis information 928.

Systems and Methods for an E-Commerce Enabled Digital Whiteboard

Figure 10A:
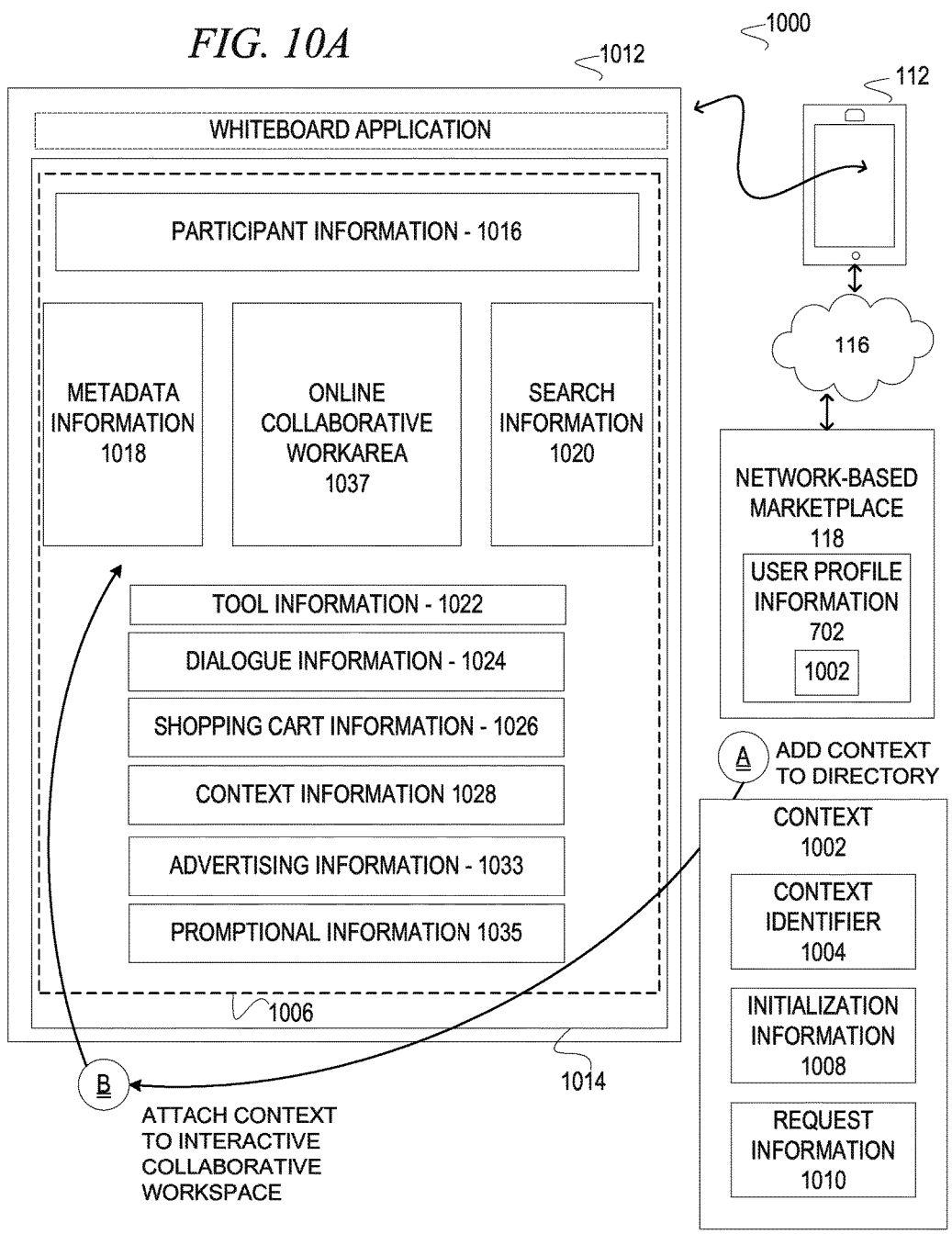
FIG. 10A illustrates a system for an e-commerce enabled digital whiteboard, according to an embodiment.

FIG. 10A illustrates a system 1000, according to an embodiment, for an e-commerce enabled digital whiteboard. The system 1000 is generally described in the present disclosure to process interactions between a vehicle owner who is collaborating with other users (e.g., experts) to repair a vehicle 104 (not shown), however, other collaborations may include management personnel who collaborate to plan a budget, engineers who collaborate to build a software system, publishers who collaborate to identify whether to publish a book, shoppers who collaborate to make a purchase (e.g., online shopping assistance) and the like.

Broadly, the system 1000 may include a network-based marketplace 118 that utilizes a context 1002, including a context identifier 1004, initialization information 1008 and request information 1010 to process interactions between users who are collaborating online, the interactions being received as requests via a user interface 1012. For example, the network-based marketplace 118 may utilize the context 1002 to process interactions in an online collaborative workspace 1014 to expose feature information 1006 and/or augment feature information 1006 and/or remove feature information 1006 from the user interface 1012 in addition to improving the relevancy and/or enabling ecommerce activities that are presented via the user interface 1012.

The network-based marketplace 118 may utilize the context 1002 to process interface information. Interface information may include information that is exposed or received via the user interface 1012. For example the interface information may include requests/interactions that are received via the online collaborative workspace 1014. The interactions may include manipulating objects including documents, videos, illustrations, wire frame diagrams and the like, hosting real-time audio/visual online collaborative workspace sessions with other users and the like, and facilitating general drop and drag facilities for links, objects, etc. and other typical digital whiteboard facilities and the like. The interface information may further include feature information 1006. For example, the feature information may include participant information 1016, metadata information 1018, search information 1020, tool information 1022, dialogue information 1024, shopping cart information 1026, context information 1028 including the context 1002, advertising information 1033 and promotional information 1035. The feature information 1006 may be displayed as interface information according to panels on the user interface 1012 or as discrete user interface elements or as groups of user interface elements on the user interface 1012.

As briefly mentioned above but now discussed, the feature information 1006 may be hidden or exposed. For example, the participant information 1016 may be added or removed to interact with expert users. Further for example, the metadata information 1018 may be added or removed to manipulate objects in a separate workspace. Specifically, the metadata information 1018 may be used to manipulate instances of objects presently displayed on another part of the user interface 1012. Further, the metadata information 1018 may be used to display instantiations of an archetypical object. For example, the metadata information 1018 may display user interface elements rendering Fram or Napa oil filters for parallel viewing with an archetypical oil filter that is being displayed in a repair schematic in the online collaborative workspace 1014. The search information 1020 may include search results, queries, saved searches, and other search related information. Further the search information 1020 may be generated based on searches being performed for listings 600 (not shown) on the network-based marketplace 118. The tool information 1022 may include tools to operate the user interface 1012 and manipulate the contents of the user interface 1012. The dialogue information 1024 may include scripts representing spoken words, typed words, messaged words, etc. and generally any statement (e.g., declarative, question, etc.) submitted by any user from present and previous online collaborative sessions. The shopping cart information 1026 may include listings 600 (not shown) and other elements supporting sales and other e-commerce activity including merchandising activities. The context information 1028 may include the context 1002, as previously described. The advertising information 1033 may include advertisement elements, merchandising elements (e.g., listings) and other elements supporting sales and other e-commerce activity. The promotional information 1035 may include promotion elements (e.g., discounts, games, etc.), merchandising elements and other elements supporting sales and other e-commerce activity.

More specifically, the system 1000 may include a mobile device 112 (e.g., smart phone) operated by a first user who enters an "add context" command (operation "A") on the mobile device 112 to add the context 1002. The mobile device 112 may communicate the context 1002, over a network 116, to a network-based marketplace 118 that, in turn, processes the "add context" command and the context 1002 to store the context 1002 in a directory in user profile information 702 that is associated with the first user on the network-based marketplace 118. Responsive to processing the "add context" command, the network-based marketplace 118 may communicate a context identifier 1004 back to the mobile device 112. Further, the first user may enter an "attach context" command (operation "B") and the context identifier 1004 with the mobile device 112 to attach the context 1002 to the online collaborative workspace 1014. To this end, the mobile device 112 may communicate the command and the context identifier 1004, over the network 116, to the network-based marketplace 118 that, in turn, processes the command and the context identifier 1004 to attach the context 1002 to the online collaborative workspace 1014, generate the user interface 1012 by utilizing the context 1002 and communicate the user interface 1012, back over the network 116, to the mobile device 112. Further, one or more other users who are remotely located to the user may enter a request by touch or another activity that is received via the one or more instances of the, touch sensitive, user interface 1012. The network-based marketplace 118 may receive the requests, process the requests based on the context 1002 including the initialization information 1008 and all of the request information 1010 including the present and previous requests. Responsive to processing the requests, the network-based marketplace 118 may (re)generate the user interface 1012 or parts of the user interface 1012 and communicate the user interface 1012 or parts thereof back over the network 116 to the one or more mobile devices 112.

In one example, the initialization information 1008 may include a description of vehicle 104 (not shown) and a description of a repair for the vehicle. For example, the initialization information 1008 may describe a 1967 Ford Mustang that needs a repair in the form of an oil filter replacement. Continuing with the example, the context 1002 may be attached to the online collaborative workspace 1014, as previously described, and the online collaborative workspace 1014 may be generated based on the initialization information 1008 in the context 1002 to include a repair schematic for replacing the oil filter. Subsequent to displaying the repair schematic, requests may be received from the first, second, and other users, who are collaborating to replace the oil filter, and stored in the context 1002 as request information 1010. For example, the requests may include a request to invite a third user (e.g., expert) to collaborate, a screen touch that selects an object (e.g., gaskets) in a repair schematic that is displayed in an online collaborative workarea 1037, spoken statements, typed statements, etc. Requests may be stored as request information 1010 in the context 1002 corresponding to communications received via the user interface 1012 from the mobile device 112.

EXAMPLE

A vehicle 104 owner is changing an oil filter using their electronic tablet (e.g., iPad) to view maintenance instructions provided by online marketplace XYZ Motors. The user is experiencing problems. The user opens the whiteboard app ("WHITEBOARD APPLICATION") provided by XYZ Motors on their tablet, A) adds a context 1002 describing the vehicle (e.g., 1967 Ford Mustang) and describing the repair ("OIL FILTER CHANGE") to initiate a collaborative workspace session; and B) attaches the context 1002 to the online collaborative workspace 1014.
<whiteboard initializes w/ vehicle make/model/year and repair schematic>
<collaborative workspace session begins>
<user requests assistance via the user interface 1012>
<expert who responds via the user interface 1012>
(O)wner: "Hey—I can't figure this out—it keeps leaking even though I've tightened it up"
(E)xpert: "Have you replaced the gaskets?"
O: "Ummm . . . What gaskets?"
E: <taps on the gaskets within the repair schematic>
<automatic display of set of gaskets (e.g., Fram) in metadata on user interface 1012 that may be utilized to complete the repair described by the repair schematic>
<drags one of the item images to the online collaborative workarea 1037>
<schematic automatically highlights the gasket location tapped by the expert>
"They look like this . . . "
O: "Huh!no—thought I could reuse the old one . . . "
<drags the link to a shopping cart on the user interface 1012>
"I'll grab one of those tomorrow. Thanks!"
<tips the expert an 'eBuck' for his time>
<collaborative workspace session ends>

Later that evening, the user again launches the whiteboard app ("WHITEBOARD APPLICATION"), identifies the above mentioned context 1002 in the directory and reattaches the context 1002 by executing the "add context" command to initiate a second session for the same context 1002. The user returns to the item in their shopping cart which is accessible via the user interface 1012 and selects a user interface element invoking an "IN-STORE PICK UP" to purchase the item from a store that is located within a predetermined distance of the mobile device 112. The network-based marketplace 118 utilizes the context 1002 to suggest a different item (e.g., second item) (e.g., another brand that is preferred by the user) based on the context 1002. For example, the context 1002 may be accessed to identify a second item and present the second item as being available through a local merchant's "IN-STORE PICK-UP" feature of XYZ motors (e.g., network-based marketplace 118), or directly from XYZ motors (e.g., network-based marketplace 118). The user purchases the second item via the shopping cart that is accessed via the user interface 1012 that is accessed via the whiteboard app.

In another embodiment, the user does not re-launch the whiteboard app but, instead, opens their shopping cart directly and is presented with the item and a presentation of a second item that is selected based on the context 1002 being associated with the user who opens the shopping cart (e.g., a brand preferred by the user who opens the shopping cart). The user completes the purchase after selecting the IN-STORE PICK-UP feature, picks up the part along their bus ride home the next day, and receives a 'continue my repair' notification on their tablet after the purchase is completed.

Returning to the general discussion, further examples may include utilization of the "add context" command to create other contexts 1002 for different repairs of the same vehicle or for repairing other vehicles. Further examples may also include, re-launching the whiteboard application and reattaching a context 1002 that was previously initialized and/or utilized. It will be appreciated by one skilled in the art that a user may, at any time, open one or more instances of the whiteboard application on multiple devices including a mobile device 112 and/or a client machine 120. Further, each device may display a different type of information (e.g., participant information, metadata information 1018, etc.) in the user interface 1012 and receive different information. For example, a first device (e.g., mobile) device 112 may be utilized for camera, voice, and sensor 108 functionality, a second device (e.g., laptop) may be utilized for interactive chat and shopping cart information and a third device (e.g., tablet or Google Glass) may be utilized to view and interact with a repair schematic or document. It will further be appreciated by one skilled in the art that the interface information described above may be embodied in interfaces other than the user interface 1012. For example, the interface information may be embodied in an audio interface, a machine interface, application programming interface (API), a haptic interface or any other boundary across which two or more systems meet and act on each other or two or more users communicate with each other or any combination thereof.

FIG. 10B illustrates a context panel 1030, according to an embodiment. The context panel 1030 may be utilized to display context information 1028. The context information 1028 may include the context 1002 including the initialization information 1008 and other information utilized to characterize a context 1002 for a particular online whiteboard collaboration. The initialization information 1008 may include the year, make, model and repair for which the user desires to collaborate. Other information may include part description information 304 that is displayed responsive to the network-based marketplace 118 comparing the initialization information 1008 with vehicle information 300 in the garage information 706 in the user profile information 702 associated with the user who attached the context 1002 and identifying a match according to vehicle 104 (e.g., Ford Mustang 1967) and part 106 (e.g., oil filter). For example, the part description information 304 in the identified vehicle information 300 may include an indicator ("YES") indicating a smart component 102 (e.g., oil filter) was reported in a scan of 1967 Ford Mustang. The part description information 304 that is displayed may further include characterization information 312 to indicate a percentage of wear (e.g., 90%) or multiple samples of characterization information 312 that are processed (e.g., averaged) to indicate a percentage of wear (e.g., 90%) that is further associated with service level information 318 that registers a service level (e.g., "REPLACE"), the OEM authentic information 320 (e.g., original equipment manufacturer (OEM)) including a flag that is asserted to signify the part 106 is manufactured by an original equipment manufacturer, the part type identifier 308 ("OIL FILTER"), and the part identifier 306 all as previously described. Further, portions of the user profile information 702 for the user who attached the context 1002 may be displayed including an expertise level included in the expert information 220 ("NOVICE") indicating the present user is a novice with regard to installing oil filters and user preference information 704 indicating the user has expressed an interest in a particular brand of the oil filter (e.g., "FRAM").

Other embodiments may not utilize the context panel 1030 to display the context information 1028. For example, other embodiments may display all or part of the context information 1028 as discrete user interface elements on the user interface 1012 or as groups of user interface elements on the user interface 1012. Further, other embodiments of the present disclosure may display other types of information in the context panel 1030. For example, other embodiments of the present disclosure may display discrete user interface elements or groups of user interface elements of participant information 1016, metadata information 1018, elements from the online collaborative workarea 1037, search information 1020, tool information 1022, dialogue information 1024, shopping cart information 1026, advertising information 1033 and promotional information 1035 in the context panel 1030.

FIG. 10C illustrates a shopping cart panel 1032, according to an embodiment. The shopping cart panel 1032 may be utilized to display shopping cart information 1026. The shopping cart information 1026 may include items the user intends to purchase (e.g., "FRAM EXTRAT GUARD . . . "). For example, the shopping cart information 1026 may include items the user intends to purchase that were selected from other parts of the user interface 1012 (e.g., other panels) and dragged to the shopping cart panel 1032. The shopping cart information 1026 may include items other users purchased for similar repairs for similar vehicles ("MOTORCRAFT OIL . . . "). The shopping cart information 1026 may further include in-store pick-up availability for items within a predetermined distance (e.g., five miles) of the current location of the mobile device 112. For example, the "FRAM EXTRA GUARD . . . " oil filter may be picked up at a Napa Auto Parts store or an O'Reilly's Auto Parts store both within five miles of the current location of the mobile device 112. Further illustrated are buttons ("INFO") respectively corresponding to the stores that may be selected for in-store pick-up. The buttons may be selected to display store information including a map including driving instructions to the store, open hours for the store, and contact information for the store including a link to a website for the store. Other embodiments may not utilize the shopping cart panel 1032 to display the shopping cart information 1026. For example, other embodiments may display all or part of the shopping cart information 1026 as discrete user interface elements on the user interface 1012 or as groups of user interface elements on the user interface 1012. Further, other embodiments may display other types of information in the shopping cart panel 1032. For example, other embodiments may display discrete user interface elements or groups of user interface elements of participant information 1016, metadata information 1018, elements from the online collaborative workarea 1037, search information 1020, tool information 1022, dialogue information 1024, advertising information 1033 and promotional information 1035 in the shopping cart panel 1032.

Figure 10D:
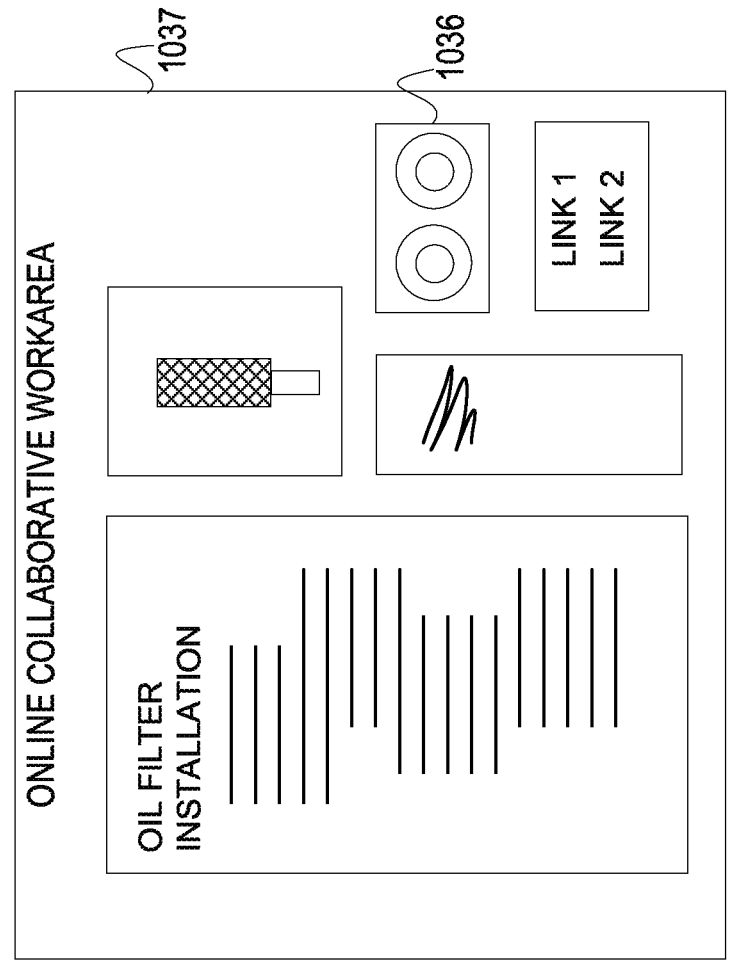
FIG. 10D illustrates a metadata panel, according to an embodiment.
Figure 10D:
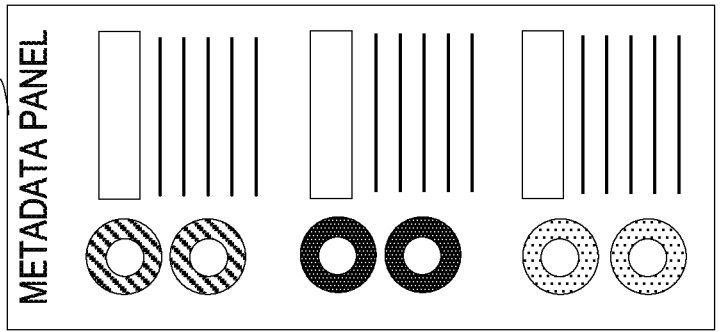

FIG. 10D illustrates a metadata panel 1034, according to an embodiment. The metadata panel 1034 may be utilized to display metadata information 1018. The metadata panel 1034 may be used as an additional and separate workspace. The metadata panel 1034 may be used to display and manipulate instances of objects that are presently being displayed on another part of the user interface 1012 such as the online collaborative workarea 1037. For example, the online collaborative workarea 1037 illustrates a repair schematic including a user interface element 1036 representing an object in the form of an archetypical set of gaskets used in the replacement of an oil filter. Selection of the user interface element 1036 by one of the users (e.g., an expert) may cause the user interface element 1036 to be highlighted, an automatic initiation of a search for listings 600 describing gaskets that are being offered for sale on the network-based marketplace 118 that match the selected archetypical set of gaskets and display of three sets of gaskets in the metadata panel 1034 that match the description of archetypical set of gaskets as well as the user-preferred brands of the user in accordance with user preference information 704 in the user profile information 702 associated with the user who attached the context 1002. In another example, the gasket sets may be matched in accordance with the user-preferred brands of the user who selected user interface element 1036. For example, the user who selected the user interface element 1036 may be a user other than the user who attached the context 1002 and the gasket sets may be matched in accordance with the user-preferred brands included in the user preference information 704 in the user profile information 702 of that user. Other user interface elements (e.g., text box, links, and illustrations) representing objects on the online collaborative workspace 1014 may be dragged to the metadata panel 1034. Further, a gasket set may be selected from the metadata panel 1034 and dragged to the shopping cart panel 1032 (not shown) for purchase. Other embodiments may not utilize the metadata panel 1034 to display the metadata information 1018. For example, other embodiments may display all or part of the metadata information 1018 as discrete user interface elements on the user interface 1012 or as groups of user interface elements on the user interface 1012. Further, other embodiments may display other types of information in the metadata panel 1034. For example, other embodiments may display discrete user interface elements or groups of user interface elements of participant information 1016, elements from the online collaborative workarea 1037, search information 1020, tool information 1022, dialogue information 1024, advertising information 1033 and promotional information 1035 in the metadata panel 1034.

Figure 10E:
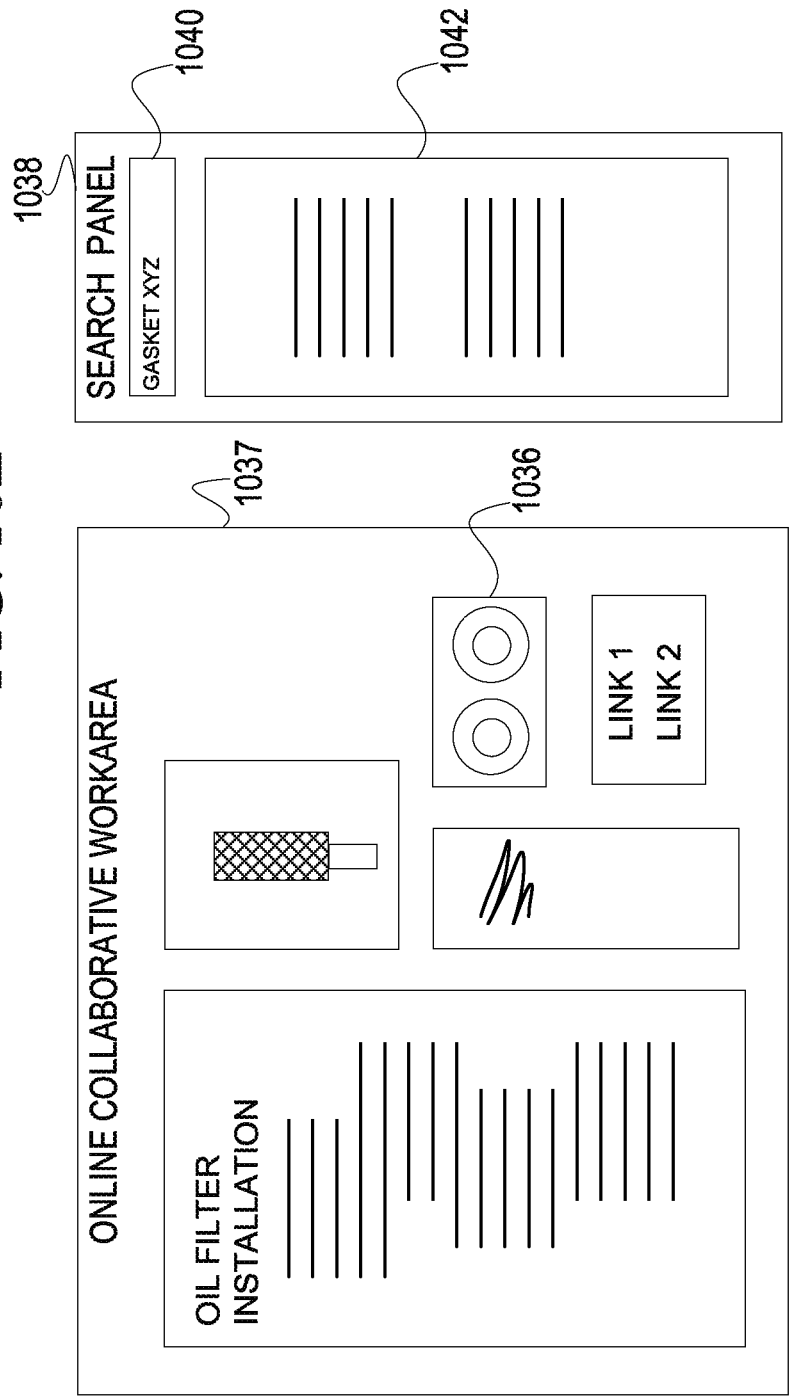
FIG. 10E illustrates a search panel, according to an embodiment.

FIG. 10E illustrates a search panel 1038, according to an embodiment. The search panel 1038 may be utilized to display search information 1020. The search panel 1038 may be used to automatically or manually search for listings 600 on the network-based marketplace 118. To this end, the search panel 1038 may include an input box 1040 to receive a query to initiate a manual search and a search result box 1042 to display the search result including descriptions of listings 600 of items being offered for sale on the network-based marketplace 118 and links to the listings 600. An automatic search may be initiated by selecting an object from the user interface 1012 (not shown) corresponding to an item that may be offered for sale on the network-based marketplace 118. For example, the online collaborative workarea 1037 illustrates a repair schematic including a user interface element 1036 representing an object in the form of an archetypical set of gaskets used in the replacement of an oil filter. Selection of the user interface element 1036 by one of the users (e.g., expert) may cause the user interface element 1036 to be highlighted and an automatic initiation of a search for listings 600 describing gaskets that are being offered for sale on the network-based marketplace 118. The search result box 1042 may include a search result including listings 600 that match the selected archetypical set of gaskets. The search result may be sorted and displayed in the search result box 1042. The search result may be sorted based on the brand preferences of the user that initiated the search. In another embodiment, the search result may be sorted based on the preferences of the user that attached the context 1002. In both instances the user-preferred brands of the user may be found in the user preference information 704 in the user profile information 702 for the user. Selections of other objects from other panels may also automatically initiate a search. Further, a listing 600 (not shown) in the search result box 1042 may be selected and dragged to the shopping cart panel 1032 (not shown) for purchase or to another panel. Other embodiments may not utilize the search panel 1038 to display the search information 1020. For example, other embodiments may display all or part of the search information 1020 as discrete user interface elements on the user interface 1012 or as groups of user interface elements on the user interface 1012. Further, other embodiments may display other types of information in the search panel 1038. For example, other embodiments may display discrete user interface elements or groups of user interface elements of participant information 1016, elements from the online collaborative workarea 1037, tool information 1022, dialogue information 1024, search information 1020, advertising information 1033 and promotional information 1035 in the search panel 1038.

Figure 10F:
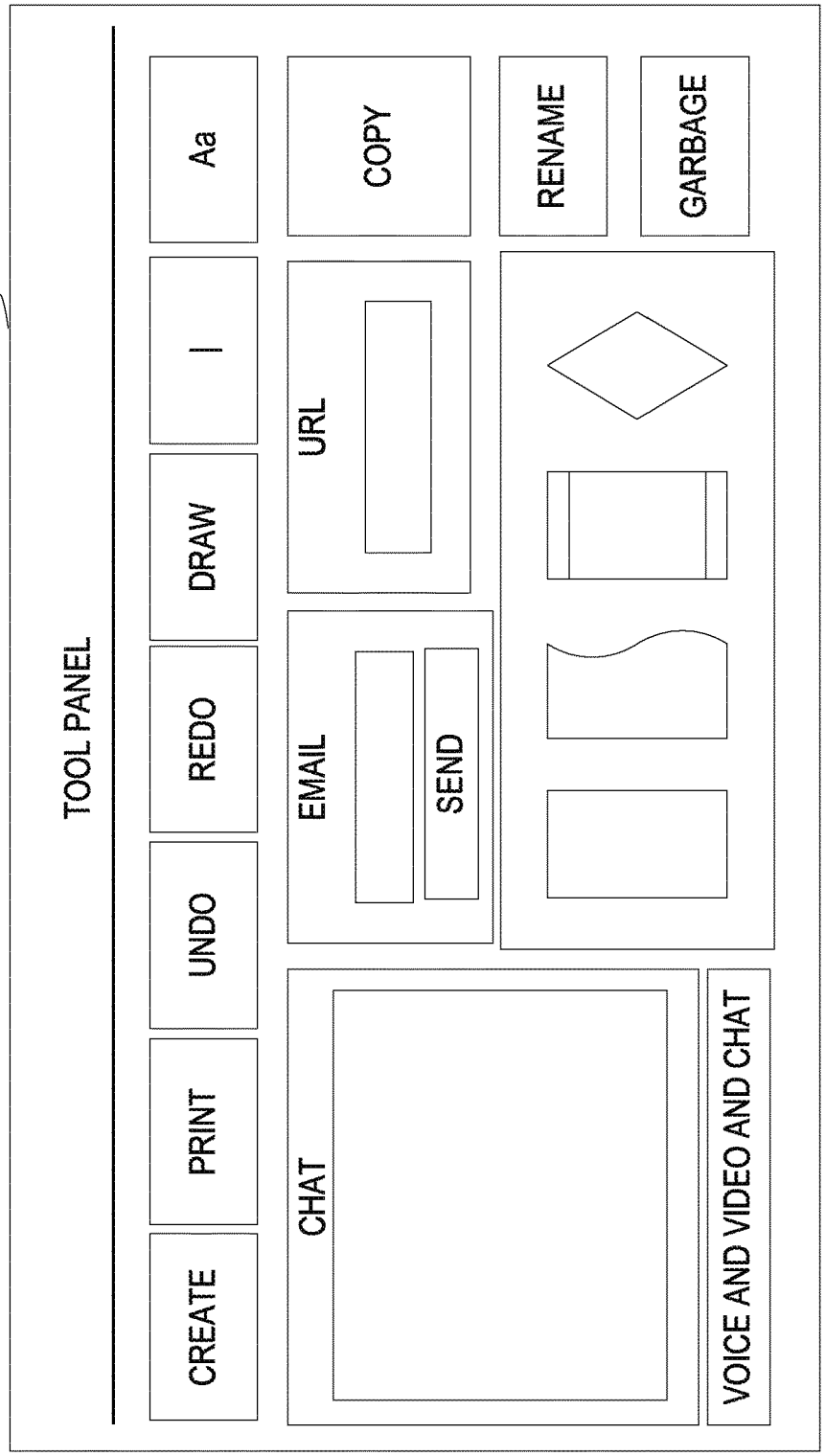
FIG. 10F illustrates a tool panel, according to an embodiment.

FIG. 10F illustrates a tool panel 1043, according to an embodiment. The tool panel 1043 may be utilized to display tool information 1022. The tool information 1022 may include tools to control the user interface 1012. For example, the tools may be utilized to open and close panels on the user interface 1012. Further, the tool information 1022 may include tools to control the contents of the user interface 1012. For example tool information 1022 may include tools to create, delete, modify, or manipulate text, illustrations, objects, or user interface elements on the user interface 1012. Other embodiments may not utilize the tool panel 1043 to display the tool information 1022. For example, other embodiments may display all or part of the tool information 1022 as discrete user interface elements on the user interface 1012 or as groups of user interface elements on the user interface 1012. Further, other embodiments may display other types of information in the tool panel 1043. For example, other embodiments may display discrete user interface elements or groups of user interface elements of participant information 1016, elements from the online collaborative workarea 1037, dialogue information 1024, and search information 1020 in the tool panel 1043.

Figure 10G:
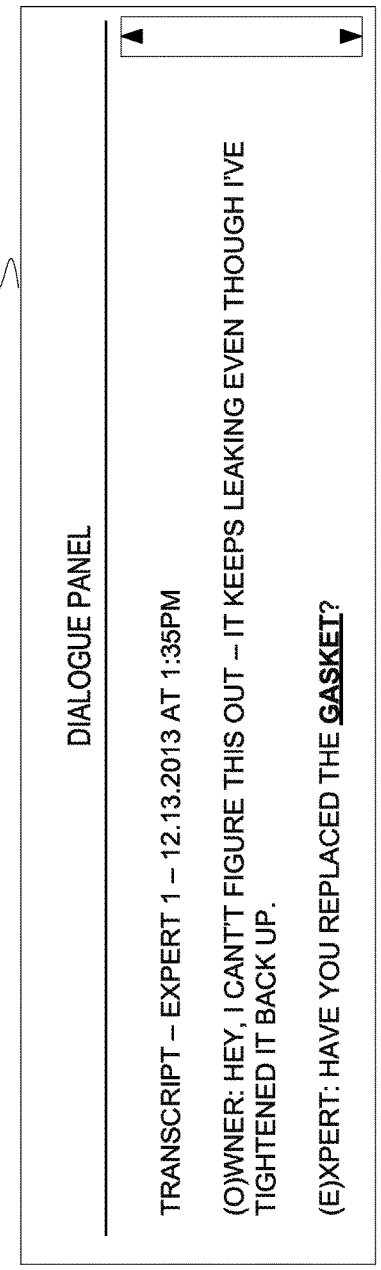
FIG. 10G illustrates a dialogue panel, according to an embodiment.

FIG. 10G illustrates a dialogue panel 1044, according to an embodiment. The dialogue panel 1044 may be utilized to display dialogue information 1024. The dialogue information 1024 may include scripts representing spoken words, typed words, messaged words, etc. and generally any statement (e.g., declarative, question, etc.) submitted by any user whether in the present or previous online collaborative session. The dialogue information 1024 may be analyzed based on the context 1002 to identify words as relevant. Merely for example, the network-based marketplace may parse the dialogue information 1024 based on the context 1002 to generate a parse result including words that register at a high frequency of occurrence in the dialogue information 1024 and filtered using a dictionary of parts 102 (e.g., Chilton's Automotive Repair Manual for repair of automobiles) to identify a parsed result including words in the dialogue information 1024 for highlighting and hyperlinking to automatically initiate searches on the network-based marketplace 118. For example, the highlighted word or phrase may be selected to initiate a search query for listings 600 on the network-based marketplace 118 by utilizing the highlighted word or phrase as a query for the search. Other embodiments may not utilize the dialogue panel 1044 to display the dialogue information 1024. For example, other embodiments may display all or part of the dialogue information 1024 as discrete user interface elements on the user interface 1012 or as groups of user interface elements on the user interface 1012. Further, other embodiments may display other types of information in the dialogue panel 1044. For example, other embodiments may display discrete user interface elements or groups of user interface elements of participant information 1016, elements from the online collaborative workarea 1037, tool information 1022, search information 1020, advertising information 1033 and promotional information 1035 in the dialogue panel 1044.

Figure 10H:
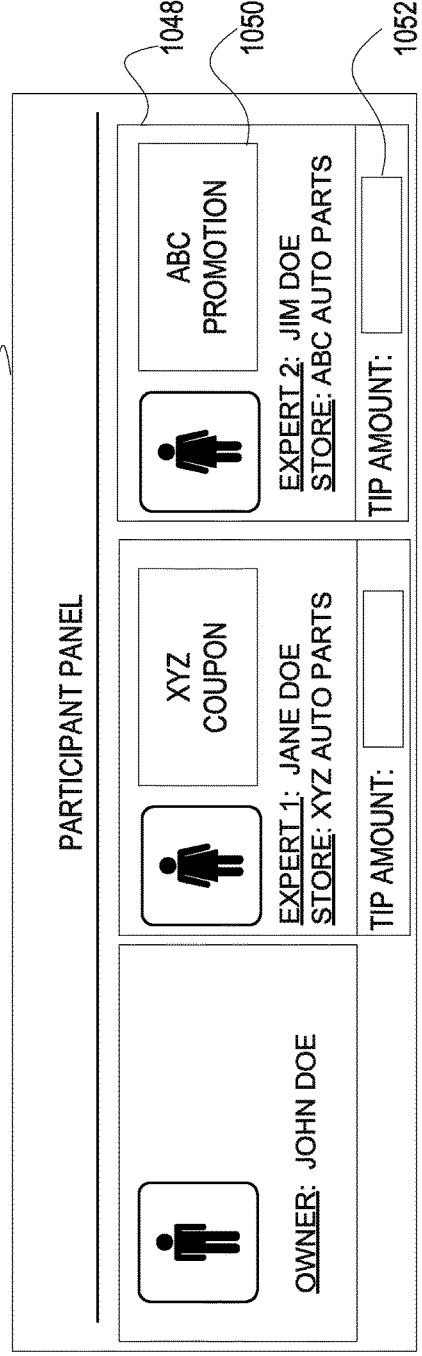
FIG. 10H illustrates a participant panel, according to an embodiment.

FIG. 10H illustrates a participant panel 1046, according to an embodiment. The participant panel 1046 may include one or more user panels 1048 to display participant information 1016. Each user panel 1048 may present a user on the network-based marketplace 118 (not shown). The user panel 1048 may present the user who attached the context 1002 (e.g., "JOHN DOE") and one or more other users (e.g., experts, "EXPERT 1: JANE DOE") who participate in a session. The experts may be selected for presentation based on expert information 220 (not shown) in the user profile information 702 (not shown) associated with the user, as described later. The presentation of the user in the user panel 1048 may include an image of the user (e.g., expert), a user name, a user affiliated electronic storefront, a merchandising element 1050, and a tip box 1052. Selection of the user name or image may communicate a notice to the user (e.g., expert) including an inquiry asking the user to join a session. The merchandising element 1050 may be updated by the associated user to present a featured promotion, discount, or coupon(s) that may be selected to participate in the featured promotion (e.g., print the coupon, buy an item to obtain a discount, etc.). The tip box 1052 may receive a tip for the associated user. For example, the tip box 1052 may receive five USD that is credited to the associated user's PayPal account (e.g., "EXPERT 2: JIM DOE") and debited from the tipping user's PayPal account (e.g., "OWNER: JOHN DOE"). Other embodiments may not utilize the participant panel 1046 to display the participant information 1016. For example, other embodiments may display all or part of the participant information 1016 as discrete user interface elements on the user interface 1012 or as groups of user interface elements on the user interface 1012. Further, other embodiments may display other types of information in the participant panel 1046. For example, other embodiments may display discrete user interface elements or groups of user interface elements of search information 1020, elements from the online collaborative workarea 1037, tool information 1022, search information 1020, advertising information 1033 and promotional information 1035 in the participant panel 1046.

Figure 10I:
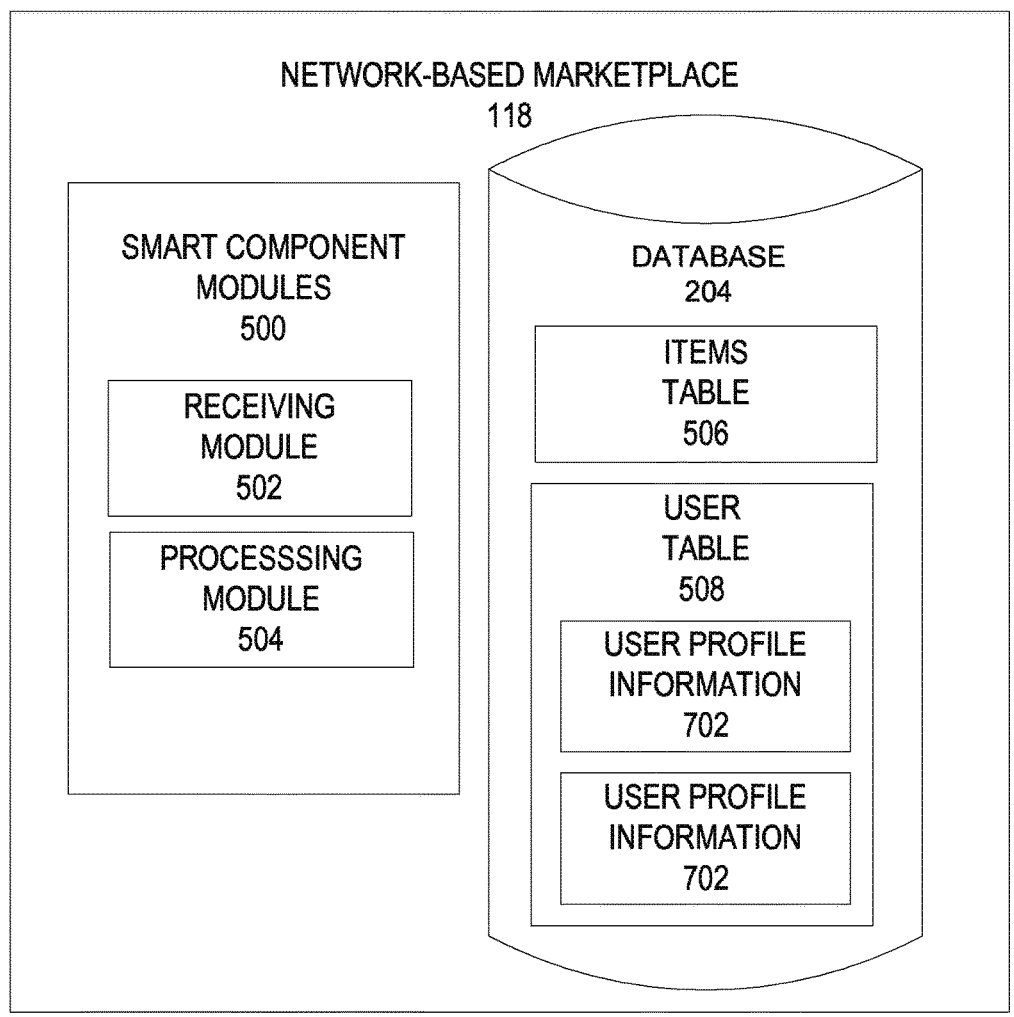
FIG. 10I illustrates a network-based marketplace, according to an embodiment.

FIG. 10I illustrates the network-based marketplace 118, according to an embodiment. The network-based marketplace 118 may include smart component modules 500 and a database 204. The network-based marketplace 118, smart component modules 500 and database 204 operate as previously described and further as follows. The smart component modules 500 may include a receiving module 502 and a processing module 504. The receiving module 502 may receive commands, requests and other information from the mobile device 112 (not shown) or a client machine 120 (not shown). For example, the commands may include the "add context" command, the "attach context" command or other commands, as previously described. Further for example, the receiving module 502 may receive requests describing interactions received via the user interface 1012 (not shown). The processing module 504 may process the commands, requests and other information to update the database 204 and respond to the aforementioned commands, requests and other information by communicating the user interface 1012, updates to the user interface 1012, or portions of the user interface 1012 to the mobile device(s) 112 or the client machine(s) 120 in accordance with the one or more participants of a session. The database 204 may include the items table 506. the user table 508 and other data structures previously described though not presently shown. The user table 508 may include user profile information 702. Each entry of user profile information 702 may store one or more contexts 1002 (not shown) for a particular user.

Figure 10J:
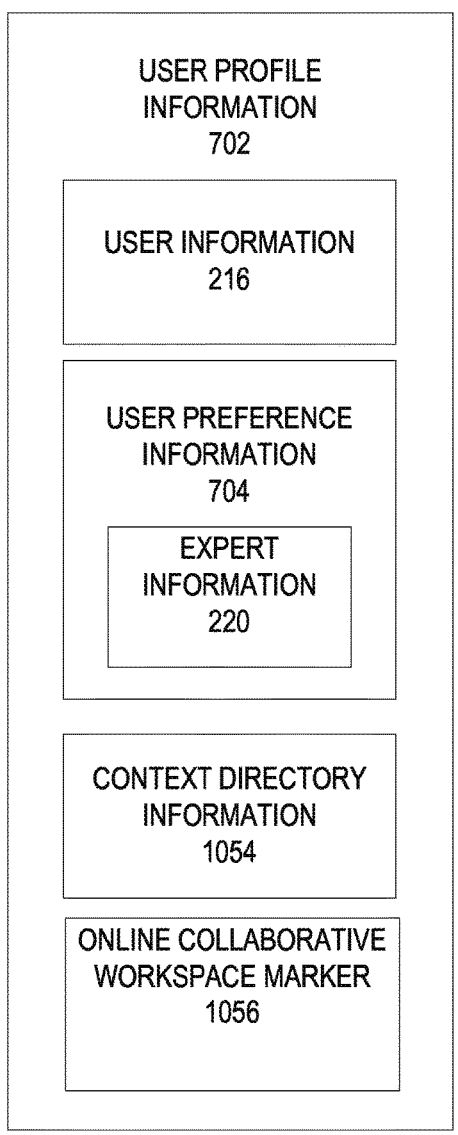
FIG. 10J illustrates user profile information, according to an embodiment.

FIG. 10J illustrates user profile information 702, according to an embodiment. The user profile information 702 operates as previously described and as described below. The user profile information 702 may include user information 216 and user preference information 704 including expert information 220. Recall the expert information 220 may include one or more part type identifiers 308, one or more sub-system identifiers 708 and vehicle identification information 302 that may identify one or more vehicles 104 for which the user is ranked. The user ranking may be utilized to identify content for consumption by a user or to identify a source of content for consumption by a user. For example, the expert information 220 may indicate that a user has the ability to source content for another user by providing "expert" or "qualified" advice (e.g., verbal content) for a particular part 106 (not shown), in a particular sub-system 103 (not shown), in a particular vehicle 104 (not shown), or some combination thereof. The processing module 504 (not shown) may identify a user who is qualified as an expert to work on the repair and vehicle 104 (not shown) specified in the context 1002 by comparing the initialization information 1008 in the context 1002 with the expert information 220 to identify a match. For example, portions of the expert information 220 may be compared with the initialization information 1008 in the context 1002 (not shown) to identify a match. A fuzzy match may constitute a match. For example, overlapping part type identifiers 308 and/or overlapping vehicle identification information 302 may constitute a match. The processing module 504 (not shown) may further utilize the expert information 220 to select content for consumption by a user who attaches the context 1002 to the online collaborative workspace 1014. Merely for example, the expert information 220 may include an expertise level that ranks the ability of the user to consume content with four levels of qualification information including "NOVICE." "INTERMEDIATE," "SENIOR," and "EXPERT" that may be utilized to select content for the user for the indicated field of expertise (e.g., part type, sub-system, vehicle). For example, the processing module 504 may select repair schematics with brief and terse instructions for a user at the "EXPERT" level and repair schematics that are exhaustive for a user at the "NOVICE" level. Continuing with the example, the schematics that are exhaustive may include additional and/or more detailed illustrations and additional or more detailed description. Further, the processing module 504 may upgrade or downgrade the expertise level in the expert information 220 for the user based on the amount of assistance provided to perform a repair or the quality of assistance provided to perform a repair.

The user profile information 702 further includes context directory information 1054 and an online collaborative workplace marker 1056. The content directory information 1054 may store the context 1002 for the user. For example, the contexts 1002 created by the user with the "add context" command are stored in the user profile information 702 until removed with a "delete context" command. The online collaborative workplace marker 1056 may be used to store a context identifier 1004 for a particular context 1002. Responsive to execution of the "attach context" command, the context identifier 1004 that is being received by the "attach context" command is stored in the online collaborative workplace marker 1056 constituting attachment of the context 1002 to the online collaborative workspace 1014. Subsequent executions of the "attach context" command overwrite the context identifier 1004 stored by the previous execution of the "attach context" command. That is, only a single context identifier 1004 is utilized by the network-based marketplace 118 for the whiteboard application.

Figure 10K:
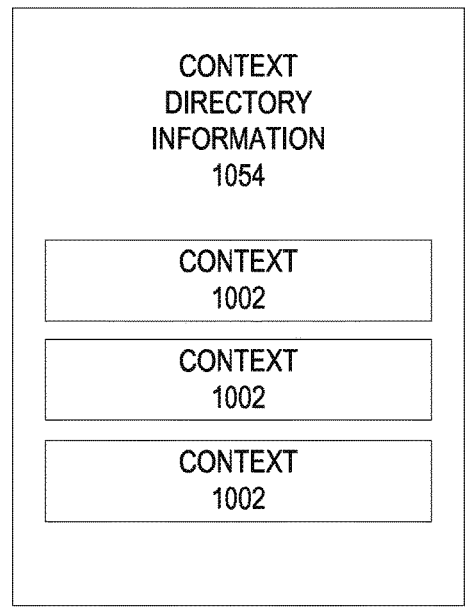
FIG. 10K illustrates context directory information, according to an embodiment.
Figure 10L:
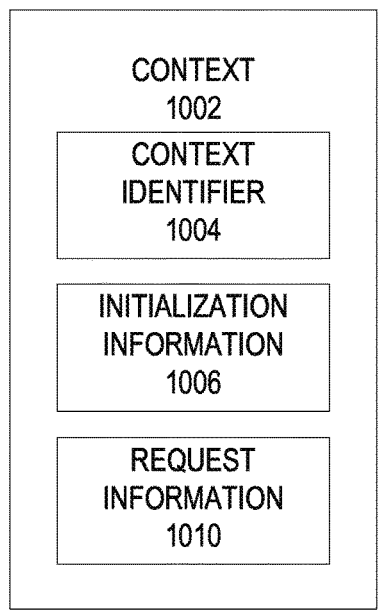
FIG. 10L illustrates a context, according to an embodiment.

FIG. 10K illustrates context directory information 1054, according to an embodiment. The context directory information 1054 may include one or more entries of context 1002. An entry of context 1002 may be added to the context directory information 1054 with the "add context" command and removed from the content directory information 1054 with the "delete context" command FIG. 10L illustrates the context 1002, according to an embodiment. The context 1002 may include the context identifier 1004, the initialization information 1008, and the request information 1010, as previously described.

Figure 10M:
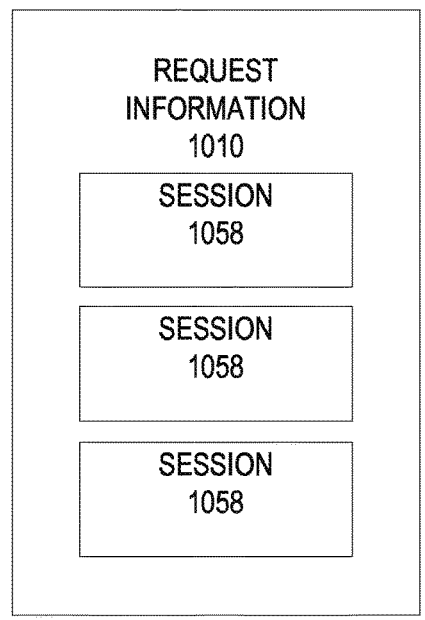
FIG. 10M illustrates request information, according to an embodiment.

FIG. 10M illustrates the request information 1010, according to an embodiment. The request information 1010 may include one or more sessions 1058, as previously described. A session 1058 may be initiated with execution of an "attach context" command. A session 1058 may be terminated by closing the whiteboard app. Reattachment initiates a new session 1058 for a particular context 1002.

Figure 10N:
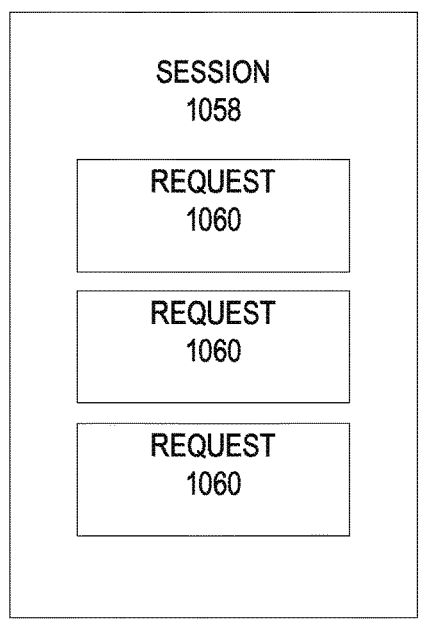
FIG. 10N illustrates a session, according to an embodiment.

FIG. 10N illustrates a session 1058, according to an embodiment. The session 1058 may include one or more requests 1060, as previously described. The request 1060 may be stored in the session 1058 responsive to the request 1060 being received at the network-based marketplace 118.

Figure 10O:
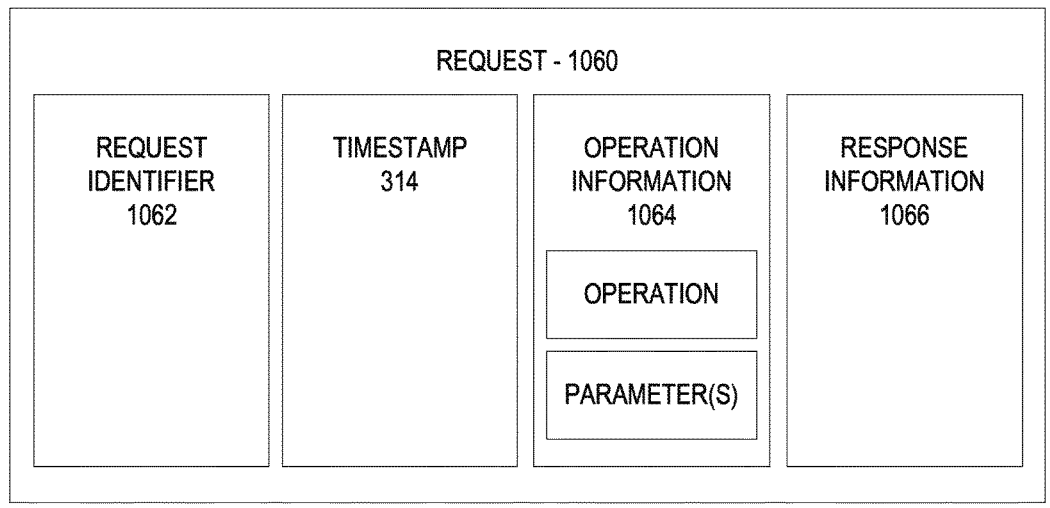
FIG. 10O illustrates a request, according to an embodiment.

FIG. 10O illustrates the request 1060, according to an embodiment. The request 1060 may include a request identifier 1062, a timestamp 314, operation information 1064, and response information 1066. The request identifier 1062 may be sequentially allocated and assigned to the request 1060 responsive to receiving the request 1060. The request identifier 1062 may uniquely identify the request 1060 for the particular session 1058. The timestamp 314 is stored in the request 1060 responsive to receipt of the request 1060 via the user interface 1012 (not shown) at the mobile device 112 (not shown) or client machine 120 (not shown). The operation information 1064 may include an operation (e.g., operation code) describing the type of operation requested and one or more parameters. For example, operations may include attaching a context 1002, adding an expert to the session 1058, selecting an object (e.g., user interface element for a part 106), moving a part 106 from the metadata panel 1034 (not shown) to the shopping cart panel 1032 (not shown), scroll dialogue information 1024, etc. Further each operation may be associated with one or more parameters that are received as input for the operation. For example, one or more parameters may be received via the user interface 1012 from the mobile device 112 or the client machine 120. The response information 1066 may store information utilized to respond to the request 1060 including interface information. For example, the request 1060 may indicate the user selected a user interface element representing an item that triggered a search and the response information 1066 may include interface information including search information 1020 including the search results that were identified based on the search executed.

Figure 10P:
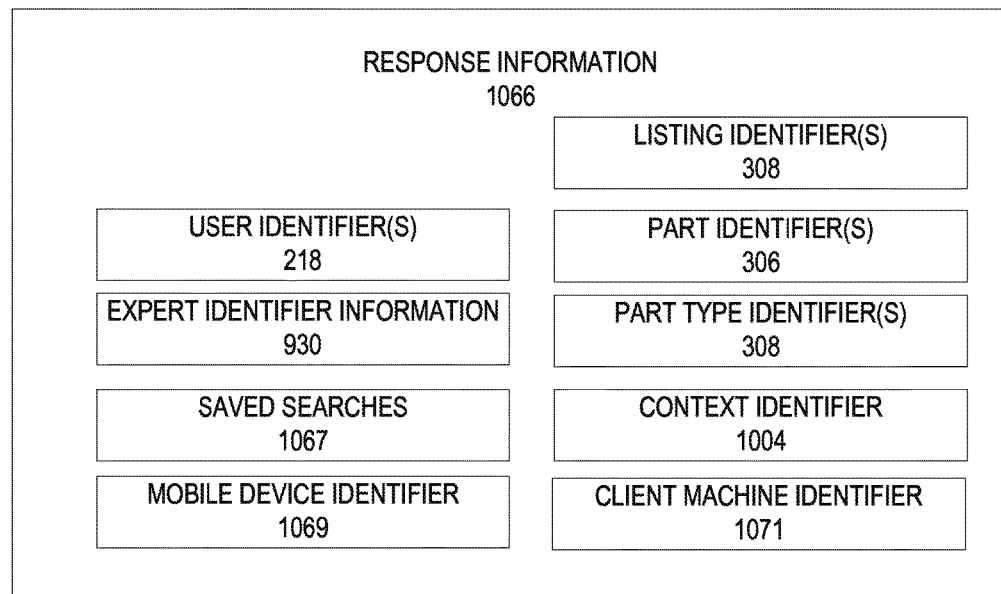
FIG. 10P illustrates response information, according to an embodiment.

FIG. 10P illustrates response information 1066, according to an embodiment. The response information 1066 may include information utilized to respond to the operation in the request 1060. For example the response information may include interface information including participant information 1016, metadata information 1018, search information 1020, tool information 1022, dialogue information 1024, shopping cart information 1026, and information generated for display in the online collaborative workarea 1037 or any other part of the user interface 1012. Further, the response information may include information that is generated based on the request 1060 but not accessed via the user interface 1012 (e.g., search results generated in response to a request 1060 but not displayed on the user interface 1012). Merely for example, the response information 1066 may include one or more user identifiers 218, expert identifier information 930, one or more saved searches 1067 including query and search results, one or more listing identifiers 308, one or more part identifiers 306, one or more part type identifiers 308, and the context identifier 1004, as previously described. The user identifiers 218 may include and distinguish the user identifier 218 associated with the mobile device 112 that is currently executing the whiteboard application and other use identifiers (e.g., expert 1, expert 2, etc.). The mobile device identifier 1069 may identify the mobile device 112 from which the request 1060 originated. The client machine identifier 1071 may identify the client machine 120 from which the request 1060 originated.

FIG. 10Q illustrates feature element information 1070, according to an embodiment. The feature element information 1070 may include one or more feature elements 1072. Each feature element 1072 corresponds to a feature that is supported by the online collaborative workspace 1014. The processing module 505 may utilize the feature element information 1070 to process corresponding feature information 1006. For example, a participant feature corresponds to the participant information 1016, a metadata feature corresponds to the metadata information 1018, an online collaborative workarea feature corresponds to information processed in the online collaborative workarea 1037, a search feature corresponds to the search information 1020, a tool feature corresponds to tool information 1022, a dialogue feature corresponds to dialogue information 1024, a shopping cart feature corresponds to shopping cart information 1026, a context feature corresponds to context information 1028, an advertising feature corresponds to advertising information 1033 and a promotional feature corresponds to promotional information 1035. Other embodiments may include additional or fewer features.

Figure 10R:
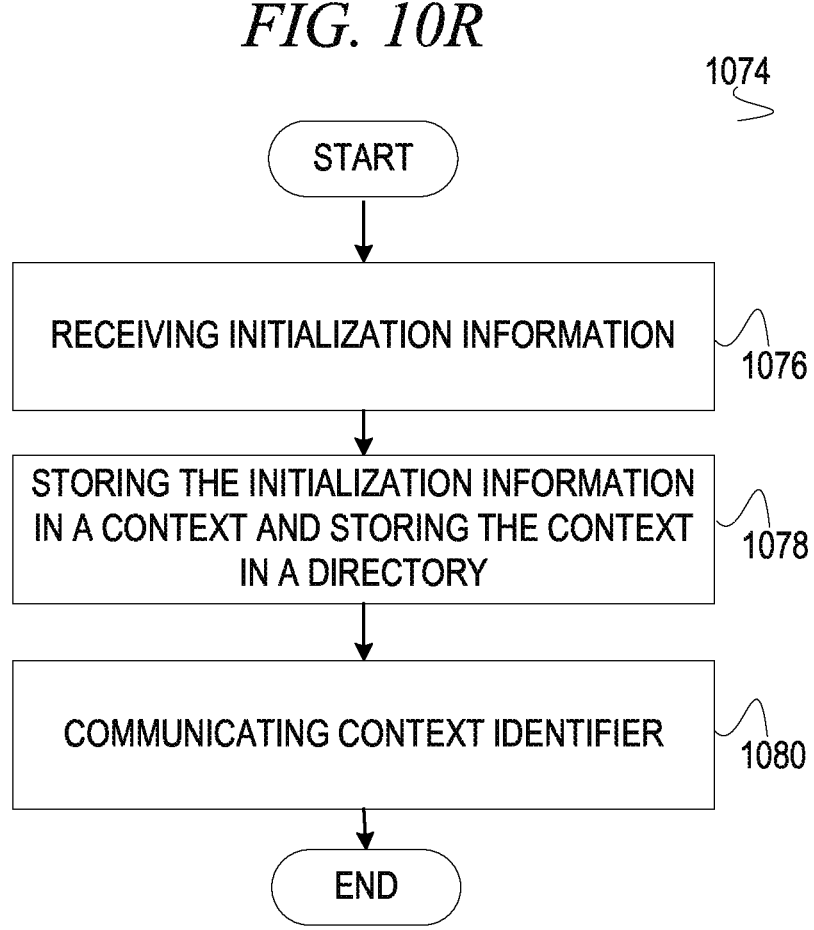
FIG. 10R illustrates a method, according to an embodiment, to add a context.

FIG. 10R illustrates a method 1074, according to an embodiment, to add a context 1002. The method 1074 may commence at operation 1076, at the network-based marketplace 118, with the receiving module 502 receiving the initialization information 1008. The message may be received from a mobile device 112 or a client machine 120. The message may include user identifier 218, an indication to add the context 1002, and the initialization information 1008. For example, the user may have interacted with a set of screens that were displayed at the mobile device 112 that, in turn, communicated the message over the network 116 to the network-based marketplace 118. At operation 1078, the processing module 504 may allocate the context 1002, allocated by the context identifier 1004, store the initialization information 1008 in the context 1102, and store the context identifier 1004 in the context 1002. Further, the processing module 504 may store the context 1002 in the context directory information 1054 in the user profile information 702 that is identified based on the user identifier 218. At operation 1080, the processing module 504 may communicate the context identifier 1004 over the network 116 to the mobile device 112 or the client machine 120 that executed the "add context" command.

Figure 10S:
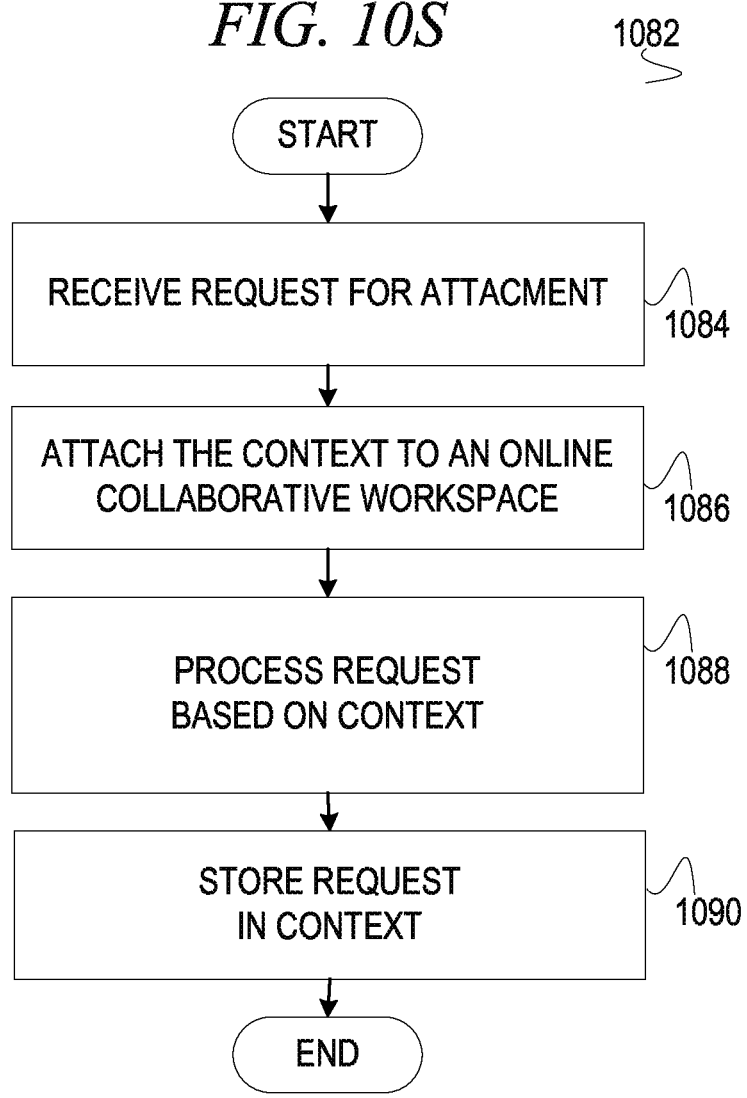
FIG. 10S illustrates a method, according to an embodiment, to attach a context.

FIG. 10S illustrates a method 1082, according to an embodiment, to attach a context 1002. The method 1082 may commence at operation 1084, at the network-based marketplace 118, with the receiving module 502 receiving a request 1060 to attach a context 1002. The request may include the context identifier 1004. For example, the receiving module 502 may receive the request 1060 from over a network 116 from the mobile device 112 or the client machine 120. The request 1060 may include the user identifier 218 to identify the user making the request 1060, and an operation 1068 to attach the context 1002, and the context identifier 1004. For example, the user may have selected a user interface element representing the context 1002 from a screen displayed at the mobile device 112 that, in turn, communicated the request 1060 over the network 116 to the network-based marketplace 118. At operation 1086, the processing module 504 may attach the context 1002 to the online collaborative workspace 1014 in the whiteboard application. For example, the processing module 504 may store the context identifier 1004 in the online collaborative workspace marker 1056 in the user profile information 702 that is identified based on the user identifier 218 in the request 1060. Other embodiments may utilize the mobile device identifier 1069 and/or the client machine identifier 1071 in the request 1060 to identify the appropriate user profile information 702 with a mapping operation. The processing module 504 overwrites the context identifier 1004 previously stored in the online collaborative workspace marker 1056 with the context identifier 1004 received in the request 1060 and creates a new session in the request information 1010. Further, the processing module 504 may indicate an end of session 1058 for the context identifier 1004 previously stored in the online collaborative workspace marker 1056. At operation 1088, the processing module 504 may processes the request 1060 based on the context 1002. For example, the processing module 504 may utilize the context identifier 1004 and the request 1060 to update the user interface 1012 at the mobile device 112 or generate a new user interface 1012 at the mobile device 112. The operation 1088 is described further as the method 1003 in FIG. 10U. At operation 1090, the processing module 504 stores the request 1060 in the session 1058 in the request information 1010 in the context 1002.

Figure 10T:
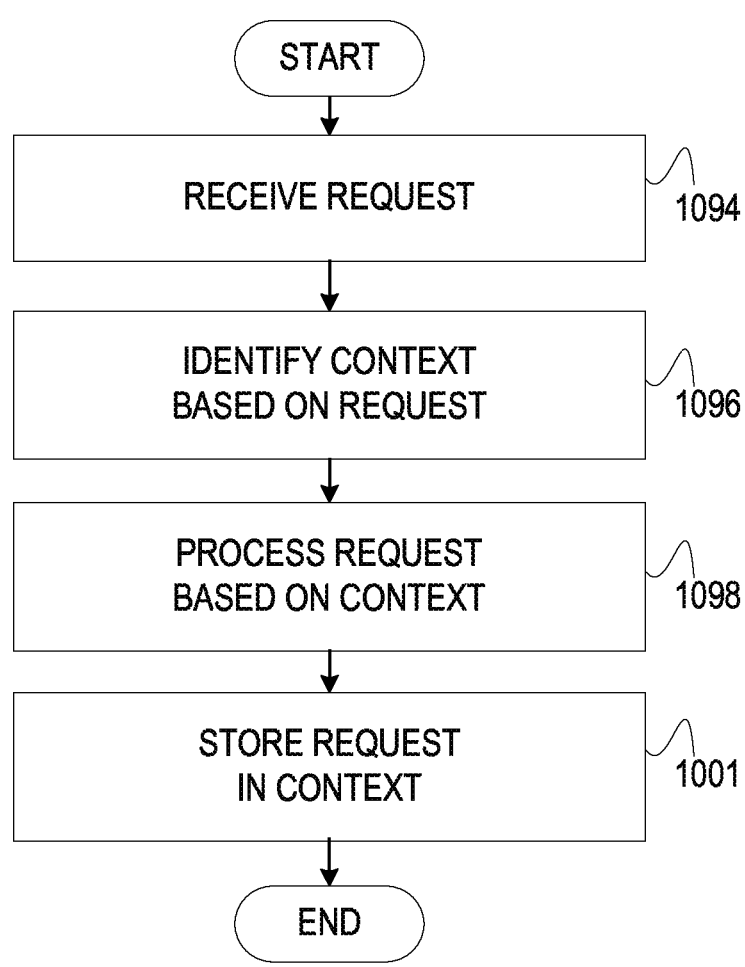
FIG. 10T illustrates a method, according to an embodiment, to receive and process a request.

FIG. 10T illustrates a method 1092, according to an embodiment, to receive and process a request. The method 1092 may commence at operation 1094, at the network-based marketplace 118, with the receiving module 502 receiving a request 1060. For example, a mobile device 112 may initially receive the request 1060 responsive to sensing a touch on a user interface 1012 and communicate the request 1060 over the network 116 to the network-based marketplace 118 that, in turn, includes the receiving module 502 that, in turn, receives the request.

At operation 1096, the processing module 504 may identify the context 1002 based on the request 1060. For example, the processing module 504 may utilize the user identifier 218 in the operation information 1064 in the request 1060 to identify the corresponding user profile information 702 including the appropriate online collaborative workspace marker 1056. It will be appreciated that the processing module 504 may map a request 1060 that is received from an expert to the user who initiated the session 1058 and the session 1058 to properly identify the appropriate online collaborative workspace marker 1056. Other embodiments may utilize the mobile device identifier 1069 or the client machine identifier 1071 in the request 1060 to identify the appropriate user profile information 702 with a mapping operation that identifies the user based on the device identifier 1069 or the client machine identifier 1071. Further, at operation 1096, the processing module 504 may read the context identifier 1004 from the collaborative workspace marker 1056.

At operation 1098, the processing module 504 may process the request 1060 based on the context 1002. For example, the processing module 504 may utilize the context identifier 1004 and the request 1060 to update the user interface 1012 or generate a new user interface 1012 and communicate the update or new user interface 1012 to the mobile device 112. The operation 1098 is described further as the method 1003 in FIG. 10U. At operation 1001, the processing module 504 may store the request 1060 in the most recent session 1058 in the request information 1010 in the context 1002.

FIG. 10U illustrates a method 1003, according to an embodiment, to process a request 1060 based on a context 1002. The method 1003 may be entered from operation 1088 of FIG. 10S or from operation 1098 of FIG. 10T. Recall that a request 1060 (e.g., received request) was received over the network 116, the received request 1060 originating from the whiteboard app at a mobile device 112 (though the app may also be executed on the client machine 120). Broadly, the method 1003 may generate response information 1066 for the received request 1060 based on context 1002 including the initialization information 1008 and the request information 1010. The method 1003 may generate interface information in at least two ways. First, the method 1003 may generate interface information based on the response information 1066 respectively stored in all of the previous requests 1060, the initialization information 1008, and the received request 1060 for every feature (e.g., participating feature, shopping cart feature, etc.) presently supported by the whiteboard app. Further, the method 1003 may generate interface information based on the initialization information 1008 and the received request 1060 for every feature (e.g., participating feature, shopping cart feature, etc.) presently supported by the whiteboard app. Accordingly, the entire context 1002 is reviewed over time (e.g., all previous requests 1060) for every feature (e.g., participating feature, shopping cart feature, etc.) to generate the interface information that, in turn, may be utilized to generate the user interface 1012 that, in turn, is communicated over the network 116 to the mobile device 112 or client machine 120.

At operation 1005, the processing module 504 may advance to the first feature element 1072 (e.g., current feature) in the feature element information 1070 (e.g., participant feature, metadata feature, etc.). At operation 1007, the processing module 504 may advance to the first session 1058 (e.g., current session) in the request information 1010 in the context 1002 in the user profile information 702 identified based on the received request 1060. At operation 1009, the processing module 504 may advance to the first request 1060 (e.g., current request) in the current session 1058.

At operation 1011, the processing module 504 may generate interface information based on the response information 1066 in the current request 1060, the received request 1060 and the current feature (e.g., participant feature). For example, the processing module 504 may generate interface information including a list of user identifiers 218 that identify expert users responsive to identifying the current request 1060 as including operation information including an operation (e.g., op code) that describes a request for expert assistance and identifying the response information 1066 for the current request 1060 as including a list of user identifiers 218 that identify expert users (e.g., previously consulted experts). Further for example, the processing module 504 may generate the interface information to open, close, or augment a panel (e.g., dialogue panel 1044) corresponding to the current feature (e.g., dialogue feature). Further for example, the processing module 504 may generate interface information to add (e.g., expert), remove, or augment user interface elements for corresponding to the current feature (e.g., participant feature).

At decision operation 1013, the processing module 504 may identify whether more requests 1060 are in the current session 1058. If more requests 1060 are in the current session 1058 then processing continues at operation 1015. Otherwise, processing continues at decision operation 1017. At operation 1015, the processing module 504 advances to the next request 1060 and continues processing at operation 1011.

At decision operation 1017, the processing module 504 may identify whether more sessions 1058 are in the request information 1010 associated with the received request 1060. If more sessions 1058 are in the request information 1010 then processing continues at operation 1019. Otherwise, processing continues at decision operation 1023. At operation 1019, the processing module 504 may advance to the next session 1058 and continue processing at operation 1009.

At decision operation 1023, the processing module 504 may identify whether more features elements 1072 are present in the feature element information 1070. If more features elements 1072 are present in the feature element information 1070 then processing continues at operation 1025. Otherwise, processing continues at operation 1027. At operation 1025, the processing module 504 may advance to the next feature element 1072 and continue processing at operation 1007.

At operation 1027, the processing module 504 may generate interface information based on the initialization information 1008 in the context 1002, the received request 1060 and all features (e.g., participant feature). For example, the processing module 504 may generate interface information to open, close, or augment any of the aforementioned panels including a context panel, the shopping cart panel 1032, the metadata panel 1034, the search panel 1038, the dialogue panel 1044 and the participant panel 1046. Further for example, the processing module 504 may generate interface information to add, remove, or augment user interface elements for participant information 1016, metadata information 1018, the online collaborative workarea 1037, the search information 1020 the tool information 1022, the dialogue information 1024, the shopping cart information 1026 the context information 1028, advertising information 1033 and promotional information 1035. Further for example, the processing module 504 may utilize service level information 318 and other information in the part description information 304 of vehicle information 300 in the garage information 706 of the user for smart components 102 that match or fuzzy match the initialization information 1008 in the context 1002 and update the context panel 1030 display "SMART COMPONENT WEAR: 90%" based on the identified match.

At operation 1029, the processing module 504 may generate the user interface 1012 based on the interface information that was generated in operations 1011 and 1027 and communicate the user interface 1012 over the network 116 to the mobile device 112 or the client machine 120 that originated the request 1060. In another example, the processing module 504 may communicate the interface information over the network 116 to update the user interface 1012 or a portion of the user interface 1012 that is being displayed on mobile device 112 or the client machine 120.

At operation 1031, the processing module 504 may store the interface information that was generated in operations 1011 and 1027 in the response information 1066 for the received request 1060.

Figure 11:
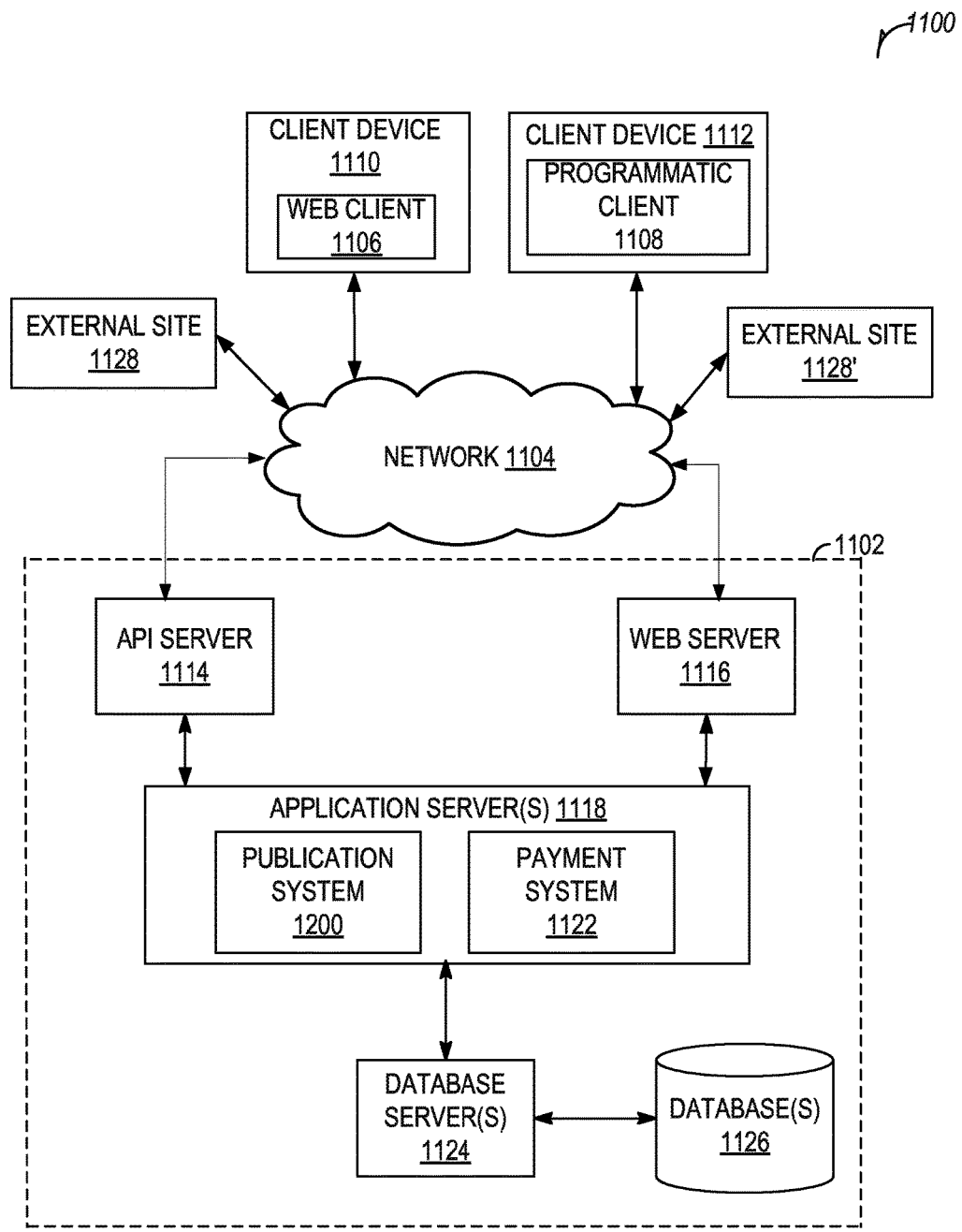
FIG. 11 is a block diagram illustrating an example embodiment of a high-level client-server-based network architecture.

FIG. 11 illustrates network architecture 1100, according to an embodiment. A networked system 1102, in an example form of a network-server-side functionality, is coupled via a communication network 1104 (e.g., the Internet, wireless network, cellular network, or a Wide Area Network (WAN)) to one or more client devices 1110 and 1112. The networked system 1102 corresponds to the system 100 in FIG. 1, the network-based marketplace 118 in FIG. 5, the system 800 in FIG. 8A, the system 900 in FIG. 9A, and the system 1000 in FIG. 10A, accordingly, the same or similar references have been used to indicate the same or similar features unless otherwise indicated. FIG. 11 illustrates, for example, a web client 1106 operating via a browser (e.g., such as the INTERNET EXPLORERS®browser developed by Microsoft®Corporation of Redmond, Wash. State), and a programmatic client 1108 executing on respective client devices 1110 and 1112.

The network architecture 1100 may be utilized to execute any of the methods described in this document. The client devices 1110 and 1112 may comprise a mobile phone, desktop computer, laptop, or any other communication device that a user may utilize to access the networked system 1102. In some embodiments, the client device 1110 may comprise a display module (not shown) to display information (e.g., in the form of user interfaces). In further embodiments, the client device 1110 may comprise one or more of a touch screen, accelerometer, camera, microphone, and GPS device. The client devices 1110 and 1112 may be a device of a user that is used to perform a transaction involving digital goods within the networked system 1102. In one embodiment, the networked system 1102 is a network-based marketplace that manages digital goods, publishes publications comprising item listings of products available on the network-based marketplace, and manages payments for these marketplace transactions. Additionally, external sites 1128, 1128' may be sites coupled to networked system 1102 via network 1104. External sites may be any desired system, including ecommerce systems.

An Application Program Interface (API) server 1114 and a web server 1116 are coupled to, and provide programmatic and web interfaces respectively to, one or more application servers 1118. The application server(s) 1118 host a publication system 1200 and a payment system 1122, each of which may comprise one or more modules, applications, or engines, and each of which may be embodied as hardware, software, firmware, or any combination thereof. The application servers 1118 are, in turn, coupled to one or more database servers 1124 facilitating access to one or more information storage repositories or database(s) 1126. In one embodiment, the databases 1126 are storage devices that store information to be posted (e.g., publications or listings) to the publication system 1200. The databases 1126 may also store digital goods information in accordance with example embodiments.

In example embodiments, the publication system 1200 publishes content on a network (e.g., Internet). As such, the publication system 1200 provides a number of publication and marketplace functions and services to users that access the networked system 1102. The publication system 1200 is discussed in more detail in connection with FIG. 12. In example embodiments, the publication system 1200 is discussed in terms of an online marketplace environment. However, it is noted that the publication system 1200 may be associated with a non-marketplace environment such as an informational (e.g., search engine) or social networking environment.

The payment system 1122 provides a number of payment services and functions to users. The payment system 1122 allows users to accumulate value (e.g., in a commercial currency, such as the U.S. dollar, or a proprietary currency, such as points, miles, or other forms of currency provide by a private entity) in their accounts, and then later to redeem the accumulated value for products (e.g., goods or services) that are made available via the publication system 1200 or elsewhere on the network 1104. The payment system 1122 also facilitates payments from a payment mechanism (e.g., a bank account, PayPal™, or credit card) for purchases of items via any type and form of a network-based marketplace.

While the publication system 1200 and the payment system 1122 are shown in FIG. 11 to both form part of the networked system 1102, it will be appreciated that, in alternative embodiments, the payment system 1122 may form part of a payment service that is separate and distinct from the networked system 1102. Additionally, while the example network architecture 1100 of FIG. 11 employs a client-server architecture, a skilled artisan will recognize that the present disclosure is not limited to such an architecture. The example network architecture 1100 can equally well find application in, for example, a distributed or peer-to-peer architecture system. The publication system 1200 and payment system 1122 may also be implemented as standalone systems or standalone software programs operating under separate hardware platforms, which do not necessarily have networking capabilities.

Figure 12:
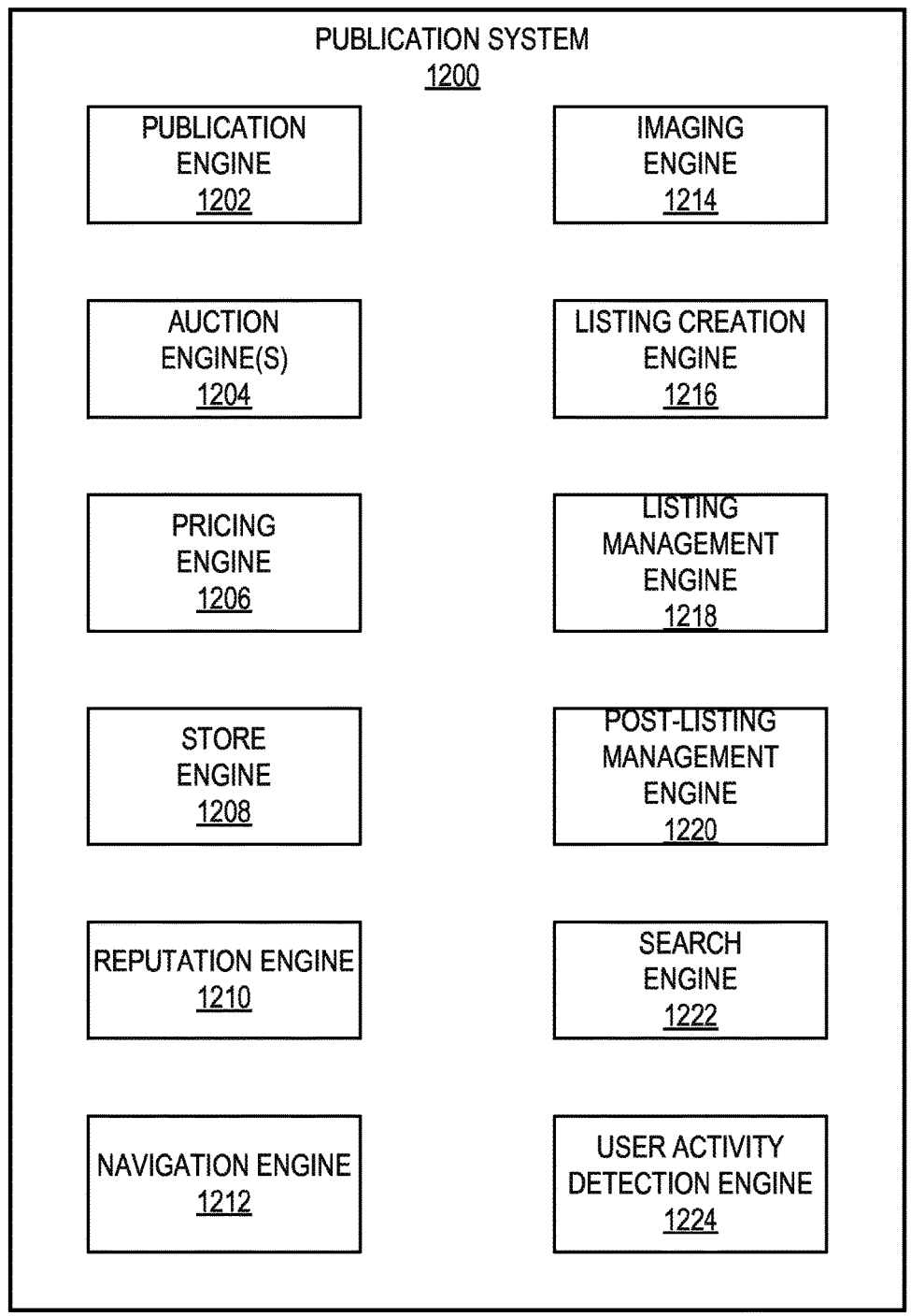
FIG. 12 is a block diagram illustrating an example embodiment of a publication system.

Referring now to FIG. 12, an example block diagram illustrating multiple components that, in one embodiment, are provided within the publication system 1200 of the networked system 1102 is shown. In this embodiment, the publication system 1200 is a marketplace system where items (e.g., goods or services) may be offered for sale and that further implements the features described herein for interactive query generation and refinement. The items may comprise digital goods (e.g., currency, license rights). The publication system 1200 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 1126 via the one or more database servers 1124, as shown in FIG. 11.

Returning to FIG. 12, the publication system 1200 provides a number of publishing, listing, and price-setting mechanisms whereby a buyer may list (or publish information concerning) goods or services for sale, a buyer can express interest in or indicate a desire to purchase such goods or services, and a price can be set for a transaction pertaining to the goods or services. To this end, the publication system 1200 may comprise at least one publication engine 1202 and one or more auction engines 1204 that support auction-format listing and price setting mechanisms (e.g., English, Dutch, Chinese, Double, Reverse auctions, etc.).

A pricing engine 1206 supports various price listing formats. One such format is a fixed-price listing format (e.g., the traditional classified advertisement-type listing or a catalog listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed price that is typically higher than a starting price of an auction for an item.

A store engine 1208 allows a buyer to group listings within a "virtual" store, which may be branded and otherwise personalized by and for the buyer. Such a virtual store may also offer promotions, incentives, and features that are specific and personalized to the buyer. In one example, the buyer may offer a plurality of items as Buy-It-Now items in the virtual store, offer a plurality of items for auction, or a combination of both.

A reputation engine 1210 allows users that transact, utilizing the networked system 1102, to establish, build, and maintain reputations. These reputations may be made available and published to potential trading partners. Because the publication system 1200 supports person-to-person trading between unknown entities, in accordance with one embodiment, users may otherwise have no history or other reference information whereby the trustworthiness and credibility of potential trading partners may be assessed. The reputation engine 1210 allows a user, for example through feedback provided by one or more other transaction partners, to establish a reputation within the network-based marketplace over time. Other potential trading partners may then reference the reputation for purposes of assessing credibility and trustworthiness.

Navigation of the network-based marketplace may be facilitated by a navigation engine 1212. For example, a browse module (not shown) of the navigation engine 1212 allows users to browse various category, catalog, or inventory data structures according to which listings may be classified within the publication system 1200. Various other navigation applications within the navigation engine 1212 may be provided to supplement the browsing applications.

In order to make listings available via the networked system 1102 as visually informing and attractive as possible, the publication system 1200 may include an imaging engine 1214 that enables users to upload images for inclusion within publications and to incorporate images within viewed listings. The imaging engine 1214 may also receive image data from a user as a search query and utilize the image data to identify an item depicted or described by the image data.

A listing creation engine 1216 allows users (e.g., buyers) to conveniently author listings of items. In one embodiment, the listings pertain to goods or services that a user (e.g., a buyer) wishes to transact via the publication system 1200. In other embodiments, a user may create a listing that is an advertisement or other form of publication.

A listing management engine 1218 allows the users to manage such listings. Specifically, where a particular user has authored or published a large number of listings, the management of such listings may present a challenge. The listing management engine 1218 provides a number of features (e.g., auto-relisting, inventory level monitors, etc.) to assist the user in managing such listings.

A post-listing management engine 1220 also assists users with a number of activities that typically occur post-listing. For example, upon completion of a transaction facilitated by the one or more auction engines 1204, a buyer may wish to leave feedback regarding a particular seller. To this end, the post-listing management engine 1220 provides an interface to the reputation engine 1210 allowing the buyer to conveniently provide feedback regarding multiple sellers to the reputation engine 1210. Another post-listing action may be shipping of sold items whereby the post-listing management engine 1220 may assist in printing shipping labels, estimating shipping costs, and suggesting shipping carriers.

A search engine 1222 performs searches for publications in the networked system 1102 that match a query. In example embodiments, the search engine 1222 comprises a search module (not shown) that enables keyword searches of publications published via the publication system 1200. Further, for example, the search engine 1222 may perform the functions previously described in reference to the search engine 121. In a further embodiment, the search engine 1222 may take an image received by the imaging engine 1214 as an input for conducting a search. The search engine 1222 takes the query input and determines a plurality of matches from the networked system 1102 (e.g., publications stored in the database 1126). It is noted that the functions of the search engine 1222 may be combined with the navigation engine 1212. The search engine 1222, in the publication system 1200, may perform the functionality previously described with respect to the search engine 121.

A user activity detection engine 1224 in FIG. 12 may monitor user activity during user sessions and detect a change in the level of user activity that, as discussed in more detail below, may predict that a user is about to make a purchase. The exact amount of change in the level of user activity may vary. A general guideline may be to monitor across multiple sessions and detect any significant increase over time (for example the activity level doubling or tripling in a short span). In one embodiment, when the user activity detection engine 1224 detects such a condition, the ecommerce system may make an intervention to provide content for display to the user in an effort to improve the probability that the user will make a purchase, and/or also to motive the user to make the purchase on the ecommerce system site instead of moving to a competitor site in search of a better purchase. Stated another way, activity over time and at different times before a purchase action provides an opportunity to personalize marketing to a user, based on time, by intervention as discussed above. Additional examples of including a temporal frame in that marketing personalization are discussed below. The publication system 1200 may further include the smart component modules 500, as previously described.

Although the various components of the publication system 1200 have been defined in terms of a variety of individual modules and engines, a skilled artisan will recognize that many of the items can be combined or organized in other ways and that not all modules or engines need to be present or implemented in accordance with example embodiments. Furthermore, not all components of the publication system 1200 have been included in FIG. 12. In general, components, protocols, structures, and techniques not directly related to functions of exemplary embodiments (e.g., dispute resolution engine, loyalty promotion engine, personalization engines) have not been shown or discussed in detail. The description given herein simply provides a variety of exemplary embodiments to aid the reader in an understanding of the systems and methods used herein.

Data Structures

Figure 13:
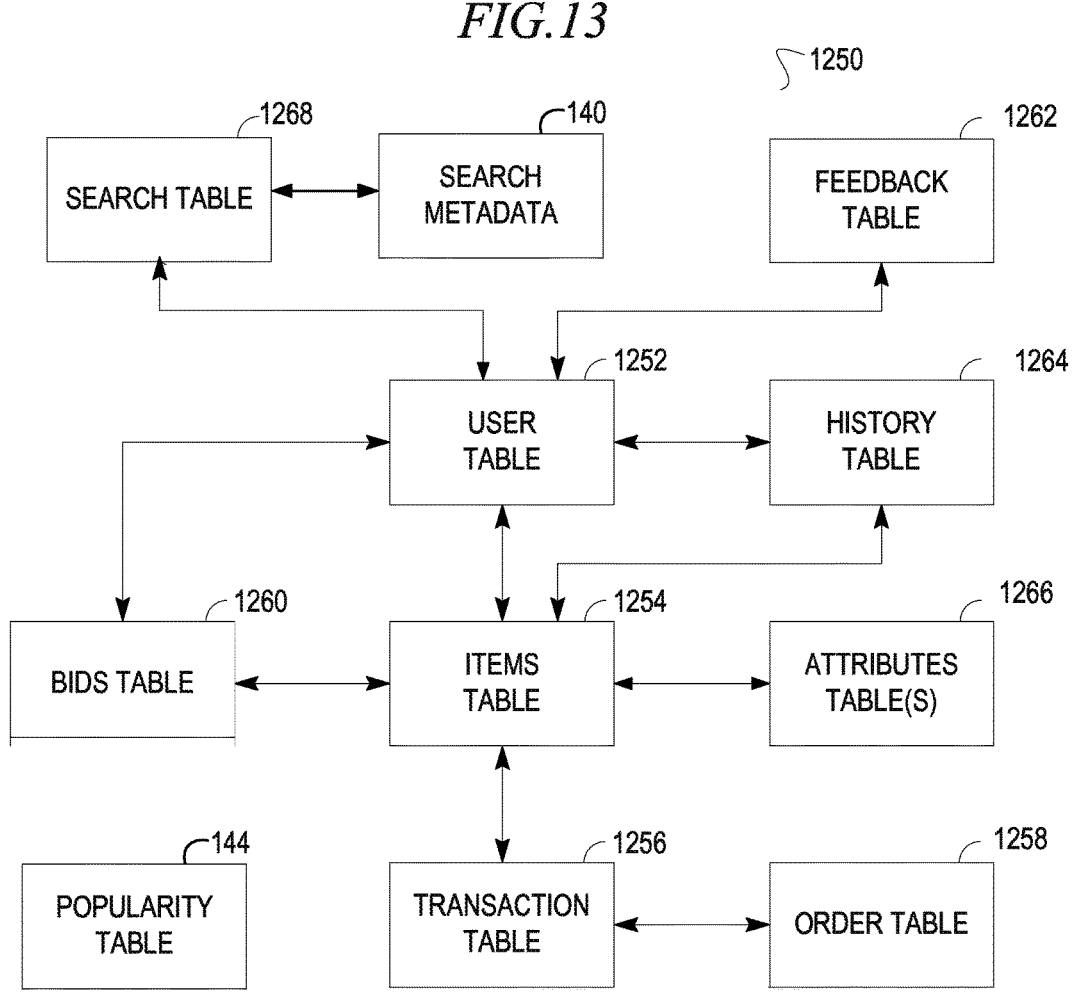
FIG. 13 is a block diagram illustrating tables that are utilized by the publication system, according to an embodiment.
Figure 14:
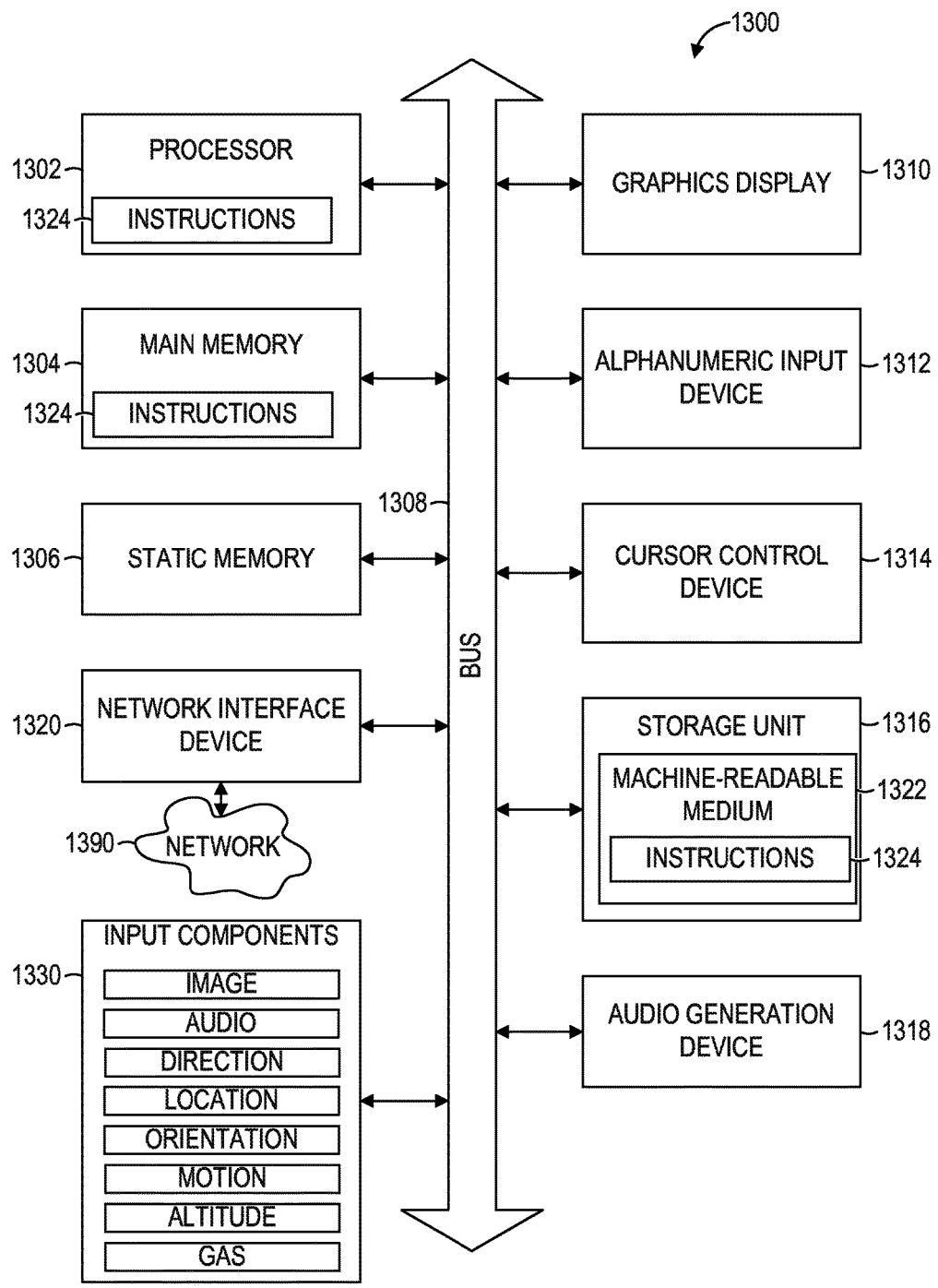
FIG. 14 is a block diagram of a machine in an example form of a computing system within which a set of instructions for causing the machine to perform any one or more of the methodologies discussed herein may be executed.

FIG. 13 is a high-level entity-relationship diagram, illustrating various tables 1250 that may be maintained within the databases 1126 of FIG. 11, and that are utilized by and support the publication system 1200 and payment system 1122, both of FIG. 11. A user table 1252 may contain a record for each of the registered users of the networked system 1102. A user may operate as a seller, a buyer, or both, within the network-based marketplace. In one example embodiment, a buyer may be a user that has accumulated value (e.g., commercial or proprietary currency), and is accordingly able to exchange the accumulated value for items that are offered for sale by the network-based marketplace.

The tables 1250 may also include an items table 1254 (e.g., items table 506) in which item records (e.g., listings) are maintained for goods and services (e.g., items) that are available to be, or have been, transacted via the network-based marketplace. Item records (e.g., listings) within the items table 1254 may furthermore be linked to one or more user records within the user table 1252, so as to associate a seller and one or more actual or potential buyers with an item record (e.g., listing).

A transaction table 1256 may contain a record for each transaction (e.g., a purchase or sale transaction or auction) pertaining to items for which records exist within the items table 1254.

An order table 1258 may be populated with order records, with each order record being associated with an order. Each order, in turn, may be associated with one or more transactions for which records exist within the transaction table 1256.

Bid records within a bids table 1260 may relate to a bid received at the network-based marketplace 118 in connection with an auction-format listing supported by the auction engine(s) 1204 of FIG. 12. A feedback table 1262 may be utilized by one or more reputation engines 1210 of FIG. 12, in one example embodiment, to construct and maintain reputation information concerning users in the form of a feedback score. A history table 1264 may maintain a history of transactions to which a user has been a party. One or more attributes tables 1266 may record attribute information that pertains to items for which records exist within the items table 1254. Considering only a single example of such an attribute, the attributes tables 1266 may indicate a currency attribute associated with a particular item, with the currency attribute identifying the currency of a price for the relevant item as specified by a seller. Another example of an attribute may include 'fitment' (compatibility) information, which facilitates an identification of compatibility of a part 106 relative to other parts 106 described in other listings, smart component information and characterization, and garage vehicle metadata.

A search table 1268 may store search information that has been entered by a user (e.g., a buyer) who is looking for a specific type of listing. The tables 1250 may include the OEM tracking information 510, the maintenance information 512, and the smart component processing information 514, as previously described.

Machine

FIG. 15 is a block diagram illustrating components of a machine 1300, according to some example embodiments, able to read instructions 1324 from a machine-readable medium 1322 (e.g., a non-transitory machine-readable medium, a machine-readable storage medium, a computer-readable storage medium, or any suitable combination thereof) and perform any one or more of the methodologies discussed herein, in whole or in part. Specifically, FIG. 15 shows the machine 1300 in the example form of a computer system (e.g., a computer) within which the instructions 1324 (e.g., software, a program, an application, an applet, an app, or other executable code) for causing the machine 1300 to perform any one or more of the methodologies discussed herein may be executed, in whole or in part. In alternative embodiments, the machine 1300 operates as a standalone device or may be connected (e.g., networked) to other machines. In a networked deployment, the machine 1300 may operate in the capacity of a server machine or a client machine in a server-client network environment, or as a peer machine in a distributed (e.g., peer-to-peer) network environment. The machine 1300 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, an engine control unit, integrated vehicle entertainment and information system (e.g., in-dash navigation+information+radio controller), or any machine capable of executing the instructions 1324, sequentially or otherwise, that specify actions to be taken by that machine. Further, while only a single machine is illustrated, the term "machine" shall also be taken to include any collection of machines that individually or jointly execute the instructions 1324 to perform all or part of any one or more of the methodologies discussed herein.

The machine 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1304, and a static memory 1306, which are configured to communicate with each other via a bus 1308. The processor 1302 may contain microcircuits that are configurable, temporarily or permanently, by some or all of the instructions 1324 such that the processor 1302 is configurable to perform any one or more of the methodologies described herein, in whole or in part. For example, a set of one or more microcircuits of the processor 1302 may be configurable to execute one or more modules (e.g., software modules) described herein.

The machine 1300 may further include a graphics display 1310 (e.g., a plasma display panel (PDP), a light emitting diode (LED) display, a liquid crystal display (LCD), a projector, a cathode ray tube (CRT), or any other display capable of displaying graphics or video). The machine 1300 may also include an alphanumeric input device 1312 (e.g., a keyboard or keypad), a cursor control device 1314 (e.g., a mouse, a touchpad, a trackball, a joystick, a motion sensor, an eye tracking device, or other pointing instrument), a storage unit 1316, an audio generation device 1318 (e.g., a sound card, an amplifier, a speaker, a headphone jack, or any suitable combination thereof), and a network interface device 1320.

The storage unit 1316 includes the machine-readable medium 1322 (e.g., a tangible and non-transitory machine-readable storage medium) on which are stored the instructions 1324 embodying any one or more of the methodologies or functions described herein. The instructions 1324 may also reside, completely or at least partially, within the main memory 1304, within the processor 1302 (e.g., within the processor's cache memory), or both, before or during execution thereof by the machine 1300. Accordingly, the main memory 1304 and the processor 1302 may be considered machine-readable media (e.g., tangible and non-transitory machine-readable media). The instructions 1324 may be transmitted or received over the network 1390 via the network interface device 1320. For example, the network interface device 1320 may communicate the instructions 1324 using any one or more transfer protocols (e.g., hypertext transfer protocol (HTTP)).

In some example embodiments, the machine 1300 may be a portable computing device, such as a smart phone, tablet computer, or wearable device (e.g., Google Glass), and have one or more additional input components 1330 (e.g., sensors or gauges). Examples of such input components 1330 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components 1330 may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions 1324. The term "machine-readable medium" shall also be taken to include any medium, or combination of multiple media, that is capable of storing the instructions 1324 for execution by the machine 1300, such that the instructions 1324, when executed by one or more processors of the machine 1300 (e.g., processor 1302), cause the machine 1300 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

I claim:

1. A system to facilitate a diagnosis of a complex failure in a vehicle, the system comprising:

at least one processor and executable instructions accessible on a computer-readable medium that, when executed, cause the at least one processor to perform operations comprising:

receiving a maintenance message, over a network, from a mobile device, the maintenance message being received by a network-based marketplace and being associated with a first user, the maintenance message further including part log information including a timestamp and characterization information, the characterization information being received by the mobile device from a component in the vehicle, the component including a sensor that senses a first part assembled into the vehicle, the component to generate the characterization information based on a sense of the first part, as sensed by the sensor, and to communicate the characterization information to the mobile device;

identifying user profile information, at the network-based marketplace, based on the maintenance message, the user profile information being associated with the first user on the network-based marketplace and the mobile device;

storing the part log information in the user profile information at the network-based marketplace;

comparing the part log information that corresponds to the first part in the user profile information, at the network based marketplace, with corresponding part maintenance information to generate a service level for the first part;

receiving a triggering event, at the network-based marketplace, the triggering event including the maintenance message; and processing the triggering event responsive to receipt of the triggering event, the processing the triggering event including identifying sub-system processing rules based on the triggering event and executing the sub-system processing rules, the sub-system processing rules causing a smart component engine to perform operations comprising:

identifying a first sub-system from a plurality of sub-systems, the first sub-system including a plurality of parts comprised of a plurality of different part types and scanning each part of the plurality of parts to retrieve characterization information from the plurality of parts to identify original equipment authentication information, the identifying and scanning being responsive to identifying the service level for the first part as indicating an increase in a likelihood of failure of the first part, registering in a database at least one part of the plurality of parts as not being original equipment by utilizing at least one public key to decrypt a portion of the characterization information retrieved from the plurality of parts, and communicating a user interface, over the network, to the mobile device, the user interface including original equipment authentication information to facilitate a diagnosis of a complex failure in the vehicle.

2. The system of claim 1, identifying whether a derivative of the part log information, with respect to time, exceeds a threshold.

3. The system of claim 2, wherein the threshold is dynamically calculated.

4. The system of claim 2, wherein the threshold is predetermined.

5. The system of claim 1, wherein the characterization information includes a percentage of wear of the first part and further comprising identifying whether an aggregate of the percentage of wear of the first part is greater than a predetermined threshold.

6. The system of claim 1, further comprising identifying a second part on the vehicle and registering the second part in the user profile information, wherein the second part was manufactured to include a sensor.

7. The system of claim 6, wherein the sensor on the second part operates to sense an elasticity of the second part, and wherein the second part is an engine belt.

8. The system of claim 6, authenticating the second part as authentic based on original equipment manufacturer tracking information.

9. The system of claim 1, wherein the maintenance message includes vehicle identification information that identifies a make and model of the vehicle.

10. Al method to facilitate a diagnosis of a complex failure in a vehicle, the method comprising:

receiving a maintenance message, over a network, from a mobile device, the maintenance message being received by a network-based marketplace, the maintenance message being associated with a first user and including part log information including a timestamp and characterization information, the characterization information being received by the mobile device from a component in the vehicle, the component including a sensor that senses a first part assembled into the vehicle, the component to generate the characterization information based on a sense of the first part, as sensed by the sensor, and to communicate the characterization information to the mobile device;

identifying user profile information, at the network-based marketplace, based on the maintenance message, the user profile information being associated with the first user on the network-based marketplace and the mobile device;

storing the part log information in the user profile information at the network-based marketplace;

comparing the part log information corresponding to the first part in the user profile information, at the network-based marketplace, with corresponding part maintenance information to generate a service level for the first part;

receiving a triggering event, at the network-based marketplace, the triggering event including the maintenance message; and processing the triggering event responsive to receiving the triggering event, the processing the triggering event including identifying sub-system processing rules based on the triggering event and executing the sub-system processing rules, the sub-system processing rules causing a smart component engine to perform operations comprising:

identifying a first sub-system from a plurality of sub-systems, the first sub-system including a plurality of parts comprised of a plurality of different part types and scanning each part of the plurality of parts to retrieve characterization information from the plurality of parts to identify original equipment authentication information, the identifying and scanning being responsive to identifying the service level for the first part as indicating an increase in a likelihood of failure of the first part, registering in a database at least one part of the plurality of parts as not being original equipment by utilizing at least one public key to decrypt a portion of the characterization information retrieved from the plurality of parts, and communicating a user interface, over the network, to the mobile device, the user interface including original equipment authentic information to facilitate a diagnosis of a complex failure in the vehicle.

11. The method of claim 10, wherein the comparing the part log information corresponding to the first part in the user profile information with corresponding part maintenance information includes identifying whether a derivative of the part log information, with respect to time, exceeds a threshold.

12. The method of claim 11, wherein the threshold is dynamically calculated.

13. The method of claim 11, wherein the threshold is predetermined.

14. The method of claim 10, wherein the characterization information includes a percentage of wear of the first part and wherein the comparing the part log information corresponding to the first part in the user profile information with corresponding part maintenance information includes identifying whether an aggregate of the percentage of wear of the first part is greater than a predetermined threshold.

15. The method of claim 10, further comprising identifying whether a second part is installed on the vehicle, and registering the second part in the user profile information, wherein the second part was manufactured to include a sensor.

16. The method of claim 15, wherein the sensor of the second part operates to sense an elasticity of the second part and wherein the second part is an engine belt.

17. The method of claim 15, further comprising authenticating the second part as an authentic part based on original equipment manufacturer tracking information.

18. The method of claim 10, wherein the maintenance message includes vehicle identification information that identifies a make and model of the vehicle.

19. A machine-readable hardware storage device having no transitory signals storing a set of instructions that, when executed by a processor of a machine, cause the machine to perform operations comprising:

receiving a maintenance message, over a network, from a mobile device, the maintenance message being received by a network-based marketplace, the maintenance message being associated with a first user and including part log information including a timestamp and characterization information, the characterization information being received by the mobile device from a component in a vehicle, the component including a sensor that senses a first part assembled into the vehicle, the component to generate the characterization information based on a sense of the first part, as sensed by the sensor, and to communicate the characterization information to the mobile device;

identifying user profile information, at the network-based marketplace, based on the maintenance message, the user profile information being associated with the first user on the network-based marketplace and the mobile device;

storing the part log information in the user profile information at the network-based marketplace;

comparing the part log information corresponding to the first part in the user profile information, at the network-based marketplace, with corresponding part maintenance information to generate a service level for the first part;

receiving a triggering event, at the network-based marketplace, the triggering event including the maintenance message; and processing the triggering event responsive to receiving the triggering event, the processing the triggering event including identifying sub-system processing rules based on the triggering event and executing the sub-system processing rules, the sub-system processing rules causing a smart component engine to perform operations comprising:

identifying a first sub-system from a plurality of sub-systems, the first sub-system including a plurality of parts comprised of a plurality of different part types and scanning each part of the plurality of parts to retrieve characterization information from the plurality of parts to identify original equipment authentication information, the identifying and scanning being responsive to identifying the service level for the first part as indicating an increase in a likelihood of failure of the first part, registering in a database at least one part of the plurality of parts as not being original equipment by utilizing at least one public key to decrypt a portion of the characterization information retrieved from the plurality of parts, and communicating a user interface, over the network, to the mobile device, the user interface including original equipment authentic information to facilitate a diagnosis of a complex failure in the vehicle.

20. The machine-readable hardware storage device of claim 19, wherein the comparing the part log information corresponding to the first part in the user profile information with corresponding part maintenance information includes identifying whether a derivative of the part log information, with respect to time, exceeds a threshold.

\* \* \* \* \*

UNITED STATES PATENT AND TRADEMARK OFFICE
CERTIFICATE OF CORRECTION

PATENT NO. : 10,318,930 B2
APPLICATION NO. : 14/588272
DATED : June 11, 2019
INVENTOR(S) : Jeremy Leigh Cattone Page 1 of 1

It is certified that error appears in the above-identified patent and that said Letters Patent is hereby corrected as shown below:

In the Claims

In Column 75, Line 60, in Claim 10, delete "Al" and insert -- A --, therefor.

In Column 77, Line 14, in Claim 19, delete "no transitory" and insert -- non-transitory --, therefor.

Signed and Sealed this
Twenty-first Day of July, 2020

Andrei Iancu
*Director of the United States Patent and Trademark Office*